United States Patent [19]
Estes

[11] Patent Number: 5,852,740
[45] Date of Patent: Dec. 22, 1998

[54] POLYMORPHIC NETWORK METHODS AND APPARATUS

[76] Inventor: Mark D. Estes, 4509 Bunny Run VI, Austin, Tex. 78746

[21] Appl. No.: 951,057

[22] Filed: Oct. 15, 1997

Related U.S. Application Data

[63] Continuation of Ser. No. 218,333, Mar. 28, 1994, Pat. No. 5,680,634, which is a continuation-in-part of Ser. No. 642,508, Jan. 16, 1991, Pat. No. 5,301,284.

[51] Int. Cl.$^6$ ...................................................... G06F 13/00
[52] U.S. Cl. .................................. 395/800.15; 395/200.5
[58] Field of Search ........................ 395/800.01, 800.13, 395/800.15, 200.3, 200.79, 200.68, 200.8, 200.5; 340/825.79, 825.83, 825.87, 825.03, 826; 370/254, 351, 402, 404, 406, 419

[56] References Cited

U.S. PATENT DOCUMENTS

| | | | |
|---|---|---|---|
| 3,408,532 | 10/1968 | Hultberg et al. | 315/12.1 |
| 3,609,397 | 9/1971 | Zaman | 307/235 |
| 4,272,829 | 6/1981 | Schmidt et al. | 364/900 |
| 4,605,928 | 8/1986 | Georgiou | 340/825 |
| 4,630,045 | 12/1986 | Georgiou | 340/825 |
| 4,679,186 | 7/1987 | Lea | 370/14 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,745,630 | 5/1988 | Underwood | 364/402 |
| 4,888,692 | 12/1989 | Gupta et al. | 364/402 |
| 4,943,909 | 7/1990 | Huang | 364/200 |
| 5,020,059 | 5/1991 | Gorin et al. | 371/11 |
| 5,030,921 | 7/1991 | Kane | 315/169 |
| 5,036,473 | 7/1991 | Butts et al. | 364/489 |
| 5,038,386 | 8/1991 | Li | 382/49 |
| 5,075,595 | 12/1991 | Kane | 315/169 |
| 5,182,466 | 1/1993 | Ohkubo | 307/127 |
| 5,289,365 | 2/1994 | Caldwell | 364/138 |

OTHER PUBLICATIONS

Chen and Shin, "Processor Allocation in an N–Cube Multiprocessor Using Gray Codes," IEEE Transactions on Computers, Dec. 1987, pp. 1396–1407.

Chen and Shin, "Subcube Allocation and Task Migration in Hybercube Multiprocessors," IEEE Transactions on Computers, Sep. 1990, pp. 1146–1155.

Smith, K.C., "The Prospects for Multivalued Logic: A Technology and Applications View," IEEE Transactions on Computers, Sep. 1981, pp. 619–634.

Bhuyan, Laxmi and Agrawal, Dharma, "Generalized Hypercube and Hyperbus Structures for a Computer Network," IEEE Transactions on Computers, Apr. 1984, pp. 323–333.

Goede, W.F., "A Digitally Addressed Flat–Panel CRT," IEEE Transactions on Electronic Devices, Nov. 1973, pp. 378–387.

(List continued on next page.)

*Primary Examiner*—Alpesh M. Shah
*Attorney, Agent, or Firm*—David Newman Chartered

[57] ABSTRACT

A modular, polymorphic network interconnecting a plurality of electronically reconfigurable devices via a modular, polymorphic interconnect, to permit a fixed, physical configuration of operating hardware devices to take on a plurality of logically addressable configurations. The modular, polymorphic interconnect further permits allocation and deallocation of selected electronically reconfigurable devices for a particular logically addressable configuration. The modular, polymorphic interconnect additionally permits the logical topology of selected electronically reconfigurable devices to be configured as at least one mixed-radix, N-dimensional network. The logical topology of mixed-radix, N-dimensional networks can be dynamically changed under control for a new configuration of logical addresses for selected electronically reconfigurable devices. The modular, polymorphic interconnect also permits one or more electronically reconfigurable devices to be selected from at least one logically related set of electronically reconfigurable devices, making the resulting network system particularly well suited for a variety of purposes related to resource management.

2 Claims, 64 Drawing Sheets

OTHER PUBLICATIONS

Kitai, A.H., "Three–and Four–Dimensional Addressing of Flat–Panel Displays," Proceedings of the SID, vol. 27/4, 1986, pp. 309–312.

Larar, Jerry N., et al., "Vector Quantization of the Articulatory Space," IEEE Transactions on Acoustics, Speech and Signal Processing, Dec. 1988, pp. 1812–1818.

Gilbert, E.N. and Moore, E.F., "Variable–Length Binary Encodings," The Bell System Technical Journal, Jul. 1959, pp. 933–967.

"Data Flow Computers and VLSI Computations," *Computer Architecture and Parallel Processing,* Chapter 10, pp. 732–811.

Trimberger, Stephen, ed., *Field–Programmable Gate Array Technology* (Boston: Kluwer Academic Publishers, 1994), pp. 1–9, 218–223.

Hilbers, Peter A.J., *Processor Networks and Aspects of the Mapping Problem* (Cambridge: Cambridge University Press, 1991), pp. 1–3, 65–77.

Chiou, Arthur, "Photorefractive Optical interconnects," Jahns and Lee, eds., *Optical Computing Hardware* (Academic Press, Inc., 1994), Chapter 10, pp. 249–285.

Murdocca, Miles, A Digital Design Methodology for Optical Computing (Cambridge: The MIT Press, 1990), Chapter 4, pp. 43–98.

Wells, Mark B., "Aspects of Language Design for Combinatorial Computing," IEEE Transactions on Electronic Computers, Aug. 1964, pp. 431–438.

Newell, Allen, "On Programming a Highly Parallel Machine to be an Intelligent Technician," Proceedings of the Western Joint Computer Conference, IRE–AIEE–ACM, 1960, pp. 267–282.

Siegel, Howard J., et al., "A Survey of Interconnection Methods for Reconfigurable Parallel Processing Systems," National Computer Conference, 1979, pp. 529–542.

Sztipanovits, Janos, "Toward Structural Adaptivity," IEEE 1988, pp. 2359–2366.

Kartashev, Steven and Karteshev, Svetlana, "Problems of Designing Supersystems with Dynamic Architectures," IEEE Transactions on Computers, Dec. 1980, pp. 1114–1132.

French, P.C. and Taylor, R.W., "A Self–Configuring Processor," IEEE Workshop on FPGAs for Custom Computing Machines, Apr. 5–7, 1993.

Fig. 13B
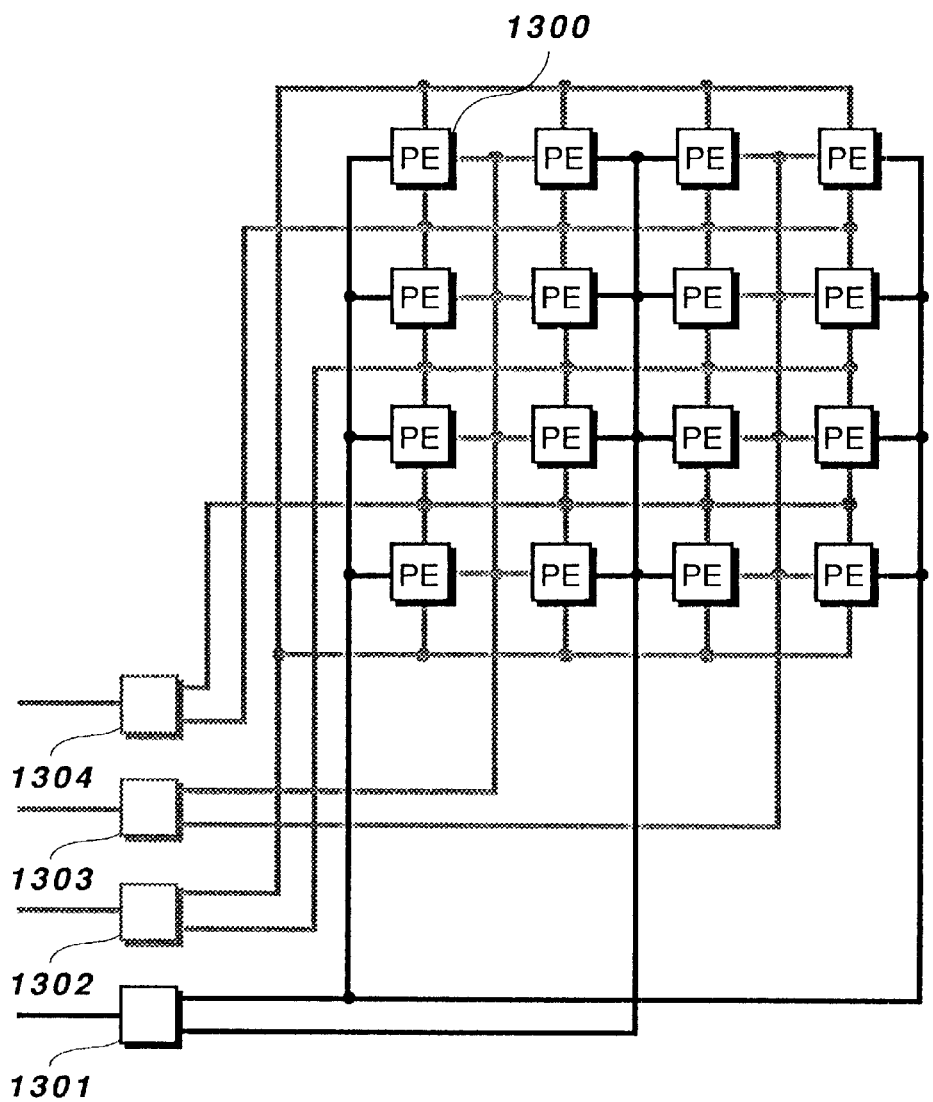
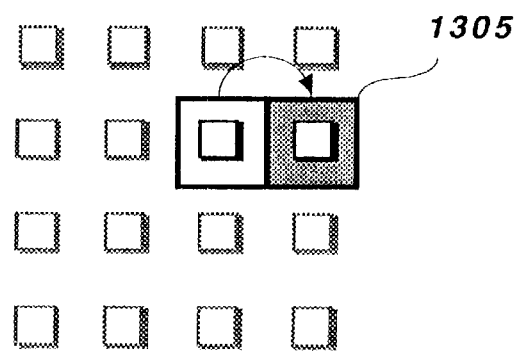

Fig. 13C
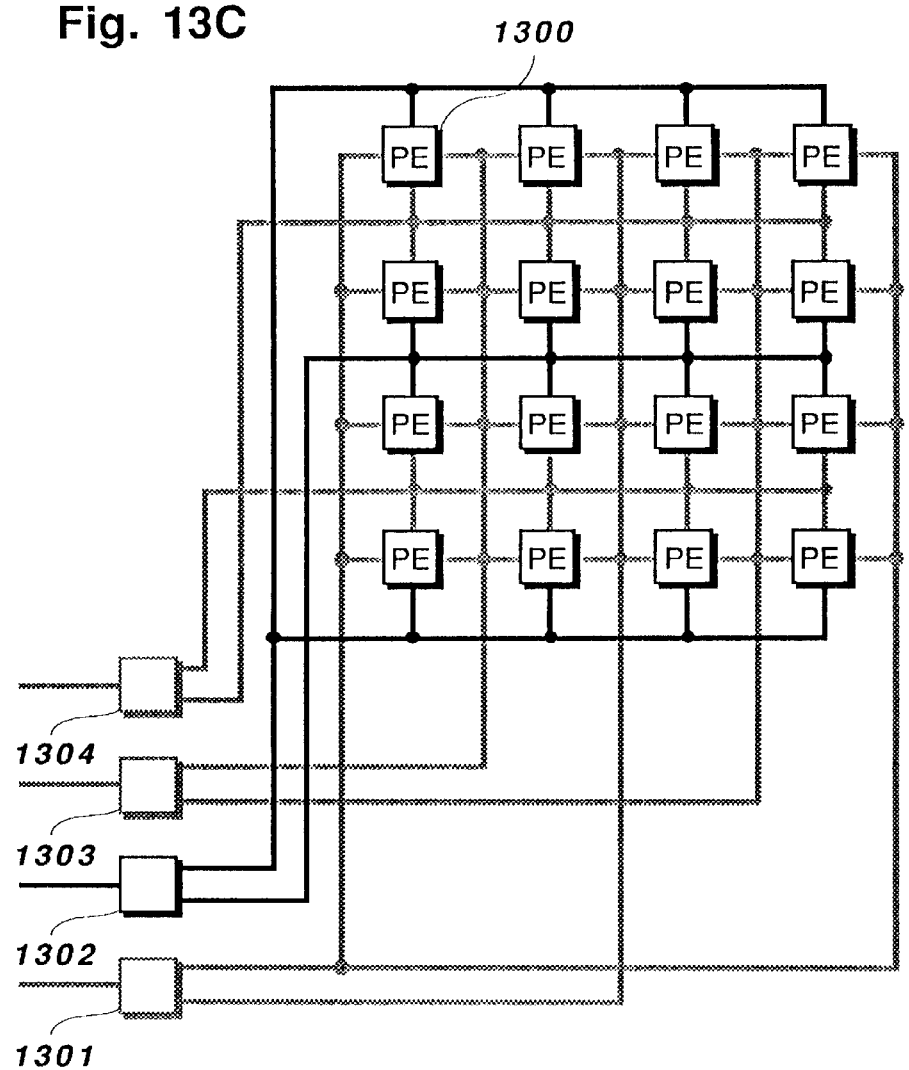
1304
1303
1302
1301
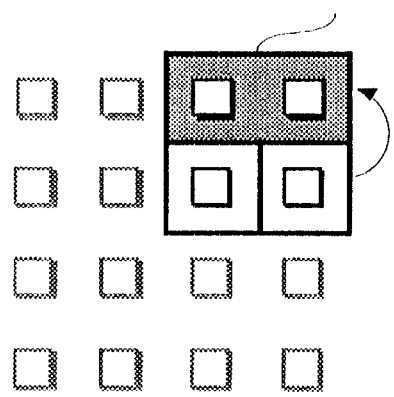

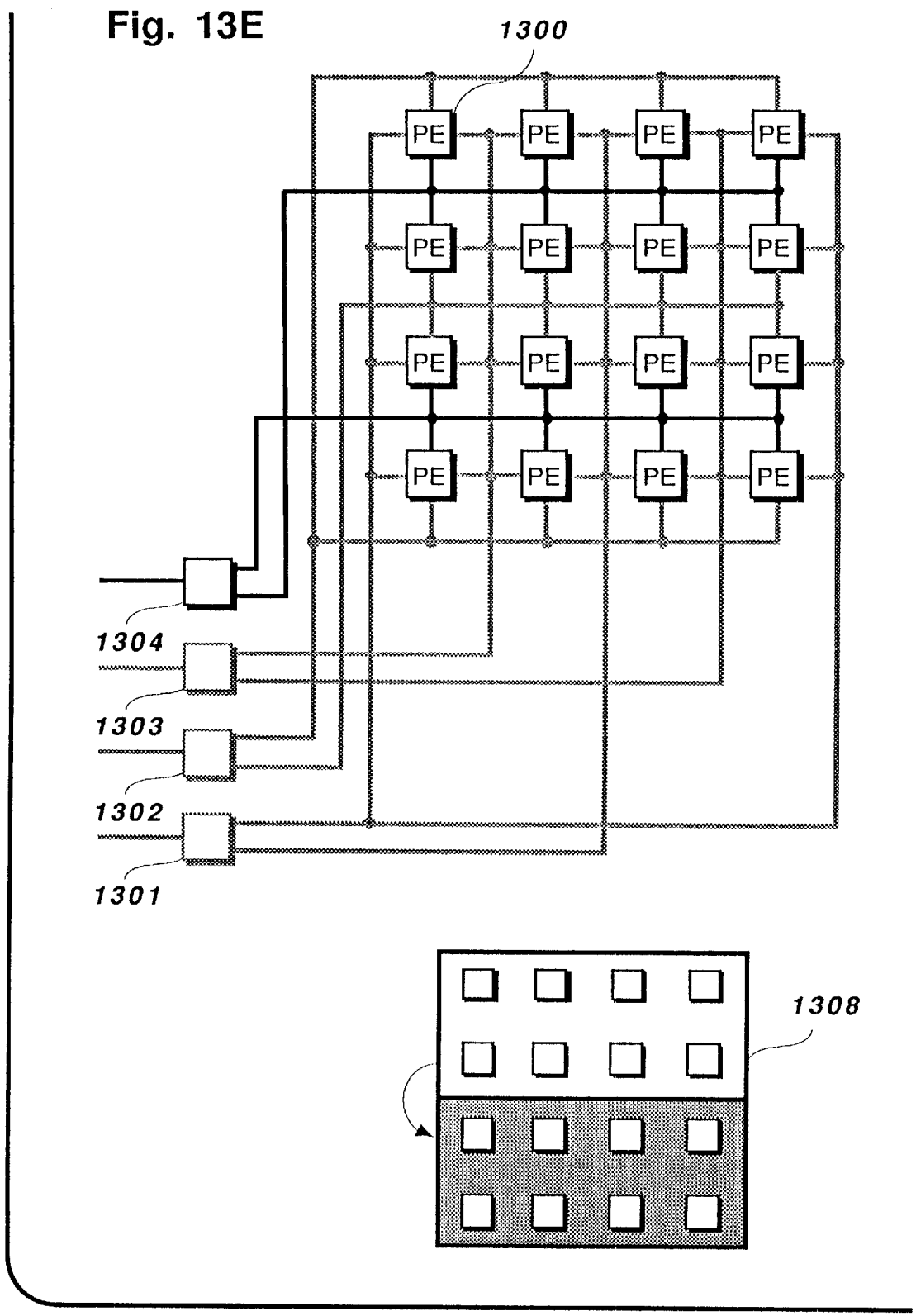

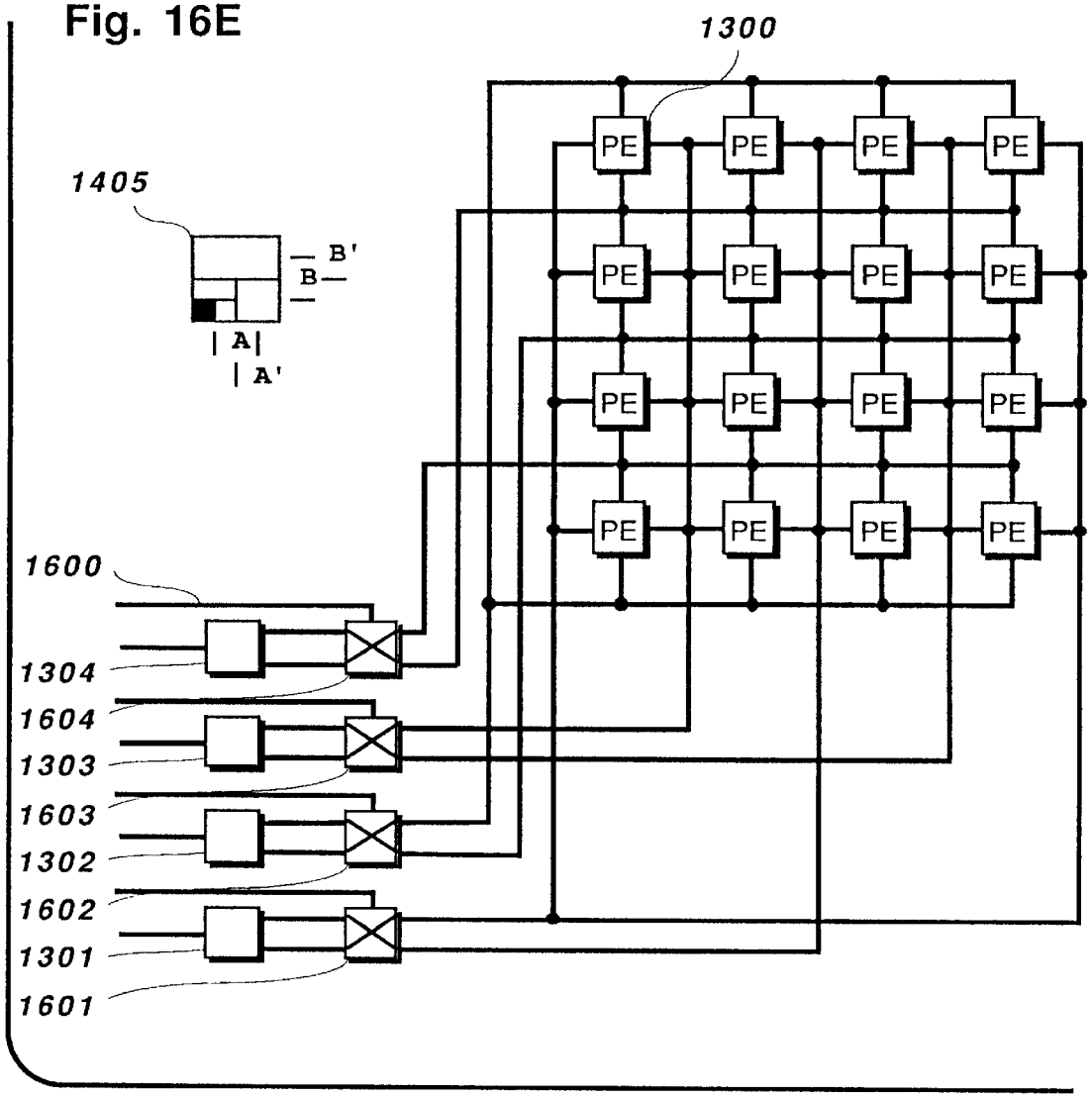

Fig. 17A
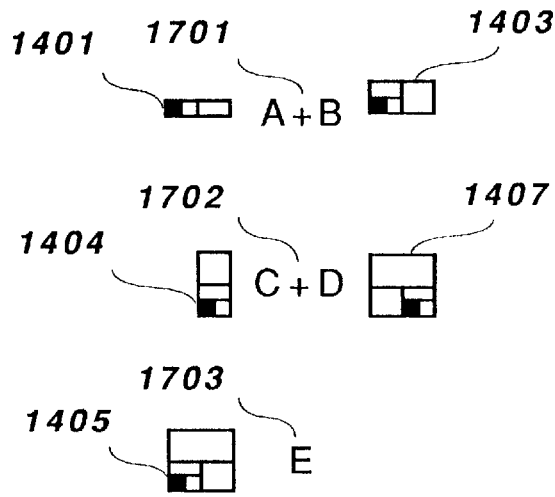
Fig. 17B
```
1701
1702           SET LOGICAL POLARITY
1703  ╲  1  IF A + B  THEN  I1•I3
       ╲  2   "  C + ED   "   I2•I4
        ╲ 3   "  E        "   I1•I2•I3•I4
```
Fig. 17C
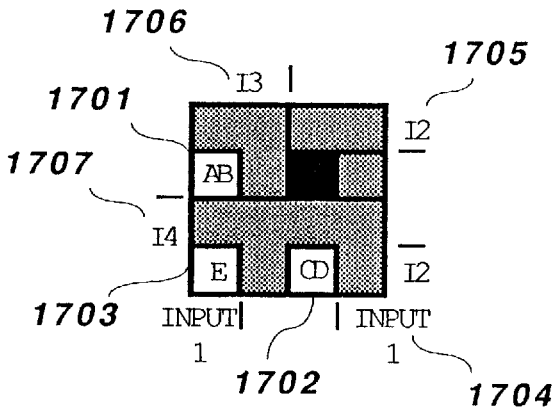

Fig. 19C

```
                                          1911
 1  A  [8]    2  AB [12]   3  ABC [8]
                           4  ABD [2]
                           5  ABG [2]

6  AC [12]   7  ACD [2]
                           8  ACE [2]
                           9  ACG [2]
             10  AD [4]
             11  AE [4]
             12  AG [4]

13  B  [4]   14  BC [6]
             15  BD [2]
             16  BG [2]

17  C  [4]   18  CD [2]
             19  CE [2]
             20  CG [2]

21  D  [2]   22  DG [2]
23  E  [2]   ___1912
*24 F  [1]
25  G  [2]   ___1913
*26 H  [1]   ___1914
*27 I  [1]   INSTANCES not locations
```

```
      A  C
AC  1  1  1
    2  2  "
    3  3  "
    4  4  "
    5  5  "
    6  6  "
    7  1  2
    8  2  "
    9  3  "
   10  4  "
   11  1  3
   12  2  "
```

```
       A  C  D
ACD  1  1  1  1
     2  2  "  "
```

```
       A  C  E
ACE  1  1  1  1
     2  2  "  "
```

```
       A  C  G
ACG  1  1  1  1
     2  2  "  "
```

```
       A  D
AD  1  1  1
    2  2  "
    3  3  "
    4  4  "
```

```
       A  E
AE  1  1  1
    2  2  "
    3  3  "
    4  4  "
```

```
       A  G
AG  1  1  1
    2  2  "
    3  3  "
    4  4  "
```

```
       B  C
BC  1  1  1
    2  2  "
    3  3  "
    4  4  "
    5  1  2
    6  2  "
```

```
       B  D
BD  1  1  1
    2  2  "
```

1001 → 0011

```
0   0000
        } 1
1   0001    XXX1 ─┐
        } 3       │
2   0101         ─┤─ X1XX ─┐
        } 1                │
3   0100    XXX0 ─┘        │
        } 4                │
4   1100                   │
        } 1                ├─ 1XXX
5   1101    XXX1 ─┐        │
        } 3       │        │
6   1001         ─┤─ X0XX ─┘
        } 1       │
7   1000    XXX0 ─┘
        } 2
8   1010                XX0X
        } 1
9   1011    XXX1 ─┐
        } 3       │
10  1111         ─┤─ X1XX ─┐
        } 1                │
11  1110    XXX0 ─┘        │
        } 4                │
12  0110                   ├─ 0XXX
        } 1                │
13  0111    XXX1 ─┐        │
        } 3       │        │
14  0011         ─┤─ X0XX ─┘
        } 1       │
15  0010    XXX0 ─┘
```

0101 → 0011

```
0   0000
        } 1
1   0001    XXX1 ─┐
        } 3       │
2   0101         ─┤─ X1XX ─┐
        } 1                │
3   0100    XXX0 ─┘        │
        } 2                │
4   0110                XX1X
        } 1                │
5   0111    XXX1 ─┐        │
        } 3       │        │
6   0011         ─┤─ X0XX ─┘
        } 1       │
7   0010    XXX0 ─┘
        } 4
8   1010                        1XXX
        } 1
9   1011    XXX1 ─┐
        } 3       │
10  1111         ─┤─ X1XX ─┐
        } 1                │
11  1110    XXX0 ─┘        │
        } 2                │
12  1100                XX0X
        } 1                │
13  1101    XXX1 ─┐        │
        } 3       │        │
14  1001         ─┤─ X0XX ─┘
        } 1       │
15  1000    XXX0 ─┘
```

0011 → 0011

1011 → 0111

| | | | | |
|---|---|---|---|---|
| 0 | 0000 | | | |
| | } 1 | | | |
| 1 | 0001 | XXX1 ⎤ | | |
| | } 2 | | | |
| 2 | 0011 | | XX1X ⎤ | |
| | } 1 | | | |
| 3 | 0010 | XXX0 ⎦ | | |
| | } 4 | | | |
| 4 | 1010 | | | 1XXX ⎤ |
| | } 1 | | | |
| 5 | 1011 | XXX1 ⎤ | | |
| | } 2 | | | |
| 6 | 1001 | | XX0X ⎦ | |
| | } 1 | | | |
| 7 | 1000 | XXX0 ⎦ | | |
| | } 3 | | | |
| 8 | 1100 | | | X1XX ⎦ |
| | } 1 | | | |
| 9 | 1101 | XXX1 ⎤ | | |
| | } 2 | | | |
| 10 | 1111 | | XX1X ⎤ | |
| | } 1 | | | |
| 11 | 1110 | XXX0 ⎦ | | |
| | } 4 | | | |
| 12 | 0110 | | | 0XXX ⎦ |
| | } 1 | | | |
| 13 | 0111 | XXX1 ⎤ | | |
| | } 2 | | | |
| 14 | 0101 | | XX0X ⎦ | |
| | } 1 | | | |
| 15 | 0100 | XXX0 ⎦ | | |

1101 → 0111

| | | | | |
|---|---|---|---|---|
| 0 | 0000 | | | |
| | } 1 | | | |
| 1 | 0001 | XXX1 ⎤ | | |
| | } 4 | | | |
| 2 | 1001 | | | 1XXX ⎤ |
| | } 1 | | | |
| 3 | 1000 | XXX0 ⎦ | | |
| | } 2 | | | |
| 4 | 1010 | | XX1X ⎤ | |
| | } 1 | | | |
| 5 | 1011 | XXX1 ⎦ | | |
| | } 4 | | | |
| 6 | 0011 | | | 0XXX ⎦ |
| | } 1 | | | |
| 7 | 0010 | XXX0 ⎦ | | |
| | } 3 | | | |
| 8 | 0110 | | X1XX ⎦ | |
| | } 1 | | | |
| 9 | 0111 | XXX1 ⎤ | | |
| | } 4 | | | |
| 10 | 1111 | | | 1XXX ⎤ |
| | } 1 | | | |
| 11 | 1110 | XXX0 ⎦ | | |
| | } 2 | | | |
| 12 | 1100 | | XX0X ⎦ | |
| | } 1 | | | |
| 13 | 1101 | XXX1 ⎤ | | |
| | } 4 | | | |
| 14 | 0101 | | | XX0X ⎦ |
| | } 1 | | | |
| 15 | 0100 | XXX0 ⎦ | | |

0111 → 0111

Fig. 38A
A        B
Fig. 38B
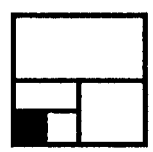
D     
E
Fig. 38C
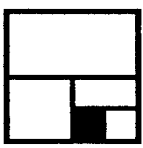    
F        G        H
Fig. 38D
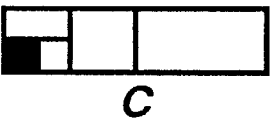
C
Fig. 39
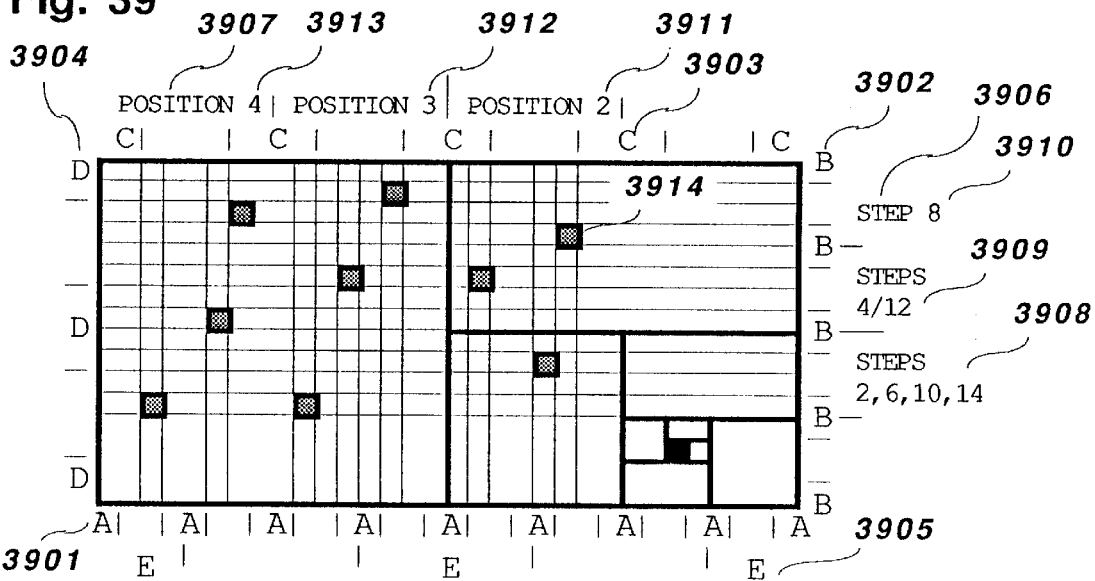

Fig. 41A

| instance | binary | input transitions 3 \| 2 \| 1 | reflected binary (primary form) |
|---|---|---|---|
| 0 | 0000 |   | 0000 |
| 1 | 0001 |   | 0001 |
| 2 | 0010 |         \|     \| 1 | 0011 |
| 3 | 0011 |         \|     \| 1 | 0010 |
| 4 | 0100 |         \| 2 \| | 0110 |
| 5 | 0101 |         \| 2 \| | 0111 |
| 6 | 0110 |         \| 2 \| 1 | 0101 |
| 7 | 0111 |         \| 2 \| 1 | 0100 |
| 8 | 1000 | 3 \|     \| | 1100 |
| 9 | 1001 | 3 \|     \| | 1101 |
| 10 | 1010 | 3 \|     \| 1 | 1111 |
| 11 | 1011 | 3 \|     \| 1 | 1110 |
| 12 | 1100 | 3 \| 2 \| | 1010 |
| 13 | 1101 | 3 \| 2 \| | 1011 |
| 14 | 1110 | 3 \| 2 \| 1 | 1001 |
| 15 | 1111 | 3 \| 2 \| 1 | 1000 |

| attributes: | location | configuration | size | condition |
|---|---|---|---|---|
| | | Transaction Description 4201 / 4200 / 4202 / 4203 / 4204 | | |
| properties: 4205 | east west | 2 bedroom 3 bedroom | >1500sf <1500sf | like new needs work |
| instance value: "current" unit market price 4206 4207 | | | | |

SIZE 4203

|  | <1500SF | | >1500SF | | |
|---|---|---|---|---|---|
| LIKE NEW | west 3BR <1500sf like new | east 3BR <1500sf like new | east 3BR >1500sf like new | west 3BR >1500sf like new | 3BR |
| | west 2BR <1500sf like new | east 2BR <1500sf like new | east 2BR >1500sf like new | west 2BR >1500sf like new | 2BR |
| NEEDS WORK | west 2BR <1500sf needs work | east 2BR <1500sf needs work | east 2BR >1500sf needs work | west 2BR >1500sf needs work | 2BR |
| | west 3BR <1500sf needs work | east 3BR <1500sf needs work | east 3BR >1500sf needs work | west 3BR >1500sf needs work | 3BR |
| | WEST | EAST | | WEST | |

CONDITION 4204     CONFIGURATION 4202     4210

LOCATION 4201

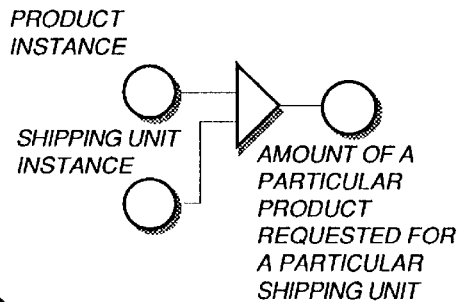

Fig. 44A

PRODUCT INSTANCE

SHIPPING UNIT INSTANCE

AMOUNT OF A PARTICULAR PRODUCT REQUESTED FOR A PARTICULAR SHIPPING UNIT

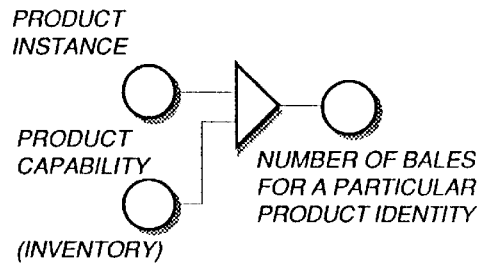

Fig. 44B

PRODUCT INSTANCE

PRODUCT CAPABILITY (INVENTORY)

NUMBER OF BALES FOR A PARTICULAR PRODUCT IDENTITY

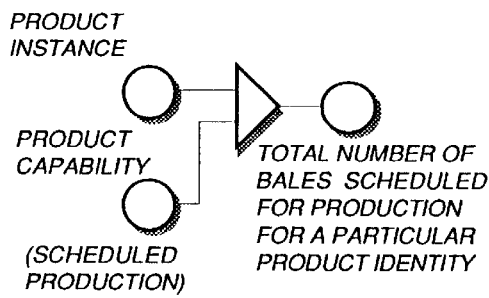

Fig. 44C

PRODUCT INSTANCE

PRODUCT CAPABILITY (SCHEDULED PRODUCTION)

TOTAL NUMBER OF BALES SCHEDULED FOR PRODUCTION FOR A PARTICULAR PRODUCT IDENTITY

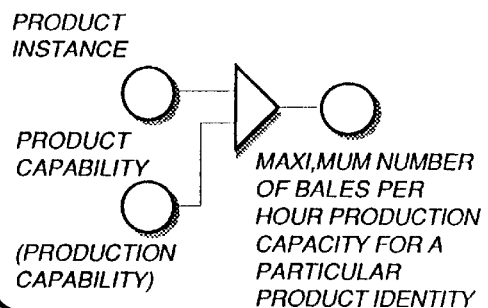

Fig. 44D

PRODUCT INSTANCE

PRODUCT CAPABILITY (PRODUCTION CAPABILITY)

MAXI,MUM NUMBER OF BALES PER HOUR PRODUCTION CAPACITY FOR A PARTICULAR PRODUCT IDENTITY

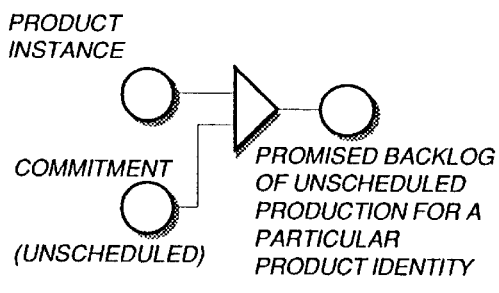

Fig. 44E

PRODUCT INSTANCE

COMMITMENT (UNSCHEDULED)

PROMISED BACKLOG OF UNSCHEDULED PRODUCTION FOR A PARTICULAR PRODUCT IDENTITY

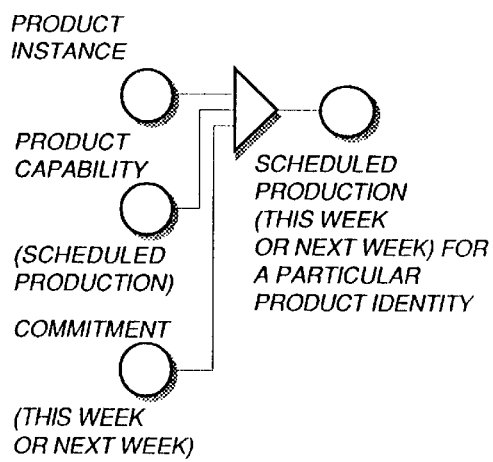

Fig. 44F

PRODUCT INSTANCE

PRODUCT CAPABILITY (SCHEDULED PRODUCTION)

COMMITMENT (THIS WEEK OR NEXT WEEK)

SCHEDULED PRODUCTION (THIS WEEK OR NEXT WEEK) FOR A PARTICULAR PRODUCT IDENTITY

POLYMORPHIC NETWORK METHODS AND APPARATUS

RELATED PATENT

This patent stems from a continuation application of U.S. patent application Ser. No. 08/218,333, filed Mar. 28, 1994, entitled POLYMORPHIC NETWORK METHODS AND APPARATUS, which will issue as U.S. Pat. No. 5,680,634 on Oct. 21, 1997, entitled FIXED INTERCONNECTION NETWORK METHOD AND APPARATUS FOR A MODULAR MIXED-RESOLUTION, N-DIMENSIONAL CONFIGURATION CONTROL MECHANISM. The benefit of the earlier filing date of the parent patent application is claimed for common subject matter pursuant to 35 U.S.C. § 120 which is a continuation-in-part patent application of U.S. patent application having Ser. No. 07/642,508, filing date of Jan. 16, 1991, entitled, MIXED-RESOLUTION, N-DIMENSIONAL OBJECT SPACE METHOD AND APPARATUS, to Estes and Walker, now U.S. Pat. No. 5,301,284, with issue date of Apr. 5, 1994. The benefit of common matter is claimed pursuant to 35 U.S.C. § 120.

BACKGROUND OF THE INVENTION

This invention relates to the field of combinatorial computing, and more particularly to polymorphic networks.

DESCRIPTION OF THE RELEVANT ART

In a paper by Mark Wells, "Aspects of Language Design for Combinatorial Computing," *IEEE Transactions on Electronic Computers*, August, 1964, pp. 431–438, a large and growing class of computations which are combinatorial rather than arithmetic in nature is characterized as manipulations with sets, patterns and labels rather than with numbers. "Historically, both machines and languages have been inadequate for combinatorial computing." Whereas for external user interfaces, the primary consideration is convenience, the primary consideration for machine design is performance. According to Wells, the user "wishes to have the facility to perform the required operations and produce his results as quickly as possible. Thus, there arises an important interaction between the machine and language design."

There exists a long-felt need for an implementation methodology which achieves modular continuity at all levels of expression, including high-level problem formulation, internal representation, and low-level execution. Allen Newell in his paper "On Programming a Highly Parallel Machine to be an Intelligent Technician," in *Proceedings of the Western Joint Computer Conference, IRE-AIEE-ACM*, 1960, pp. 267–282, states "We need a 'problem-oriented machine' instead of a 'machine-oriented machine'—and such a machine, truly conceived, is equivalent to an intelligent assistant." Newell continues: "In current machines and coding a large discontinuity exists between the machine level and all structures built up from this level." Newell further suggests that continuity between the machine level and all structures built up from it can be achieved in "problem-oriented machines" by satisfying a "principle of homogeneity, according to which a module and a higher unit cannot be distinguished by any of the conventions for dealing with them." The principle of homogeneity requires a correspondence between what is to be represented in a machine (external view) and the corresponding form in the machine (internal view). Ideally, the principle of homogeneity suggests a further correspondence between the internal representation and the corresponding form of the machine. The present invention demonstrates continuity between the machine level and all structures built up from this level in a manner not taught by the prior art.

Polymorphism is a fundamental property which generally refers to the capability of assuming different forms. Prior art general-purpose computers whose function can be radically changed by changing their microcode, e.g., machine-level instruction set, are examples of one form of polymorphism. However, a significant performance penalty usually results when there is a mismatch between the structure of a problem and the communication structure of a fixed, underlying architecture. Siegel et al., in "A Survey of Interconnection Methods for Reconfigurable Parallel Processing Systems," *Proceedings National Computer Conference*, 1979, pp. 529–543, defines a system as being " . . . reconfigurable if it may assume several architectural configurations, each of which is characterized by its own topology of activated interconnections between modules." Peter J. Hilbers, *Processor Networks and Aspects of the Mapping Problem*, Cambridge University Press, New York, 1991 describes an implementation of a collection of communicating processes on a processor network wherein " . . . the potential parallelism of an algorithm is not fixed beforehand but is determined dynamically, according to the needs of the computation." Hilbers views both algorithms and processor networks as graphs. "The algorithm is regarded as a possibly varying graph, called the computation graph . . . the fixed graph corresponding to the processor network is called the implementation graph . . . Due to these abstractions an implementation graph of an algorithm on a processor network may be viewed as a mapping between two graphs," creating a level of indirection, i.e., mapping the discontinuity, between the problem formulation space (the algorithm graph) and the problem execution space (the network graph). French and Taylor, in their paper "A Self-Reconfiguring Processor," *Proceedings IEEE Workshop on FPGAs for Custom Computing Machines*, Apr. 5, 1993, discuss the use of electronically reconfigurable gate array (ERCGA) networks to accomplish a form of partial dynamic reconfiguration—the ability to modify random logic circuits by changing the "program" or configuration loaded on power up. According to French and Taylor, . . . the major problem with this approach is the potential for thrashing . . . so as to make program start up times significant in the total execution time . . . In order to make a reconfigurable system more useful it is necessary to make it transparent to the programmer. This implies a system that can create and destroy blocks of circuitry as it runs in order to improve the performance of commonly accessed, time-critical functions. While a code segment is being interpreted, a hardware description that implements it is being formed. The system is similar to a cache for commonly used elements of software.

Murdocca in his back, *A Digital Design Methodology for Optical Computing*, MIT Press, Cambridge, Mass., 1990, pp. 93–94, observes that there is no fundamental reason for processor configuration to remain fixed throughout a computation when an externally precomputed control sequence can be "played back" by a configuration control mechanism. According to Murdocca: . . . fixed interconnects logic is underutilized. If the wires in electronic circuits could be changed on demand, then smaller circuits could be made to yield the same performance as larger circuits. There are probably no reasonable means for doing this in electronics, so we may as well put the idea aside as a pipedream . . . In the long run, the potential for a machine that dynamically reconfigures itself based on the state of the machine rather than in a predetermined control sequence is interesting, but for the most part is currently unexplored, so there is a great opportunity for progress in this area.

FIG. 1 illustrates a prior art set of linear constraint relationships expressed by forming a polytope of feasible solutions, described in U.S. Pat. No. 4,744,027, entitled METHODS AND APPARATUS FOR OPTIMIZING SYSTEM OPERATIONAL PARAMETERS, issued to Bayer et al., and assigned to AT&T Bell Laboratories, for addressing resource allocation problems which, for example, are posed as linear programming models. The solutions of a set of linear constraint relationships in such models are expressed by forming a polytope of feasible solutions, with every point within the polytope and on its surface representing a permissible state of the system. Tasks with more than three variables form higher dimensional polytopes contained within a multidimensional hyperspace, although " . . . the representation is actually shown in three dimensions for lack of means to represent higher dimensions."

The prior art iterative procedure starts from an initial state of the system to be optimized and produces a sequence of tentative states. It halts when a selected suitable stopping criterion is satisfied, and selects the most recent tentative state as the operating state of the system. In a linear problem formulation space, the "lack of means to represent higher dimensions" creates an immediate discontinuity between problem specification and problem space formulation.

Janos Sztipanovits, in his paper "Towards Structural Adaptivity," *Proceedings ISCAS'* 88, IEEE Press, 1988, pp. 2359–2366, describes the design of parametrically adaptive systems (PAS) as comprising three steps: (1) selection of the structure of the processing system with adjustable parameters, (2) selection of the model of the environment (signal model or plant model) and design of environmental change identification algorithms, and (3) design of the adaptation algorithm which implements parametric adjustments. The PAS approach is known to be severely limited in abruptly changing, unstable environments. According to Sztipanovits, the theory and implementation technology of structurally adaptive systems (SAS), such as variable structure controllers, is still in its infancy. "Adaptive systems are usually defined in the framework of a specific decomposition where the processing system is conceptually separated from the adaptation algorithm." The adaptation process should be able to modify the structure of the processing system as well as its parameters, driven by changes in the environmental model.

Apparently this process requires the symbolic representation of the structure of the processing system itself. In other words, SAS involves "self-modeling" since not only the external environment, but also the structure of the processing system (and all of its possible alternatives), has to be represented for the adaptation process . . . The implementation of dynamically reconfigurable processing systems is a non-trivial task. Further difficulties are caused by two common requirements: (1) adaptive systems typically operate in real-time environments, and (2) the high computation load often requires the application of parallel computing systems . . . The tasks of modeling the environment, the processing system, and their relationships constitute a complex representation problem.

U.S. Pat. No. 4,888,692, entitled REAL-TIME SCHEDULING SYSTEM, issued Dec. 19, 1989 to Subhash Gupta and assigned to Texas Instruments, is a prior art example of a parametrically adaptive systems (PAS) for controlling the operation of interrelated machines which perform various manufacturing processes defining a process flow. "The number of details and computations involved in completely scheduling a large manufacturing facility are enormous. No exact mathematical solution can, in general, be generated for such a facility." Machine profiles and profiles which represent relationships between processes of a process flow are used to predict events relating process profiles to the operation of machines for particular time periods. The predicted events are scheduled by assigning processes to machines and scheduling machine operations based on the current state of the process and the contents of an appropriate profile. Local, real-time machine scheduling decisions are made within the context of a statically-computed, global, steady-state model of the manufacturing process. The global plan must be recalculated when there is a change in process flow or machine availability.

Kartashev and Kartashev, in their paper "Problems of Designing Supersystems with Dynamic Architectures," *IEEE Transactions on Computers*, Vol. C-29, No. 12, December 1980, pp. 1114–1132, consider concepts related to designing computational systems with dynamic architecture. Redistributing hardware resources included in the system may maximize the number of parallel information streams handled by the available resources. This implies that the system must be capable of switching its resources into different types of architecture. By reconfiguring resources into different types of architecture, idle time and resource complexities may be minimized. A system capable of mixed architecture types assumes coresidence of various combinations of the possible configurations.

FIG. 2 shows a prior art cross-point switching matrix, described in U.S. Pat. No. 4,630,045, entitled CONTROLLER FOR A CROSSPOINT SWITCHING MATRIX, issued Dec. 16, 1986 to Christos J. Georgiou and assigned to IBM, in accordance with prior art methods of controlling electronic elements configured as a plurality of network modules. A controller is disclosed which interprets a request for connection or disconnection, determines if connection or disconnection is possible, selects a path through the matrix, and sends control signals to the matrix. Rather than a single cross-point switching matrix, an array of cross-point switching matrices allows the use of smaller sized switching matrices. This array can be designed to be fault tolerant if one of the matrices fails. Electronic elements are configured in a parallel/pipeline architecture. The pipeline characteristic allows one step of a first request to be serviced simultaneously with another step of a second request. The parallel characteristic within segments of the pipeline allow several substeps of a step to be performed concurrently.

FIG. 3 illustrates a prior art reconfigurable register, described in U.S. Pat. No. 4,272,829, entitled RECONFIGURABLE REGISTER AND LOGIC CIRCUITRY DEVICE FOR SELECTIVE CONNECTION TO EXTERNAL BUSES, issued Jun. 9, 1981 to Schmidt et al., and assigned to NCR Corporation, capable of use in various components of a computer for enabling plural data buses to be selectively connected in various configurations to the data inputs and outputs of the registers. Data going into the register from plural buses may be combined by logic gates prior to being stored in the register. Alternatively, the register may comprise plural registers with each register receiving data from and conveying data to a different data bus.

FIG. 4 shows a prior art reconfigurable physical mesh connection, described in U.S. Pat. No. 5,038,386, entitled POLYMORPHIC MESH NETWORK IMAGE PROCESSING SYSTEM, issued Aug. 6, 1991 to Hungwin Li and assigned to IBM, used to form software-selectable element connection patterns. "Overall programming control and housekeeping control is by host computer via bus." (col. 5 lines 37–39) Each element has four connections, one connection to each of the elements non-diagonal neighbors. The bit-mapped pattern values in a selected pattern register control element connections via a crossbar switch. The connection pattern may be reconfigured by programmatically manipulating bits in a pattern register or by loading a pattern selection register with a stored pattern. "There are occasions when it is necessary to close down processing to reload pattern registers . . . It is (a) relatively significant effort to load the pattern registers." (col. 9 lines 9–14)

FIG. 5 illustrates a prior art concurrent computer architecture, described in U.S. Pat. No. 5,020,059, entitled RECONFIGURABLE SIGNAL PROCESSOR, issued May 28, 1991 to Gorin et al., and assigned to AT&T Bell Laboratories, disclosing an interconnection scheme among the processing elements of a concurrent computer architecture which realizes, through processing element reconfiguration, both fault tolerance and a variety of processing topologies, under control of a remote host. Concurrent computer architectures are configurations of processors under a common control interconnected to achieve parallel processing of information. Pattern recognition is one class of problems to which concurrent computer architectures are especially applicable. Pattern recognition is the comparison of an unknown signal pattern to a set of reference patterns to find a best match. Applications include speech recognition, speaker recognition, shape recognition of imaged objects, and identification of sonar and radar sources. The Gorin architecture provides an interconnected lattice array of processing elements which can be reconfigured under software control into any of a multiplicity of processing nodes as binary tree and linear systolic array topologies.

Hwang and Briggs, in *Computer Architecture and Parallel Processing*, McGraw-Hill, New York, 1984, pp. 779–787, describe reconfigurable processor arrays as specialized processors which often use different interconnection structures to implement different algorithms. For example, a mesh is used for dynamic programming, the binary tree is used for sorting, and the double-rooted tree is used for searching. Although a bus can link several differently structured multiprocessors, the bus bottleneck is quite serious. "What is needed is a more polymorphic multiprocessor that does not compromise the benefits of VLSI technology."

A configurable processor array is constructed with three types of components: a collection of processing elements, a switch lattice, and an array controller. The switch lattice is the most important component and also the main source of differences among reconfigurable processor arrays. Each switch in the lattice contains a local memory capable of storing several configuration settings, i.e., templates. A configuration setting enables the switch to establish a direct static connection between two or more of its incident data paths. The controller is responsible for loading the switch memory. The switch memory is loaded preparatory to processing and in parallel with the processing element program memory loading. Typically, according to Hwang and Briggs, program and switch settings for several phases can be loaded together. "The major requirement is that the local configuration settings for each phase's interconnection pattern be assigned to the same memory location in all switches." When a given interconnection pattern is embedded in a programmable switch lattice, the switch lattice "hosts" the given pattern. "By integrating programmable switches with the processing elements, the computer achieves a polymorphism of interconnection structure that also preserves locality." In addition to responding to problems of different sizes and characteristics, algorithms can be composed that exploit different interconnection patterns. The flexibility of integrated switches also provides substantial fault tolerance.

FIG. 6 shows a prior art processor architecture, described in U.S. Pat. No. 4,943,909, entitled COMPUTATIONAL ORIGAMI, issued Jul. 24, 1990 to Alan Huang and assigned to AT&T Bell Laboratories, that permits the realization of any computing function with a regular array of interconnected processing elements. One or more actual processing elements are conceptually scanned over the array through time multiplexed controls to emulate the entire conceptual array and thus perform the algorithm. The scheduling of the processing and communications functions performed by the processing element is dictated by the conceptual array layout of the algorithm. Since the effective depth, i.e., the effective number of rows, is variable and controllable, rather than fixed, the structure is decoupled, at least in a limited sense, from the algorithm being implemented. Although an entire array can be "folded" into a single processor, the degree of "folding" is selectable and can be a function of the algorithm realized, the desired processing speed, the hardware available, or some combination of these elements. Although "realization of any computing function with a regular array of interconnected processing elements" is accomplished in a manner which permits the size of the problem to be greater than the actual number of processing elements, having to visit inactive areas when scanning arrays "due to the absence of element addressability" causes execution-level inefficiencies. Furthermore, the absence of element addressability precludes the formulation of multiple, concurrent problem spaces.

Trimberger, in the book *Field-Programmable Gate Array Technology*, Kluwer Academic Publishers, Boston, 1994, pp. 2–4, defines the Field-Programmable Gate Array (FPGA) as a general-purpose, multi-level programmable logic device that is customized in the package by end users. FPGAs are composed of blocks of logic connected with a programmable interconnect. The programmable interconnect between blocks allows users to implement multi-level logic. The size, structure and number of blocks, as well as the amount and connectivity of the interconnect, vary considerably among FPGA architectures. According to Trimberger, this difference in architectures is driven by different programming technologies and different target applications of the parts. An architectural organization that works well with one programming technology typically does not work well with another, resulting in a segmentation by programming style and device architecture. In a chapter of the above-referenced book edited by Hartmann, a multi-array style of architecture is characterized as one of the common architectural trends. Multi-array architectures comprise groups of logic elements, called macrocells, interconnected with a programmable routing structure called the programmable interconnect array. The process of physically loading previously compiled programming data into FPGA devices is called configuration. Initialization occurs immediately after configuration. The initialization procedure resets registers, enables I/O pins, and causes the device to begin operating as a logic device. Configuration typically occurs immediately after the device is powered up but may also occur upon command. Real-time reconfiguration is performed by forcing the device into command mode with a device pin, loading different, Previously compiled, programming data, re-initializing the device, and resuming user-mode operation. The entire reconfiguration process requires less than 100 milliseconds in at least one vendor's SRAM-equipped device and can be used to dynamically reconfigure an entire system.

FIG. 7 illustrates prior art interconnections between a plurality of electronically reconfigurable gate arrays (ERCGAs), described in U.S. Pat. No. 5,036,473, entitled METHOD OF USING ELECTRONICALLY RECONFIGURABLE LOGIC CIRCUITS, issued Jul. 30, 1991 to Butts and Batcheller and assigned to Mentor Graphics Corporation, for a method of determining and configuring interconnections between a plurality of ERCGAs to realize electronic representations of digital logic networks of arbitrary size that are too large to be configured in a single ERCGA device. Butts and Batcheller additionally define terms related to ERCGA systems.

To "realize" something is to make it real or actual. To realize all or part of a digital logic network or design is to cause it to take actual operating form without building it permanently.

An "input design" is the representation of the digital logic network which is to be realized. It contains primitives representing combinational logic and storage, devices, and nets representing connections among primitive input and output pins.

To "configure" a logic chip or interconnect chip is to cause its internal logic functions and/or interconnections to be arranged in a particular way, typically determined by the input design.

To "convert" a design is to convert its representation into a file of configuration data, which is used to realize a design in an operating form.

To "operate" a design is to cause hardware configured according to the input design's representations to actually operate.

An "interconnect" is a reconfigurable means for passing logic signals between a large number of chip I/O pins as if the pins were interconnected with wires. French and Taylor, "A Self-Reconfiguring Processor," *Proceedings IEEE Workshop on FPGAs for Custom Computing Machines*, Apr. 5, 1993, (French and Taylor) characterizes "partial dynamic reconfiguration," or the ability to modify random logic circuits by changing the "program" or configuration loaded on power up, as being possible at least in theory. According to French and Taylor, "the major problem with this approach is the potential for thrashing . . . so as to make program start up times significant in the total execution time." In order to make a reconfigurable system more useful it is necessary to make it transparent to the programmer. This implies a system that can create and destroy blocks of circuitry as it runs in order to improve the performance of commonly accessed, time-critical functions. While a code segment is being interpreted, a hardware description that implements it is being formed. The system is similar to a cache for commonly used elements of software. French and Taylor further note that "automatic" reconfiguration is complex— "the processor itself must perform many of the optimizations that would be more conventionally handled by a compiler." A processor with a "hardware caching mechanism" in addition to its normal execution unit also has the potential for high levels of parallelism. "Better support for the use of several FPGAs as a single system is also required . . . (and) support for loading and retrieving large amounts of data to and from the FPGA quickly is required."

Peter J. Hilbers, *Processor Networks and Aspects of the Mapping Problem*, Cambridge University Press, New York, 1991 describes an implementation of a collection of communicating processes on a processor network wherein:

" . . . the potential parallelism of an algorithm is not fixed beforehand but is determined dynamically, according to the needs of the computation. Consequently, the number of processes can be much larger than the actual number of processing nodes . . . The only way to formulate programs as a large number of communicating processes seems to be to introduce some kind of regularity. Or, as M. Rem stated in 1979: 'A hierarchy is the only way to build complex systems with a high confidence level.' Typically, such (regular) structures are lines (arrays), trees, and meshes (matrices)."

At this mid-level of prior art problem formulation, Hilbers views both the algorithms and processor networks as graphs. "The algorithm is regarded as a possibly varying graph, called the computation graph . . . the fixed graph corresponding to the processor network is called the implementation graph . . . Due to these abstractions an implementation graph of an algorithm on a processor network may be viewed as a mapping between two graphs," which creates a level of indirection between the problem formulation space (the graph) and the problem execution space (the network).

FIG. 8 shows a prior art representation of an N-dimensional hypercube, described in a paper by Chen and Shin, "Processor Allocation in an N-Cube Multiprocessor Using Gray Codes," *IEEE Transactions on Computers*, Vol. C-36, No. 12, December 1987, pp. 1396–1407, for illustrating an approach to the processor allocation problem in an N-dimensional hypercube, or an n-cube, multiprocessor, wherein the main objective is to maximize the utilization of available resources as well as minimize the inherent system fragmentation. Processor allocation in an n-cube multiprocessor comprises two steps: first, determination of the size of a subcube to accommodate a task request and, second, location of a subcube of the size required within the n-cube multiprocessor. The node addressing scheme suggested by Chen and Shin is a gray code which permits efficient subcube recognition. Node addresses are represented by strings whose elements are members of the ternary symbol set $\{0,1*\}$, where * is a "don't care" symbol. The number of elements in a node address denotes the dimension or size of the binary n-cube. Accordingly, the number of "don't care" elements in a node address denotes the dimension or size of the subcube. "Due to the special structure of an n-cube, it is very difficult to detect the availability of a subcube of required size, and merge released subcubes of small sizes into a larger subcube." Chen and Shin's " . . . approach to the processor allocation problem is mainly based on a linear search of a list of allocation bits."

The ternary symbol set is representative of conventional notions of multivalued logic. K. C. Smith, in "The Prospects for Multivalued Logic: A Technology and Applications View," *IEEE Transactions on Computers*, Vol. C-30, No. 9, September 1981, pp. 619–634 defines a multivalued signal in a given radix as an ordered set of values of a signal variable, such as voltage, current, or charge. "Any discussion of multivalued logic (MVL) in a variety of radices and technologies requires an extensible notation." A positional notation, for example, can be referenced to a stated relationship between the values of the logical and physical variables. One approach to MVL circuit design presented by Smith emphasizes the binary attributes of MVL by employing, within a multivalued gate, a multiplicity of comparators to decompose a multivalued input signal into a multiwire binary code. The present invention permits a novel implementation of mixed-radix expressions.

FIGS. 9A–9C illustrates a prior art representation of a mixed-radix, node addressing scheme, described by Bhuyan and Agrawal in their paper, "Generalized Hypercube and Hyperbus Structures for a Computer Network," *IEEE Transactions on Computers*, Vol. C-33, No. 4, April 1984, pp. 323–333, for use in designing a generalized hypercube (GHC) network. In a GHC network the number of links per node, i.e., the degree of a node, may differ. A particular GHC topology connecting a number of processing elements to a number of memory modules, for example, can be realized as a multistage network comprising an ordered collection of crossbar modules. In another example, a particular GHC topology connecting a number of buses to a number of processors is realized by connecting each processor to two adjoining buses, running in different dimensions of the generalized hypercube.

FIG. 10A illustrates a prior art spatial light modulator (SLM), described in a paper by Chiou, "Photorefractive optical Interconnects," in *Optical Computing Hardware*, Jahns and Lee eds., Academic Press, Boston, 1994, pp. 249–285, for implementing a programmable matrix mask which controls a reconfigurable interconnection pattern.

FIG. 10B shows a prior art architectural model of a digital optical computer based on arrays of logic gates interconnected in free space, described in a book by Murdocca, *A Digital Design Methodology for Optical Computing*, MIT Press, Cambridge, Mass., 1990, pp. 93–94, wherein the processor configuration can be changed during a computation when an externally precomputed control sequence is "played back" by a configuration control mechanism.

FIG. 11A illustrates a prior art, digitally-addressed, flat-panel CRT, disclosed in U.S. Pat. No. 3,408,532, entitled ELECTRON BEAM SCANNING DEVICE, issued Dec. 6, 1965 to Hultberg et al., and assigned to Northrop Corporation, and further described in a paper by Goede, "A Digitally Addressed Flat-Panel CRT," in *IEEE Trans. Electron Devices*, vol. ED-20, November 1973, pp. 1052–1061. A series of apertured plates are sequentially activated by switching plate voltages to collectively generate an electron scanning beam. A method of addressing plates based on "half-splitting," also called "binary partitioning," allows alternate arrangements of patterns to be activated with two leads per plate. Additional leads combine the functions of several plates requiring fewer plates for decoding. At least one lead on each plate activates in sequence at least one "finger" of apertures for accelerating an electron potential from a cathode source through selected plate apertures to an anode target.

FIG. 11B shows a prior art, multidimensional, matrix addressing scheme for flat-panel displays, described in a paper by Kitai, "Three- and Four-Dimensional Addressing of Flat-Panel Displays," in *Proceedings of the SID*, Vol. 27 No. 4, 1986, pp. 309–312. Unlike the multiple-plate addressing scheme of FIG. 11A, the single-level addressing scheme of FIG. 11B groups pixels into a single array of large blocks. The layout for 4-D addressing shown in FIG. 11B permits each four-terminal pixel device to be addressed by four coordinates. Two coordinates address sets of wide rows and columns and two coordinates address sets of narrow rows and columns, wherein the ranges of the narrow rows or columns are within the domains of a wide row or column.

FIG. 12 illustrates a prior art cold-cathode field-induced electron emission device (FED), described in U.S. Pat. No. 5,075,595, entitled FIELD EMISSION DEVICE WITH VERTICALLY INTEGRATED ACTIVE CONTROL, issued Dec. 24, 1991 to Kane and assigned to Motorola, Inc. When configured as an array of FEDs, this invention can be employed as independently-controlled, picture elements (pixels) of flat-panel display. The FED of FIG. 12 integrates controlling sources, drivers, select logic, and interconnecting lines and paths in a single, addressable structure.

OBJECTS OF THE INVENTION

A general object of the invention is a network architecture which interconnects a plurality of inputs with a plurality of elements wherein each element may be a sensor, port, memory, pixel, processor, or any other device which may be addressed as a named element of a mixed-radix, N-dimensional object space.

Another object of the invention is a polymorphic network architecture having a configuration control mechanism for enabling a plurality elements arranged in a fixed physical configuration to be dynamically reconfigured into various logical configurations by manipulating the logical polarity of input circuits.

Another object of the invention is a network architecture that dynamically reconfigures itself based on the state of the machine as well as a predetermined control sequence, resulting in a form of self-organization for multiple object space configurations in a modular, polymorphic network which provides the "potential for a machine that dynamically reconfigures itself based on the state of the machine rather than in a predetermined control sequence."

A further object of the invention is to satisfy a "principle of homogeneity, according to which a module and a higher unit cannot be distinguished by any of the conventions for dealing with them." The principle of homogeneity requires a correspondence between what is to be represented in a machine (external view) and the corresponding form in the machine (internal view). Ideally, the principle of homogeneity suggests a further correspondence between the internal representation and the corresponding form of the machine.

Yet another object of the invention is an object space transition control mechanism which exploits the potential for multiple concurrent transition sequences within a particular Gray code.

SUMMARY OF THE INVENTION

According to the present invention, as embodied and broadly described herein, a configuration control mechanism for dynamically and logically renaming elements of a mixed-radix, N-dimensional object space is provided. A primary object of the invention is to provide a network architecture that dynamically reconfigures itself based on the state of the machine as well as a predetermined control sequence. Whereas prior art configuration control mechanisms typically load an externally precomputed control sequence from memory, the present invention dynamically generates a logical configuration in accordance with the method disclosed in a U.S. patent application by Estes and Walker entitled MIXED-RESOLUTION, N-DIMENSIONAL OBJECT SPACE METHOD AND APPARATUS, having Ser. No. 07/642,508 and filing date of Jan. 16, 1991, which is incorporated herein by reference.

An object frame is specified as input to the configuration control mechanism of the present invention, which responds logically by configuring the interconnections of the elements of a modular object space. The logical polarity of the inputs is manipulated by the configuration control mechanism to reconfigure the logical meaning of a common set of interconnections in response to object frame specifications. The configuration control mechanism comprises at least one module having a four-by-four array of elements, a first input circuit, a second input circuit, a third input circuit, and a fourth input circuit. Each element may be a sensor, port, memory, pixel, processor, or any other device which may be addressed as a named element of a mixed-radix, N-dimensional object space. The configuration control mechanism of the present invention allows one or a plurality of modules to be selected from a set of such modules. Accordingly, multiple levels of control can dynamically configure a plurality of modules, thereby implementing an important form of context transition control.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIGS. 1–12 refer to related prior art.

FIG. 1 is a prior art illustration of a set of linear constraint relationships expressed by forming a polytope of feasible solutions, described in U.S. Pat. No. 4,744,027, entitled METHODS AND APPARATUS FOR OPTIMIZING SYSTEM OPERATIONAL PARAMETERS, issued to Bayer et al., wherein every point within the polytope and on its surface represents a permissible state of the system. Tasks with more than three variables form higher dimensional polytopes contained within a multidimensional hyperspace, although ". . . the representation is actually shown in three dimensions for lack of means to represent higher dimensions."

FIG. 2 shows a prior art cross-point switching matrix, described in U.S. Pat. No. 4,630,045, entitled CONTROLLER FOR A CROSSPOINT SWITCHING MATRIX, issued Dec. 16, 1986 to Christos J. Georgiou and assigned to IBM, for controlling electronic elements configured as a plurality of network modules.

FIG. 3 illustrates a prior art reconfigurable register, described in U.S. Pat. No. 4,272,829, entitled RECONFIGURABLE REGISTER AND LOGIC CIRCUITRY DEVICE FOR SELECTIVE CONNECTION TO EXTERNAL BUSES, issued Jun. 9, 1981 to Schmidt et al., and assigned to NCR Corporation, that enables plural data buses to be selectively connected in various configurations to the data inputs and outputs of the registers.

FIG. 4 shows a prior art reconfigurable physical mesh connection, described in U.S. Pat. No. 5,038,386, entitled POLYMORPHIC MESH NETWORK IMAGE PROCESSING SYSTEM, issued Aug. 6, 1991 to Hungwin Li and assigned to IBM, for forming software-selectable element connection patterns.

FIG. 5 illustrates a prior art concurrent computer architecture, described in U.S. Pat. No. 5,020,059, entitled RECONFIGURABLE SIGNAL PROCESSOR, issued May 28, 1991 to Gorin et al. and assigned to AT&T Bell Laboratories, for an interconnection scheme among the processing elements of a concurrent computer architecture which realizes, through processing element reconfiguration, both fault tolerance and a variety of processing topologies, under control of a remote host.

FIG. 6 shows a prior art processor architecture, described in U.S. Pat. No. 4,943,909, entitled COMPUTATIONAL ORIGAMI, issued Jul. 24, 1990 to Alan Huang and assigned to AT&T Bell Laboratories, that permits the realization of any computing function with a regular array of interconnected processing elements.

FIG. 7 illustrates prior art interconnections between a plurality of electronically reconfigurable gate arrays (ERCGAs), described in U.S. Pat. No. 5,036,473, entitled METHOD OF USING ELECTRONICALLY RECONFIGURABLE LOGIC CIRCUITS, issued Jul. 30, 1991 to Butts and Batcheller and assigned to Mentor Graphics Corporation, for realizing electronic representations of digital logic networks of arbitrary size that are too large to be configured in a single ERCGA device.

FIG. 8 shows a prior art representation of an N-dimensional hypercube, described in a paper by Chen and Shin, "Processor Allocation in an N-Cube Multiprocessor Using Gray Codes," *IEEE Transactions on Computers*, Vol. C-36, No. 12, December 1987, pp. 1396–1407, for an approach to the processor allocation problem in an N-dimensional hypercube (or an n-cube) multiprocessor, wherein the main objective is to maximize the utilization of available resources as well as minimize the inherent system fragmentation.

FIG. 12 illustrates a prior art, a cold-cathode field-induced electron emission device (FED), described in U.S. Pat. No. 5,075,595, entitled FIELD EMISSION DEVICE WITH VERTICALLY INTEGRATED ACTIVE CONTROL, issued Dec. 24, 1991 to Kane and assigned to Motorola, Inc., which, when configured as an array of FEDs, can be employed as independently-controlled, picture elements (pixels) of flat-panel display.

FIGS. 13–17 illustrate modular object space configuration control.

FIGS. 13A–13E illustrate a logical configuration procedure in accordance with the method disclosed in a U.S. patent application by Estes and Walker entitled MIXED-RESOLUTION, N-DIMENSIONAL OBJECT SPACE METHOD AND APPARATUS.

FIGS. 16A–16F illustrate an embodiment of a novel configuration control mechanism which enables a plurality of elements arranged in a fixed physical configuration to be dynamically reconfigured into various logical configurations by manipulating the logical polarity of input circuits.

FIGS. 17A–17D illustrate various expressions of rules which relate polarity control switch states for modular object name space configurations, wherein the logical polarity of at least one input circuit 1301, 1302, 1303, 1304 is reversed by the configuration control mechanism.

FIGS. 18–20 refer to location of multiple object spaces in a module.

FIGS. 19A–19C further illustrate combinations of dissimilar object space configurations.

FIGS. 24–29 further illustrate element selection from each of the possible locations of six object space configurations in accordance with the method of the present invention.

FIGS. 30–32 illustrate a method and apparatus comprising a polymorphic, interconnection network module for concurrent, multiple element selection.

FIG. 32 illustrates a method for selecting one or concurrently selecting a plurality of elements of a polymorphic interconnection network module of the present invention.

FIG. 34 shows a modular arrangement comprising sixteen instances of the network module of FIG. 33, such that each modular instance can be interconnected as an element of a higher-level network, further satisfying a "principle of homogeneity, according to which a module and a higher unit cannot be distinguished by any of the conventions for dealing with them."

FIGS. 35–36 refer to object space configuration protocol.

FIG. 35 illustrates a dynamically-varying, internal representation protocol for the configuration control mechanism of the present invention.

FIGS. 36A–36D illustrate block diagrams of various encoder/decoder configurations which rely upon the protocol of the present invention for context-configuration, element-selection, and context-transition.

FIGS. 37–38 illustrate various Gray code transition sequences resulting from sixteen-element object space configurations, some of which exhibit the potential for multiple concurrent transition sequence control.

FIGS. 38A–38E illustrate the object space configurations of FIGS. 37A–37H grouped according to the characteristics of their respective Gray code transition sequences.

FIGS. 39–40 refer to methods of configuration control. The Gray code transition control method of FIG. 39 illustrates a further correspondence between the internal representation and the corresponding form of the machine demonstrating a principle of homogeneity wherein continuity of the present invention between the machine level and all structures built up from this level is disclosed in a manner not taught by the prior art.

FIG. 40 is a flow chart diagram illustrating a method of context configuration control.

FIGS. 41–46 illustrate exemplary applications. The external representations of higher-dimensional problem spaces of FIGS. 41B, 42B, and 43 comprise a novel form of multidimensional spreadsheet interface not taught in the prior art.

FIGS. 41A and 41B illustrate a mid-level application relating to conversion between binary and reflected binary internal representations. A mid-level application is referred to herein as corresponding to internal, system-level utility procedures which operate above lower-level machine functions to support higher-level procedures.

FIGS. 42A and 42B demonstrates a form of descriptive aggregation accomplished by formulating problems in higher-dimensional spaces, in a manner conceptually similar to the problem of canonical term reduction for minimizing binary logic functions of combinational circuits shown in FIGS. 41A–41B.

FIG. 43 comprises a partial view of a larger problem space, wherein an object space may be considered to scroll vertically, extending the visible range of particular attribute properties. The partial view of a larger problem space of FIG. 43 may also be perceived as an active, physically-configured window into a larger virtual object space.

FIGS. 44A–44L illustrate the formulation of problem-solving strategies which navigate the problem-space relationships of FIG. 43.

FIG. 46 shows an object space diagram describing two different perceptions of a single event, illustrating a method for resolving ambiguous expressions having "multiple concurrent meanings."

DETAILED DESCRIPTION OF THE PREFERRED EMBODIMENTS

Figure 1:
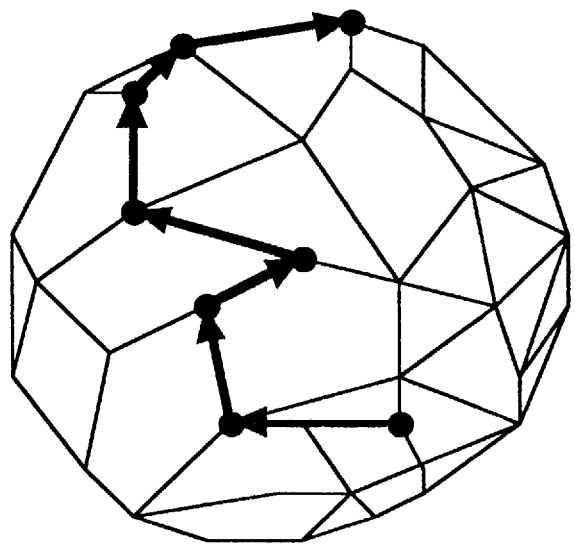
Figure 2:
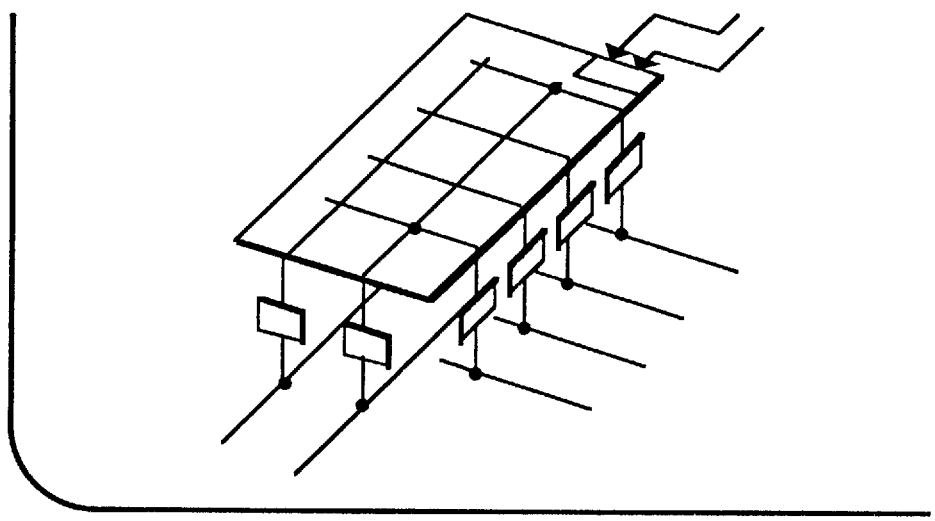
Figure 3:
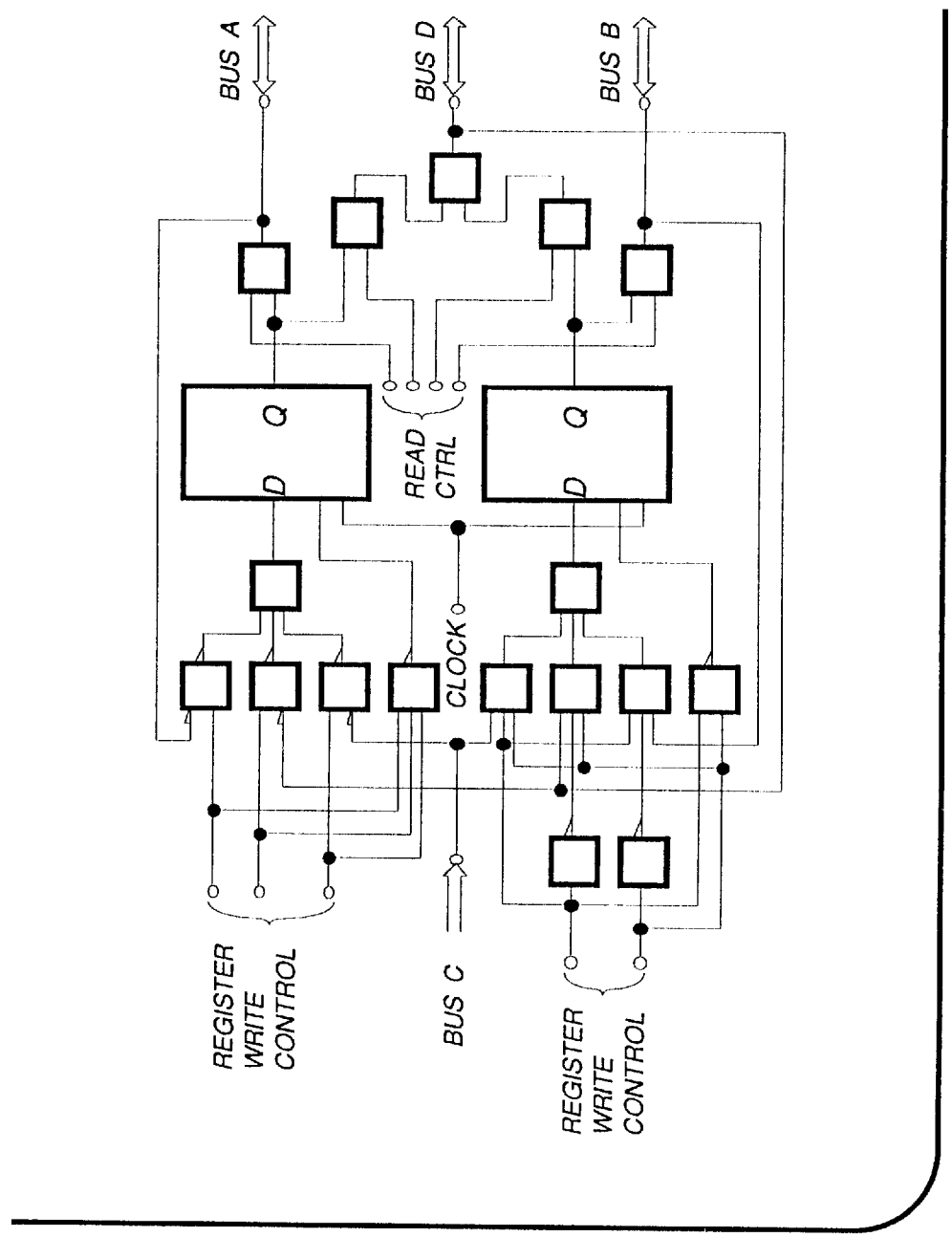

Reference now is made in detail to the present preferred embodiments of the invention, examples of which are illustrated in the accompanying drawings, wherein like reference numerals indicate like elements throughout the several views.

In the exemplary arrangement shown in FIGS. 13A–13E, a logical configuration procedure is shown in accordance with the method disclosed in a U.S. patent application by Estes and Walker entitled MIXED-RESOLUTION, N-DIMENSIONAL OBJECT SPACE METHOD AND APPARATUS.

Figure 13A:
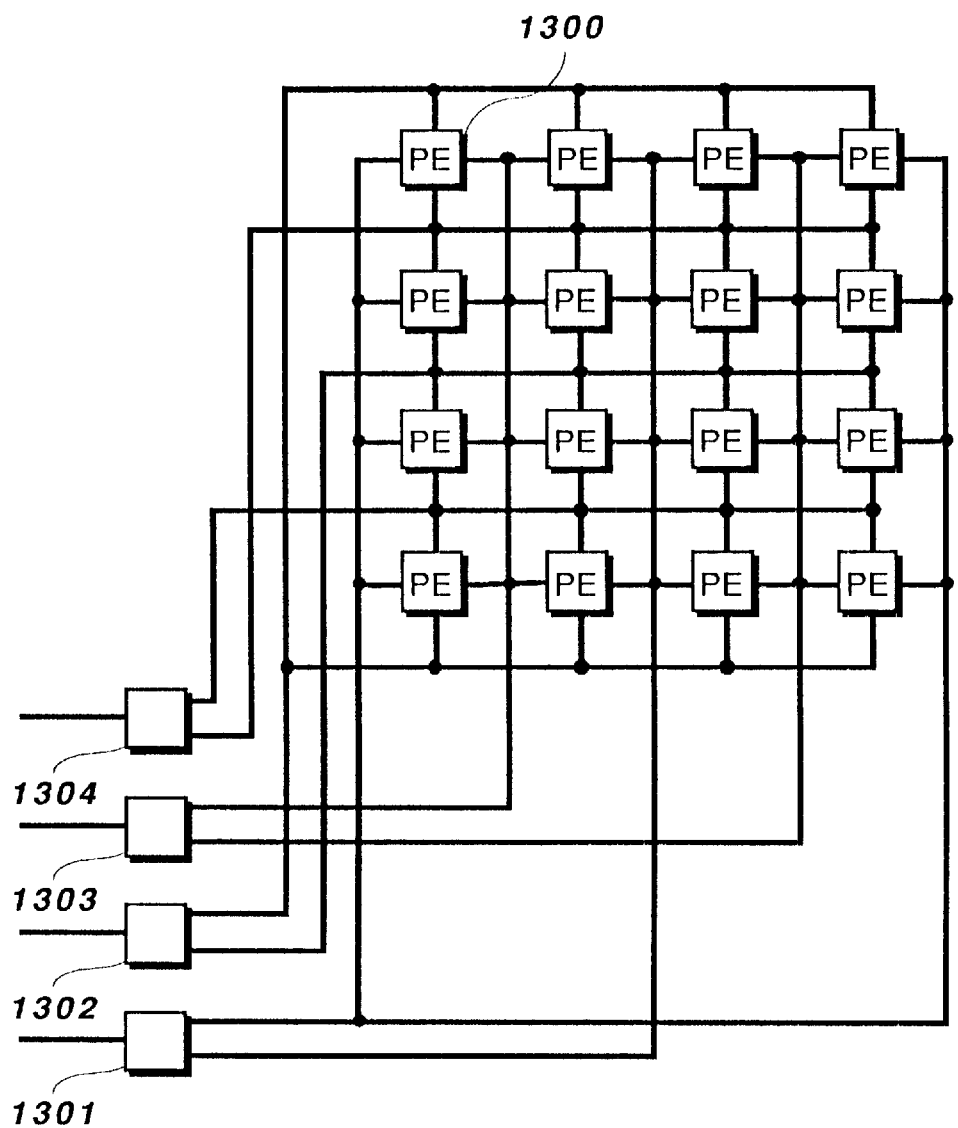

FIG. 13A illustrates the interconnection network of the present invention. A four-by-four array of elements 1300 is shown in FIG. 13A wherein each element 1300 is coupled to a first input circuit 1301, a second input circuit 1302, a third input circuit 1303, and a fourth input circuit 1304. Each input circuit 1301, 1302, 1303, 1304 of FIG. 13A is shown as a "dual-rail" input, having a unique first set of eight elements coupled to a particular input circuit for an input signal corresponding to a logical one and each input circuit 1301, 1302, 1303, 1304 also having a unique second set of eight elements coupled to a particular input circuit for an input signal corresponding to a logical zero. A logical name for selecting each element 1300 includes an input signal for each of four input circuits 1301, 1302, 1303, 1304 of FIG. 13A. Accordingly, only one element 1300 can be four-connected, selecting one of sixteen elements 1300 for a particular set of input signals for input circuits 1301, 1302, 1303, 1304. Elements 1300 of the sixteen-element array of FIG. 13A are electrically coupled to input circuits 1301, 1302, 1303, 1304 in accordance with the method disclosed in a U.S. patent application by Estes and Walker, referenced above, for generating a 4-dimensional object space with each dimension having one level of resolution, satisfying a principle of homogeneity that suggests a correspondence between an internal representation and the corresponding form of the machine.

FIG. 13B shows two sets of elements 1300 coupled to a first input circuit 1301 with each set comprising eight elements 1300. FIG. 13B also shows two, logically associated elements 1305 which correspond to a 1-dimensional object name space with one level of resolution generated by orthogonal reflection from left-to-right. A first set of eight elements 1300 of FIG. 13B comprises the two inner columns of a four-by-four array of elements 1300, referred to herein as a "vertical-inside pair." A second set of eight elements 1300 of FIG. 13B comprises the two outer columns of a four-by-four array of elements 1300, referred to herein as a "vertical-outside pair." In accordance with the method disclosed in a U.S. patent application by Estes and Walker, referenced above, the lower-rail of the dual-rail input 1301 is coupled to the first set of eight elements 1300 of FIG. 13B corresponding to the "vertical-inside pair" of columns of a four-by-four array of elements 1300. Further, the upper-rail of the dual-rail input 1301 is coupled to the second set of eight elements 1300 of FIG. 13B corresponding to the "vertical-outside pair" of columns of a four-by-four array of elements 1300. Accordingly, the "vertical-inside pair" of columns of a four-by-four array of elements 1300 are electrically coupled when a first input signal for input circuit 1301 corresponds to a logical zero and the "vertical-outside pair" of columns of a four-by-four array of elements 1300 are electrically coupled when a first input signal for input circuit 1301 corresponds to a logical one.

FIG. 13C shows two sets of elements 1300 coupled to a first input circuit 1302 with each set comprising eight elements 1300. FIG. 13C also shows four, logically associated elements 1306 which correspond to a 2-dimensional object name space with one level of resolution generated by a first orthogonal reflection from left-to-right and a second orthogonal reflection from bottom-to-top. A first set of eight elements 1300 of FIG. 13C comprises the two inner rows of a four-by-four array of elements 1300, referred to herein as a "horizontal-inside pair." A second set of eight elements 1300 of FIG. 13C comprises the two outer rows of a four-by-four array of elements 1300, referred to herein as a "horizontal-outside pair." In accordance with the method disclosed in a U.S. patent application by Estes and Walker, referenced above, the lower-rail of the dual-rail input 1302 is coupled to the first set of eight elements 1300 of FIG. 13C corresponding to the "horizontal-inside pair" of rows of a four-by-four array of elements 1300. Further, the upper-rail of the dual-rail input 1302 is coupled to the second set of eight elements 1300 of FIG. 13C corresponding to the "horizontal-outside pair" of rows of a four-by-four array of elements 1300. Accordingly, the "horizontal-inside pair" of rows of a four-by-four array of elements 1300 are electrically coupled when a first input signal for input circuit 1302 corresponds to a logical zero and the "horizontal-outside pair" of rows of a four-by-four array of elements 1300 are electrically coupled when a first input signal for input circuit 1302 corresponds to a logical one.

Figure 13D:
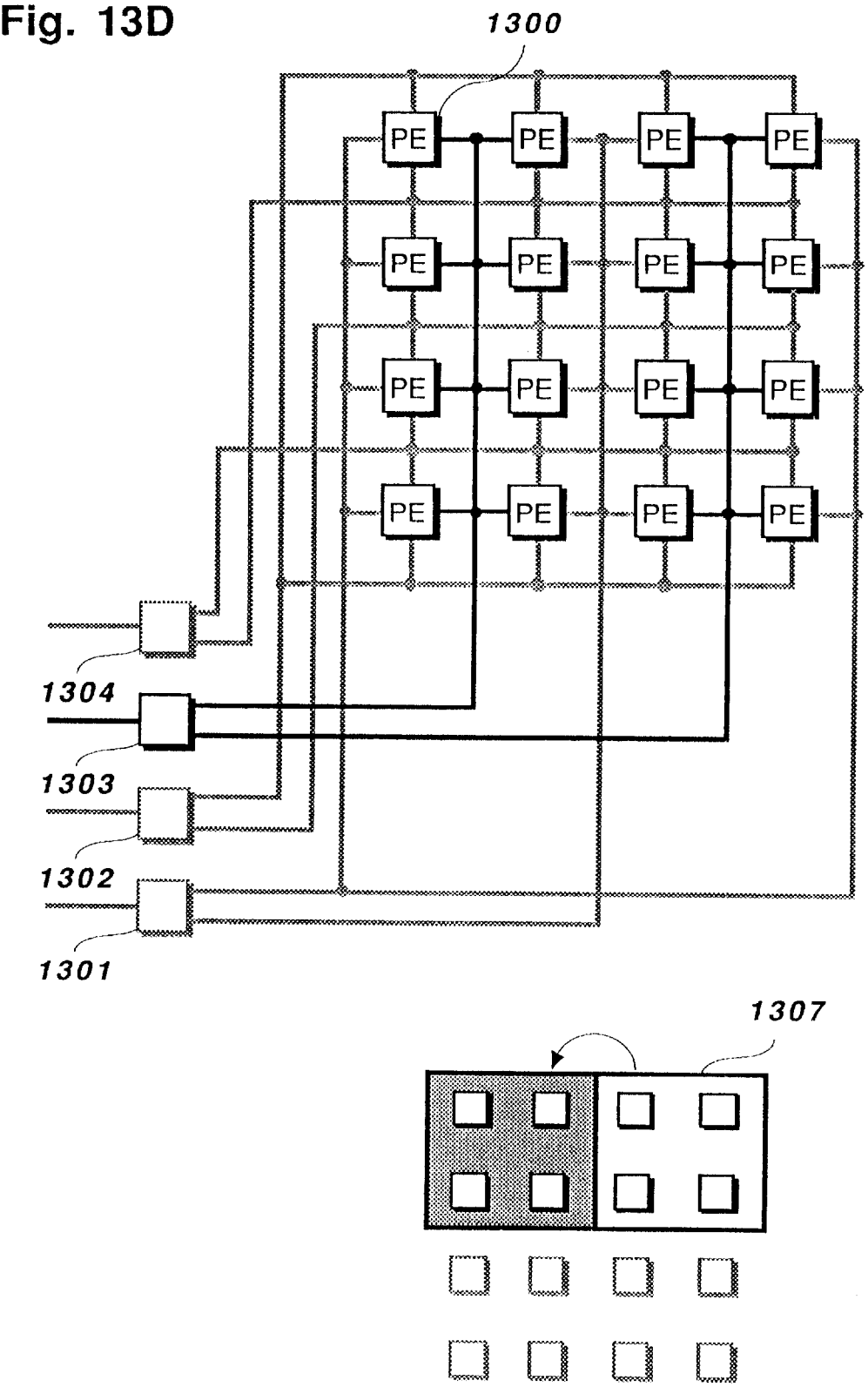

FIG. 13D shows two sets of elements 1300 coupled to a first input circuit 1303 with each set comprising eight elements 1300. FIG. 13D also shows eight, logically associated elements 1305 which correspond to a 3-dimensional object name space with one level of resolution generated by a first orthogonal reflection from left-to-right, a second orthogonal reflection from bottom-to-top, and a third orthogonal reflection from right-to-left. A first set of eight elements 1300 of FIG. 13D comprises the two right-most columns of a four-by-four array of elements 1300, referred to herein as a "vertical right pair." A second set of eight elements 1300 of FIG. 13D comprises the two left-most columns of a four-by-four array of elements 1300, referred to herein as a "vertical left pair." In accordance with the method disclosed in a U.S. patent application by Estes and Walker, referenced above, the lower-rail input of the dual-rail input 1303 is coupled to the first set of eight elements 1300 of FIG. 13D corresponding to the "vertical right pair" of columns of a four-by-four array of elements 1300. Further, the upper-rail input of the dual-rail input 1303 is coupled to the second set of eight elements 1300 of FIG. 13D corresponding to the "vertical left pair" of columns of a four-by-four array of elements 1300. Accordingly, the "vertical right pair" of columns of a four-by-four array of elements 1300 are electrically coupled when a first input signal for input circuit 1303 corresponds to a logical zero and the "vertical left pair" of columns of a four-by-four array of elements 1300 are electrically coupled when a first input signal for input circuit 1303 corresponds to a logical one.

FIG. 13E shows two sets of elements 1300 coupled to a first input circuit 1304 with each set comprising eight elements 1300. FIG. 13E also shows sixteen, logically associated elements 1305 which correspond to a 4-dimensional object name space with one level of resolution generated by a first orthogonal reflection from left-to-right, a second orthogonal reflection from bottom-to-top, a third orthogonal reflection from right-to-left, and a fourth orthogonal reflection from top-to-bottom. A first set of eight elements 1300 of FIG. 13E comprises the two top-most rows of a four-by-four array of elements 1300, referred to herein as a "horizontal top pair." A second set of eight elements 1300 of FIG. 13E comprises the two bottom-most rows of a four-by-four array of elements 1300, referred to herein as a "horizontal bottom pair." In accordance with the method disclosed in a U.S. patent application by Estes and Walker, referenced above, the lower-rail input of the dual-rail input 1304 is coupled to the first set of eight elements 1300 of FIG. 13E corresponding to the "horizontal top pair" of rows of a four-by-four array of elements 1300. Further, the upper-rail input of the dual-rail input 1304 is coupled to the second set of eight elements 1300 of FIG. 13E corresponding to the "horizontal bottom pair" of rows of a four-by-four array of elements 1300. Accordingly, the "horizontal top pair" of rows of a four-by-four array of elements 1300 are electrically coupled when a first input signal for input circuit 1304 corresponds to a logical zero and the "horizontal bottom pair" of rows of a four-by-four array of elements 1300 are electrically coupled when a first input signal for input circuit 1304 corresponds to a logical one.

In accordance with the method disclosed in a U.S. patent application by Estes and Walker, referenced above, FIGS. 14A–14I show the range of N-dimensional object name spaces which can be used to logically configure element 1300 name spaces in the interconnection network of FIG. 13. FIGS. 15A–15D show the range of N-dimensional object name spaces comprising sixteen elements 1300, whose external expression exceeds the bounds of a four-by-four array of elements 1300 in the interconnection network of FIG. 13.

Figure 14A:
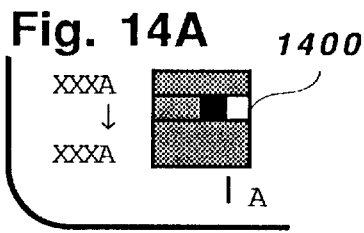
FIGS. 14A–14I show the range of N-dimensional object name spaces used to control modular name space configuration in the interconnection network of the present invention.

FIG. 14A shows a two-valued, 1-dimensional object name space configuration 1400.

Figure 14B:
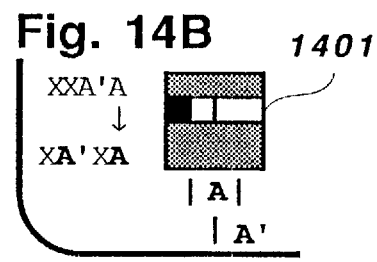

FIG. 14B shows a four-valued, 1-dimensional object name space configuration 1401.

Figure 14C:
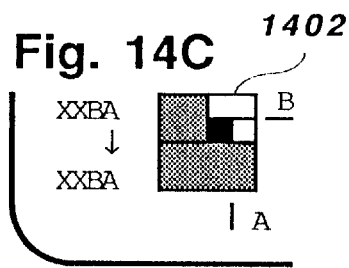

FIG. 14C shows a four-valued, 2-dimensional object name space configuration 1402 wherein each dimension has one level of resolution.

Figure 14D:
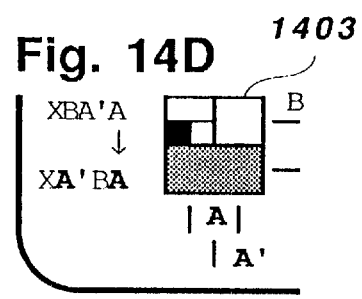

FIG. 14D shows an eight-valued, mixed-radix, 2-dimensional object name space configuration 1403 wherein a first dimension has two levels of resolution and a second dimension has one level of resolution.

Figure 14E:
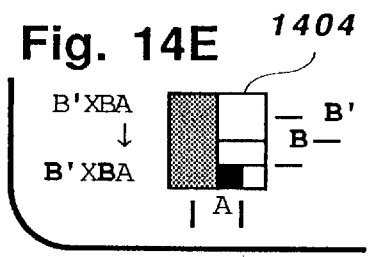

FIG. 14E shows an eight-valued, mixed-radix, 2-dimensional object name space configuration 1404 wherein a first dimension has one level of resolution and a second dimension has two levels of resolution.

Figure 14F:
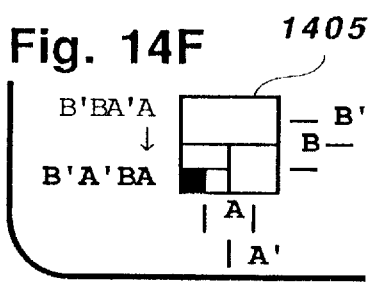

FIG. 14F shows a sixteen-valued, 2-dimensional object name space configuration 1405 wherein each dimension has two levels of resolution.

Figure 14G:
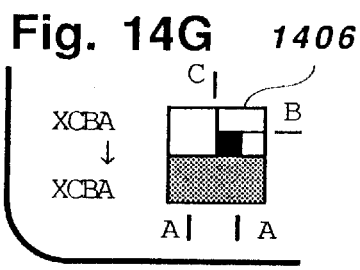

FIG. 14G shows an eight-valued, 3-dimensional object name space configuration 1406 wherein each dimension has one level of resolution.

Figure 14H:
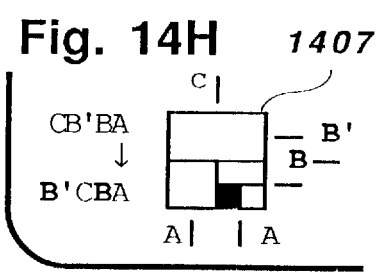

FIG. 14H shows a sixteen-valued, mixed-radix, 3-dimensional object name space configuration 1407 wherein a first dimension has one level of resolution, a second dimension has two levels of resolution, a third dimension has one level of resolution.

Figure 14I:
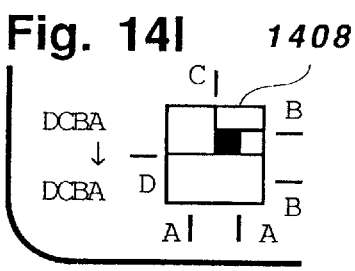

FIG. 14I shows a sixteen-valued, 4-dimensional object name space configuration 1408 wherein each dimension has one level of resolution.

Figure 15A:
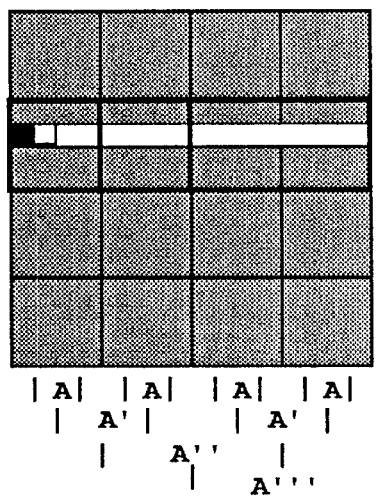
FIGS. 15A–15D show the range of N-dimensional object name spaces comprising sixteen elements, whose external expression exceeds the bounds of a four-by-four array of elements in an interconnection network of the present invention.

FIG. 15A shows a sixteen-valued, 1-dimensional object name space configuration wherein a first dimension has four levels of resolution.

Figure 15B:
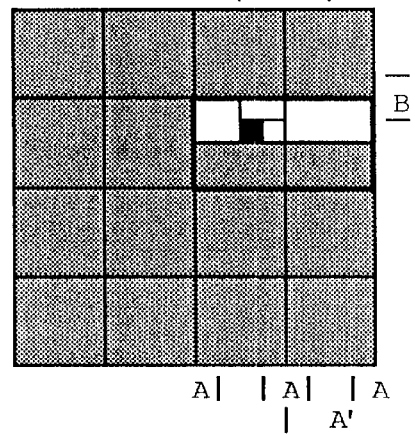

FIG. 15B shows a sixteen-valued, mixed-radix, 3-dimensional object name space configuration wherein a first dimension has two levels of resolution, a second dimension has one level of resolution, a third dimension has one level of resolution.

Figure 15C:
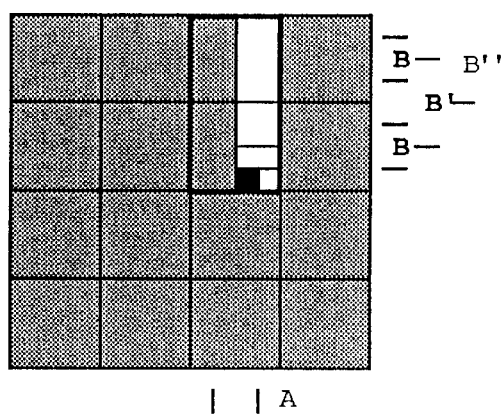

FIG. 15C shows a sixteen-valued, mixed-radix, 2-dimensional object name space configuration wherein a first dimension has one level of resolution and a second dimension has three levels of resolution.

Figure 15D:
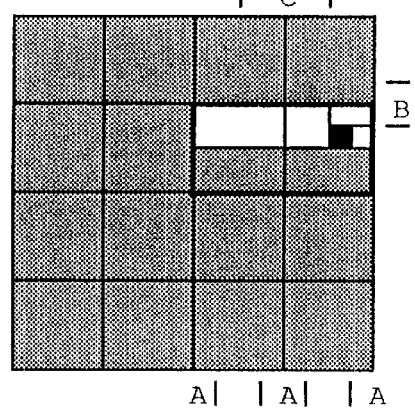

FIG. 15D shows a sixteen-valued, mixed-radix, 3-dimensional object name space configuration wherein a first dimension has is one level of resolution, a second dimension has one level of resolution, a third dimension has two levels of resolution.

FIGS. 15A–15D also illustrate a four-by-four array of sixteen-element 1300 modules, wherein each module of FIGS. 15A–15D, when interconnected with an additional set of four inputs in accordance with the present invention, may be shown to operatively correspond to an element 1300 of the basic interconnection network of FIG. 13A described above.

Accordingly, the modules which contain the sixteen-valued, 1-dimensional object name space configuration of FIG. 15A corresponds to the four-valued, 1-dimensional object name space configuration 1401 of FIG. 14B. In addition, the modules which contain the sixteen-valued, mixed-radix, 3-dimensional object name space configuration of FIG. 15B corresponds to the two-valued, 1-dimensional object name space configuration 1400 of FIG. 14A. Furthermore, the modules which contain the sixteen-valued, mixed-radix, 2-dimensional object name space configuration of FIG. 15C corresponds to the four-valued, 2-dimensional object name space configuration 1402 of FIG. 14C wherein the value of a first modular array input corresponding to a first module input circuit 1301 is undetermined, e.g., "don't care". Still further, the modules which contain the sixteen-valued, mixed-radix, 2-dimensional object name space configuration of FIG. 15C corresponds to the eight-valued, mixed-radix, 2-dimensional object name space configuration 1403 of FIG. 14D. The correspondence referred to above between module configurations of FIGS. 15A–15D and element configurations of FIGS. 14A–14D is further discussed in the detailed description of the modular network configuration of FIG. 28 below. Binary object space configurations having only one level of resolution for each dimension operate as modular "unit" spaces which propagate to expand the logical domain of configurations. Accordingly, the object space configurations of FIGS. 14A–14I similarly operate as modular "unit" configurations which propagate to expand the physical domain of network configurations of the modular, polymorphic network architecture of the present invention.

Referring to the two-valued, 1-dimensional object name space configuration 1400 of FIG. 14A, a one-level input labeled "A" corresponds to input circuit 1301 of FIG. 13B. An input signal corresponding to a logical zero for input circuit 1301 of FIG. 13B also corresponds to the logical name "not-A" associated with the two-valued, 1-dimensional object name space configuration 1400 of FIG. 14A. The location associated with the logical name "not-A" in the two-valued, 1-dimensional object name space configuration 1400 of FIG. 14A further corresponds to the "vertical-inside pair" of columns in the four-by-four array of elements 1300 of FIG. 13B. Referring now to the four-valued, 1-dimensional object name space configuration 1401 of FIG. 14B, a one-level input labeled "A" corresponds to input circuit 1301 of FIG. 13B. An input signal corresponding to a logical zero for input circuit 1301 of FIG. 13B also corresponds to the logical name "not-A" associated with the four-valued, 1-dimensional object name space configuration 1401 of FIG. 14B. The location associated with the logical name "not-A" in the four-valued, 1-dimensional object name space configuration 1401 of FIG. 14B, however, does not correspond to the "vertical-inside pair" of columns in the four-by-four array of elements 1300 of FIG. 13B. The location associated with the logical name "not-A" in the four-valued, 1-dimensional object name space configuration 1401 of FIG. 14B corresponds to the "vertical-outside pair" of columns in the four-by-four array of elements 1300 of FIG. 13B. A primary object of the present invention is to enable a plurality elements 1300 arranged in a fixed physical configuration to be dynamically reconfigured under control into various logical configurations.

FIGS. 16A–16F illustrate an embodiment of a novel configuration control mechanism which enables a plurality of elements 1300 arranged in a fixed physical configuration to be dynamically reconfigured into various logical configurations by manipulating the logical polarity of input circuits 1301, 1302, 1303, 1304, satisfying a principle of homogeneity which requires a correspondence between what is to be represented in a machine (external view) and the corresponding form in the machine (internal view).

Figure 16A:
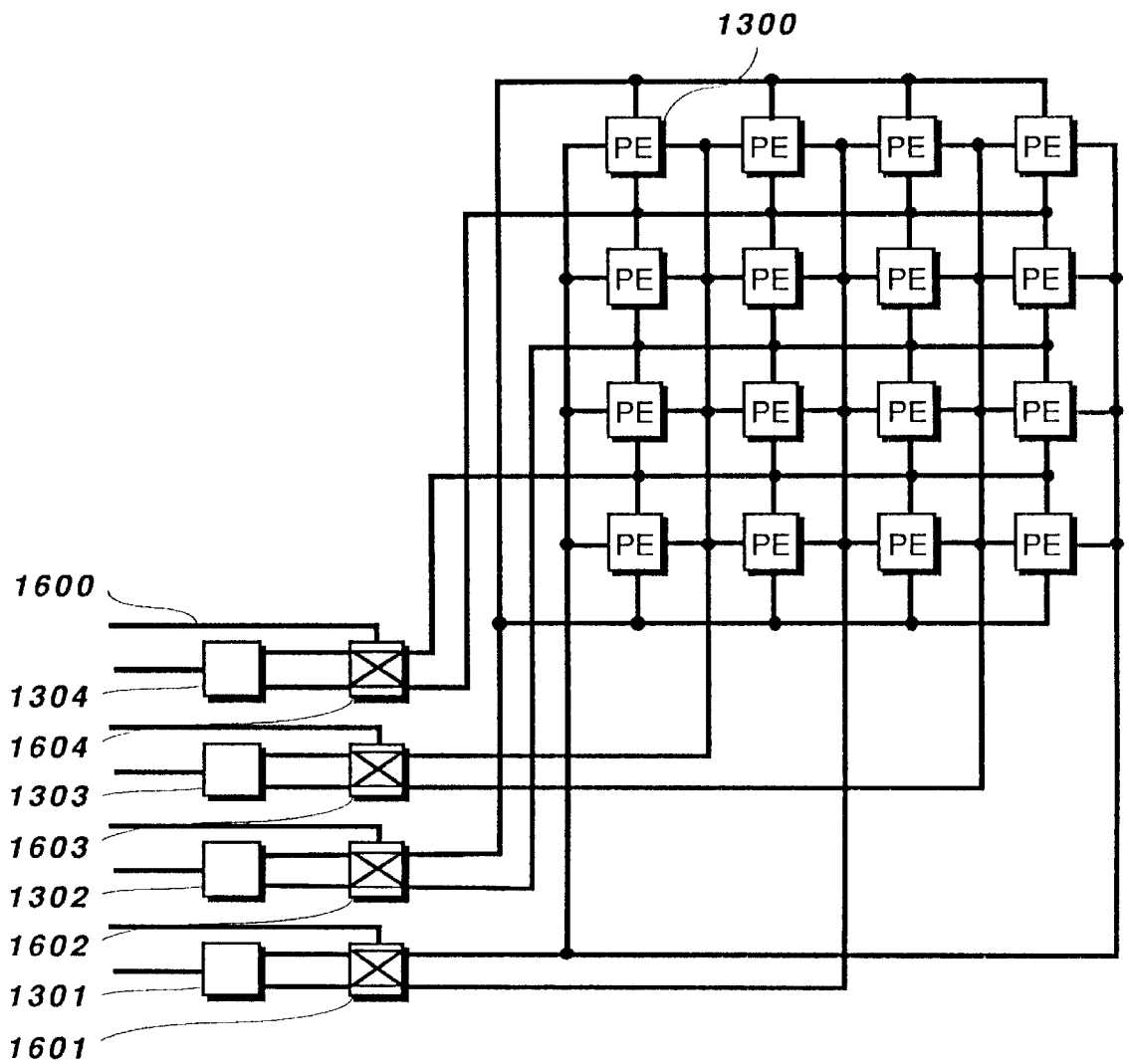

FIG. 16A shows logical polarity switches 1601, 1602, 1603, 1604 electrically coupled between input circuits 1301, 1302, 1303, 1304 and their respective element 1300 interconnections. One of two states, open or closed, is determined for each logical polarity switch 1601, 1602, 1603, 1604 by means of a polarity control signal 1600. A polarity control signal 1600 corresponding to a logical zero, by convention, opens a logical polarity switch 1601, 1602, 1603, 1604 permitting input signals for input circuits 1301, 1302, 1303, 1304 to be electrically coupled with elements 1300 in the manner described referring to FIGS. 13B–13E above. However, a polarity control signal 1600 corresponding to a logical one, by convention, closes a logical polarity switch 1601, 1602, 1603, 1604 permitting input signals for input circuits 1301, 1302, 1303, 1304 to reverse the response described above. Accordingly, when the logical polarity is reversed, the pair of rows or columns of a four-by-four array of elements 1300 that were formerly electrically coupled when input signals for input circuits 1301, 1302, 1303, 1304 correspond to a logical zero become coupled to the pair of rows or columns of a four-by-four array of elements 1300 that were formerly electrically coupled when input signals for input circuits 1301, 1302, 1303, 1304 correspond to a logical one.

FIGS. 16B–16F illustrate various examples of particular object name spaces 1401, 1403, 1404, 1405, 1407 configured in accordance with the present invention, wherein the logical polarity of at least one input circuit is reversed by the configuration control mechanism.

Figure 16B:
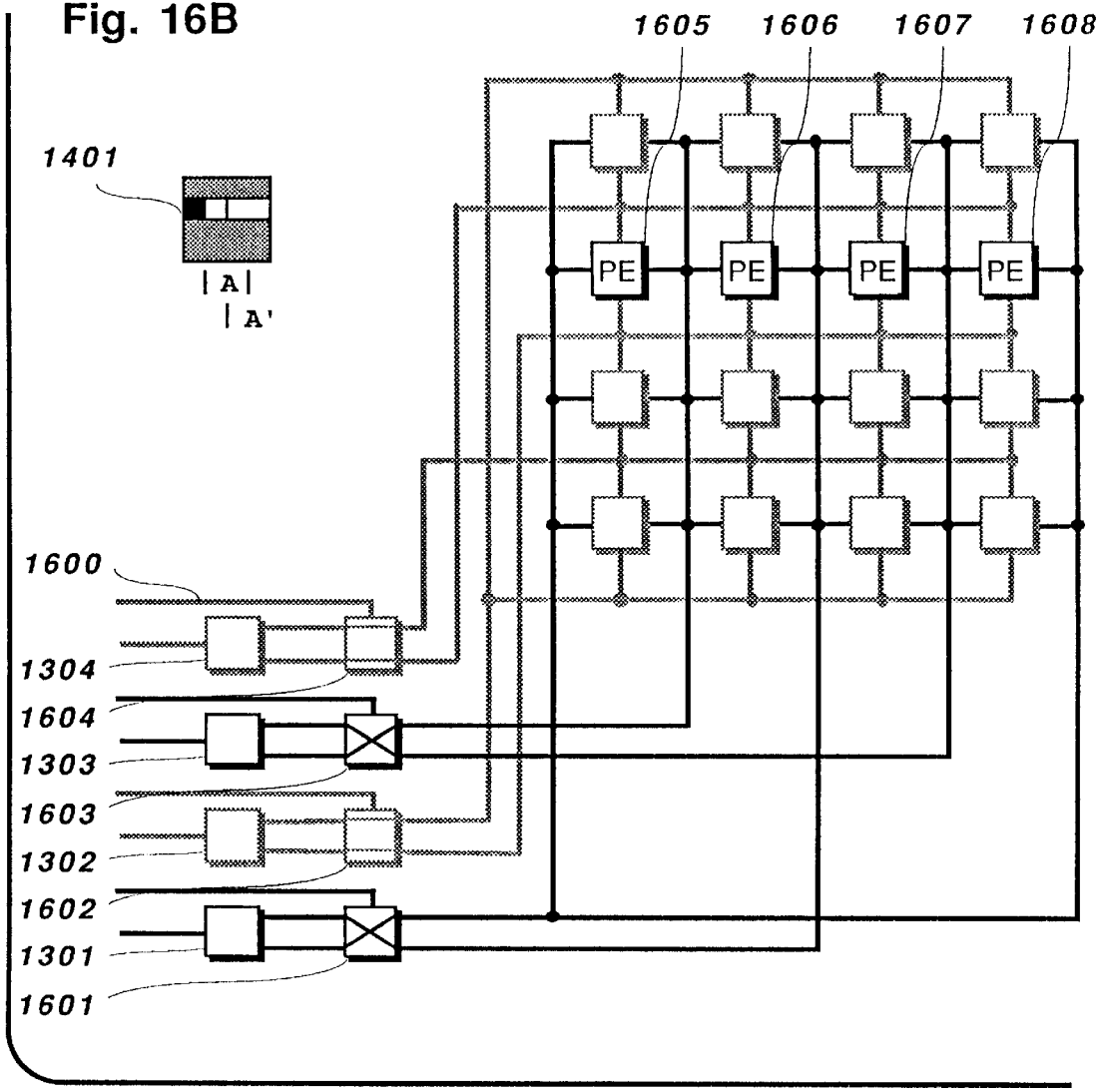

FIG. 16B shows a four-valued, 1-dimensional object name space 1401 configured in accordance with the present invention. Four elements 1605, 1606, 1607, 1608 of FIG. 16B coupled to a first input circuit 1301 and a second input circuit 1303 are shown in bold, whereas the remaining elements, input circuits, and their respective interconnections are shown shaded. A four-valued, 1-dimensional object name space 1401 could be configured on any one of the four rows of elements in the four-by-four array of FIG. 16B. The signal values provided to input circuits 1302 and 1304 of FIG. 16B determine from which row elements are to be selected. Self-organization of object space configurations in a modular, polymorphic network is a principal object of the invention. Location control is further discussed in the detailed description of FIGS. 18–20 below. Referring to FIG. 16B, the logical polarity of polarity switches 1601 and 1603 is shown reversed. Accordingly, the pair of columns of a four-by-four array of elements that were formerly coupled when input signals for input circuits 1301 and 1303 correspond to a logical zero become coupled to the pair of columns of a four-by-four array of elements that were formerly coupled when input signals for input circuits 1301 and 1303 correspond to a logical one.

Figure 16C:
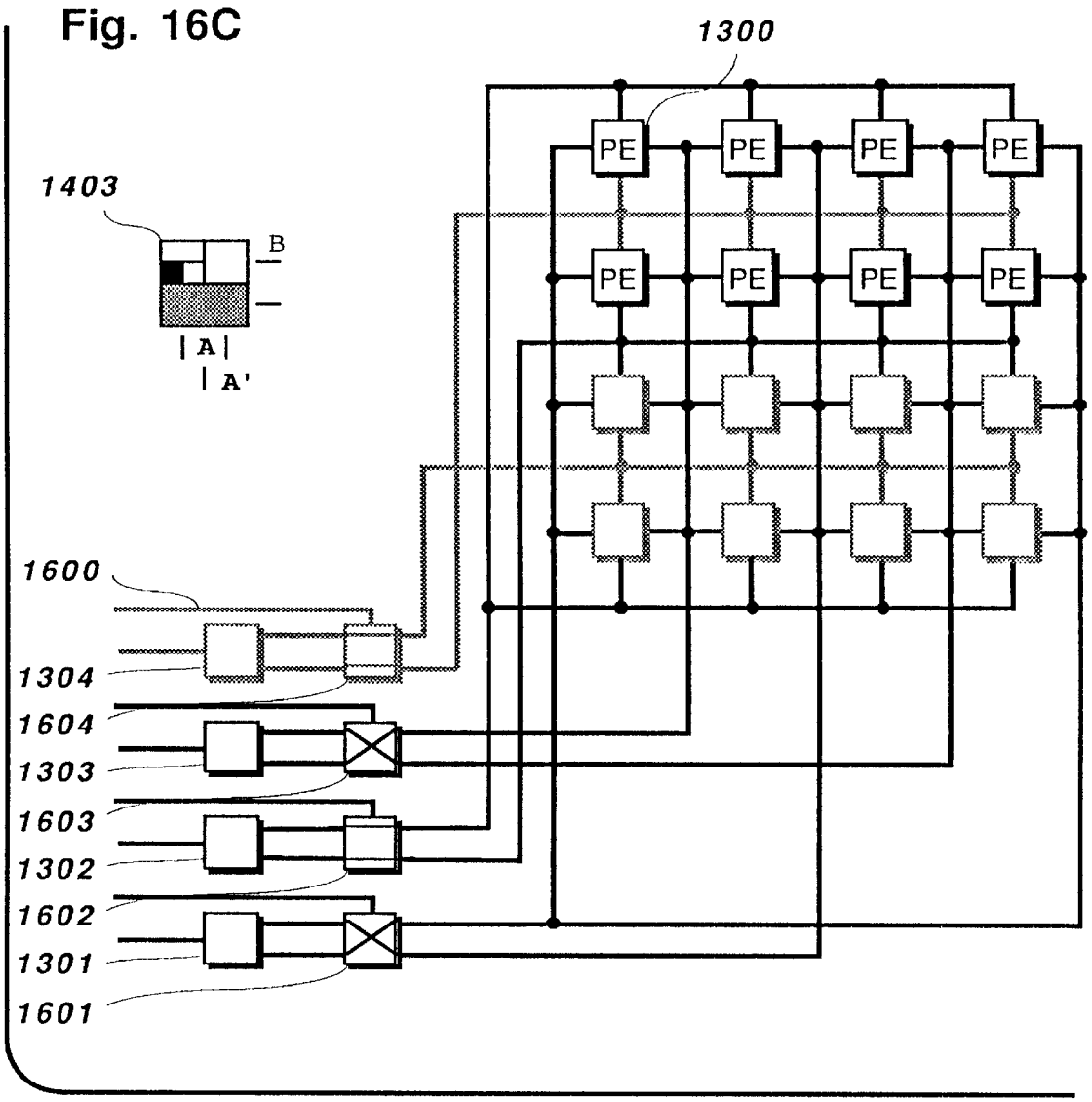

FIG. 16C shows an eight-valued, mixed-radix, 2-dimensional object name space 1403 configured in accordance with the present invention. Eight elements 1300 of FIG. 16C are coupled to a first input circuit 1301, a second input circuit 1302, and a third input circuit 1303. The object name space 1403 could be configured in either the upper or lower two rows of elements in the four-by-four array of FIG. 16C. The signal value provided to input circuit 1304 of FIG. 16C determines from which rows elements 1300 are to be selected. The logical polarity of polarity switches 1601 and 1603 is shown reversed. Accordingly, the pair of columns of a four-by-four array of elements that were formerly coupled when input signals for input circuits 1301 and 1303 correspond to a logical zero become coupled to the pair of columns of a four-by-four array of elements that were formerly coupled when input signals for input circuits 1301 and 1303 correspond to a logical one.

Figure 16D:
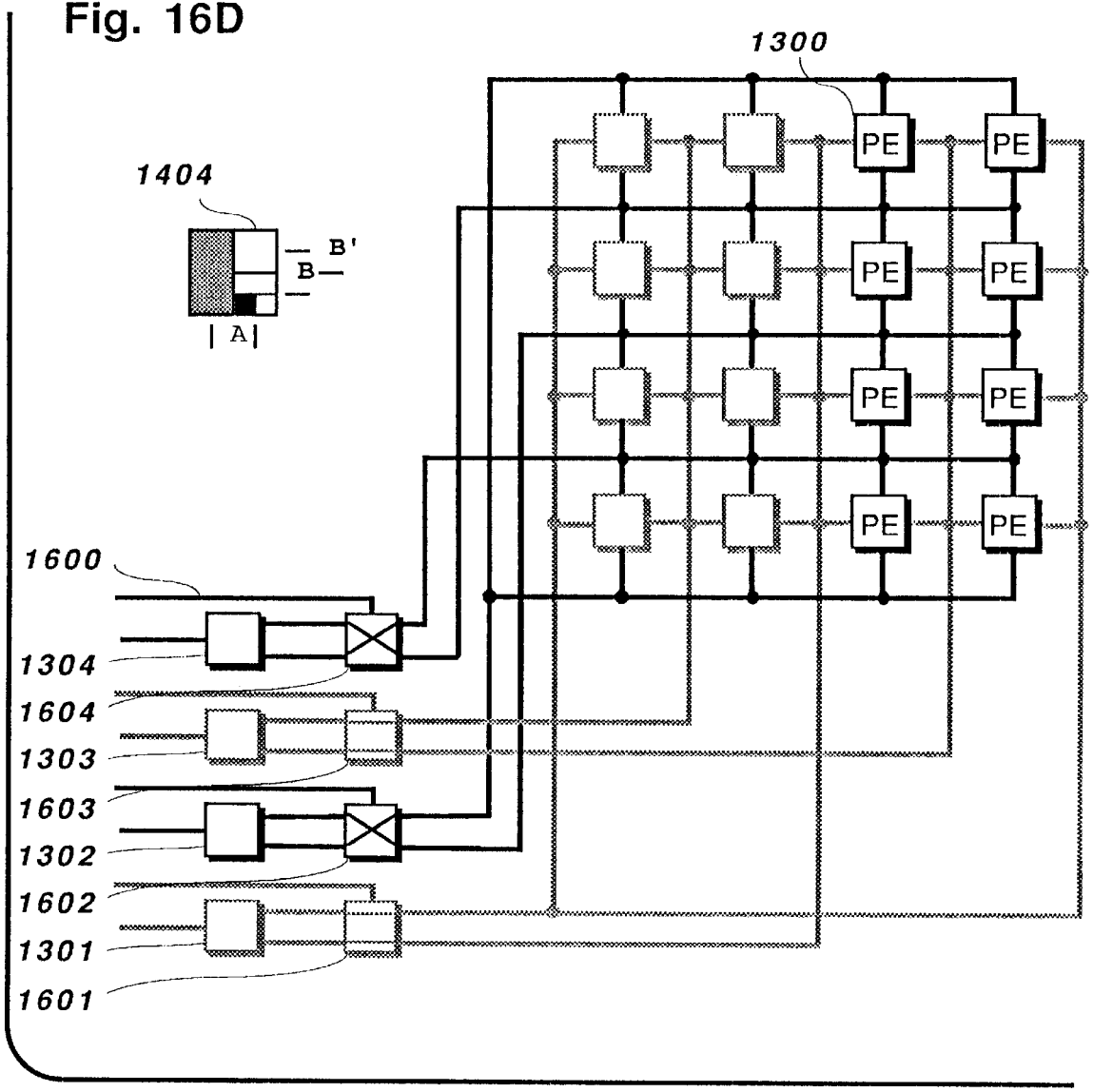

FIG. 16D shows an eight-valued, mixed-radix, 2-dimensional object name space 1404 configured in accordance with the present invention. Eight elements 1300 of FIG. 16D are coupled to a first input circuit 1302 and a second input circuit 1304. The object name space 1404 could be configured in either the left-most or right-most two columns of elements in the four-by-four array of FIG. 16D. The signal values provided to input circuits 1301 and 1303 of FIG. 16D determine from which columns elements 1300 are to be selected. The logical polarity of polarity switches 1602 and 1604 is shown reversed. Accordingly, the pair of rows of a four-by-four array of elements that were formerly coupled when input signals for input circuits 1302 and 1304 correspond to a logical zero become coupled to the pair of rows of a four-by-four array of elements that were formerly coupled when input signals for input circuits 1302 and 1304 correspond to a logical one.

FIG. 16E shows a sixteen-valued, 2-dimensional object name space 1405 configured in accordance with the present invention. The elements 1300 of FIG. 16E are shown coupled to input circuits 1301, 1302, 1303, 1304. The logical polarity of polarity switches 1601, 1602, 1603, 1604 is shown reversed. Accordingly, the pair of rows and columns of a four-by-four array of elements that were formerly coupled when input signals for input circuits 1301, 1302, 1303, 1304 correspond to a logical zero become coupled to the pair of rows and columns of a four-by-four array of elements that were formerly coupled when input signals for input circuits 1301, 1302, 1303, 1304 correspond to a logical one.

Figure 16F:
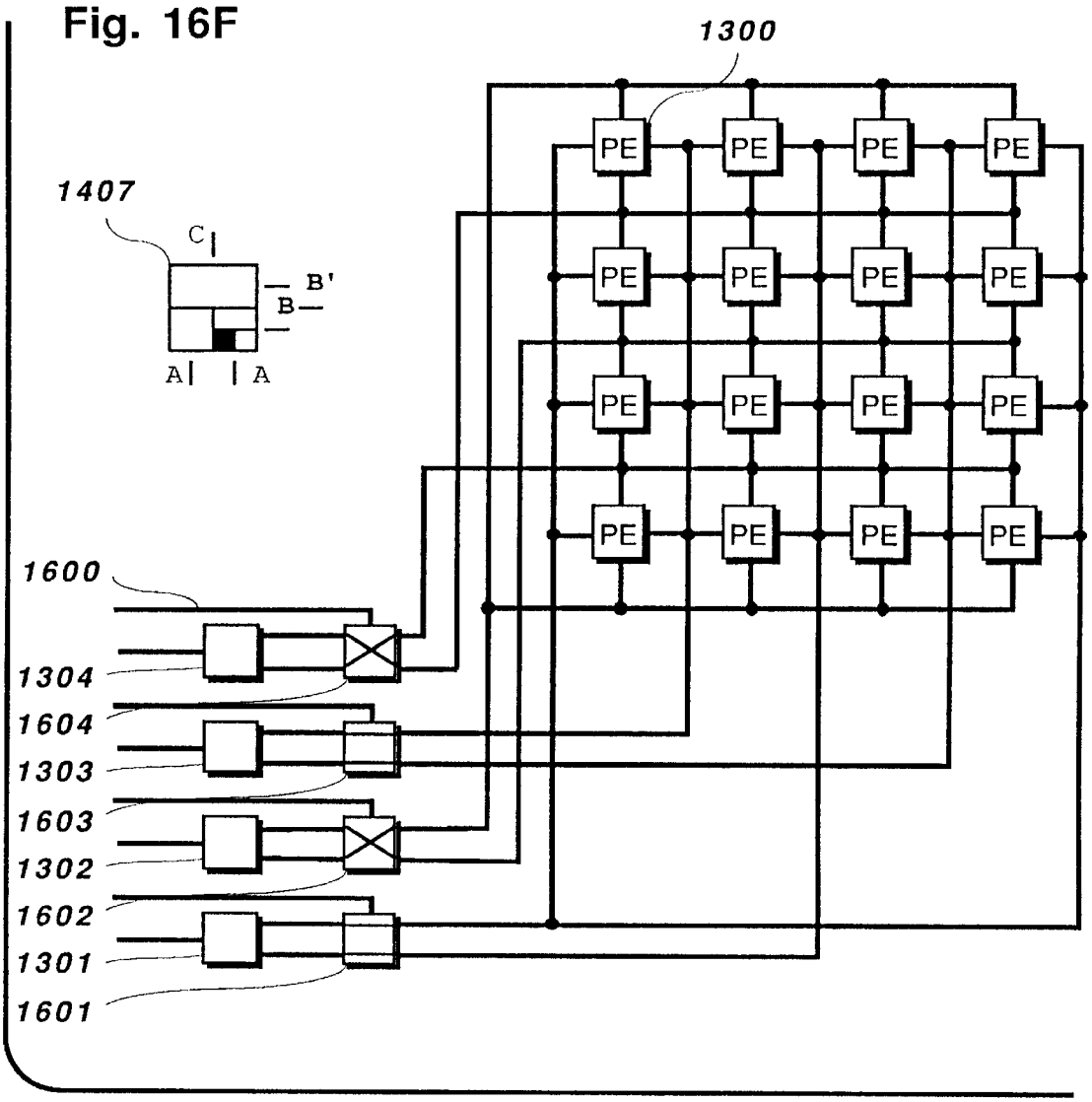

FIG. 16F shows a sixteen-valued, mixed-radix 3-dimensional object name space 1407 configured in accordance with the present invention. The elements 1300 of FIG. 16E are shown coupled to input circuits 1301, 1302, 1303, 1304. The logical polarity of polarity switches 1602 and 1604 is shown reversed. Accordingly, the pair of rows of a four-by-four array of elements that were formerly coupled when input signals for input circuits 1302 and 1304 correspond to a logical zero become coupled to the pair of rows of a four-by-four array of elements that were formerly coupled when input signals for input circuits 1302 and 1304 correspond to a logical one.

FIGS. 17A–17D illustrate various expressions of rules which relate polarity control switch 1601, 1602, 1603, 1604 states for object name spaces 1401, 1403, 1404, 1405, 1407, wherein the logical polarity of at least one input circuit 1301, 1302, 1303, 1304 is reversed by the configuration control mechanism.

FIG. 17A shows three relations 1701, 1702, 1703 which correspond to particular polarity control switch 1601, 1602,

1603, 1604 states for object name spaces. Relation 1701 of FIG. 17A shows two modular object space configurations 1401, 1403 which require the same polarity control switch 1601, 1602, 1603, 1604 states. Relation 1702 of FIG. 17A shows two additional modular object space configurations 1404, 1407 which require the same polarity control switch 1601, 1602, 1603, 1604 states. Relation 1703 of FIG. 17A shows a single modular object space configuration 1405 which requires a unique set of polarity control switch 1601, 1602, 1603, 1604 states.

FIG. 17B lists the polarity control switch 1601, 1602, 1603, 1604 state relations 1701, 1702, 1703. Relation 1701 of FIG. 17B requires the state of polarity control switches 1602, 1604 to be open and the state of polarity control switches 1601, 1603 to be closed. Relation 1702 of FIG. 17B requires the state of polarity control switches 1602, 1604 to be closed and the state of polarity control switches 1601, 1603 to be open. Relation 1703 of FIG. 17B requires the state of polarity control switches 1601, 1602, 1603, 1604 to be closed.

FIG. 17C shows an expression of the polarity control switching relations in accordance with the method disclosed in a U.S. patent application by Estes and Walker entitled MIXED-RESOLUTION, N-DIMENSIONAL OBJECT SPACE METHOD AND APPARATUS. A set of inputs 1704, 1705, 1706, 1707 corresponding to various polarity control switch 1601, 1602, 1603, 1604 states logically name, e.g., select, one or more possible object space configurations 1401, 1403, 1404, 1405, 1407, wherein the logical polarity of at least one input circuit 1301, 1302, 1303 1304 is reversed by the configuration control mechanism.

Figure 17D:
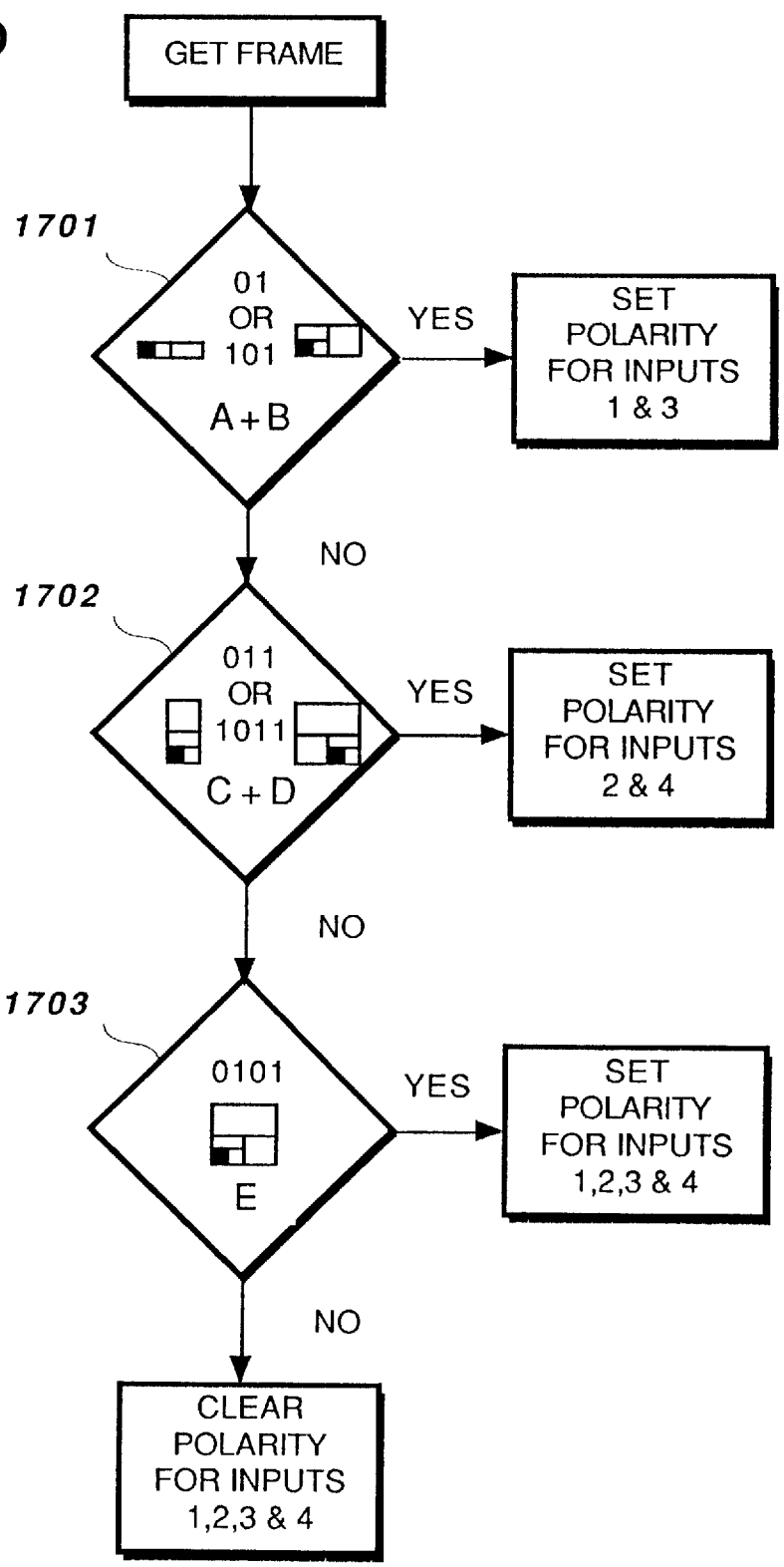

FIG. 17D is a flow chart which illustrates a method for determining the logical polarity for a set of modular inputs for the interconnection network of the present invention. In accordance with the method disclosed in a U.S. patent application by Estes and Walker referenced above:

a. An object frame specifying properties of an object space configuration is input to the configuration control module of the present invention;
  b. If the object frame corresponded to the conditions of relation 1701, then polarity control switches 1602, 1604 are cleared and polarity control switches 1601, 1603 are set;
  c. If the object frame corresponded to the conditions of relation 1702, then polarity control switches 1602, 1604 are set and polarity control switches 1601, 1603 are cleared;
  d. If the object frame corresponded to the conditions of relation 1703, then polarity control switches 1601, 1602, 1603, 1604 are set;
  e. Otherwise all polarity control switches 1601, 1602, 1603, 1604 are cleared.

Self-organization of multiple object space configurations in a modular, polymorphic network is a principal object of the invention. Accordingly, FIGS. 18–20 refer to location of multiple object spaces in a module. A four-valued, 1-dimensional object name space 1401 could be configured on any 10 one of the four rows of elements in the four-by-four array of FIG. 16B. The signal values provided to input circuits 1302 and 1304 of FIG. 16B determine from which of the four rows elements 1300 are to be selected. FIGS. 18A–18F illustrate six modular configurations which comprise object name spaces of less than sixteen elements.

Figure 18A:
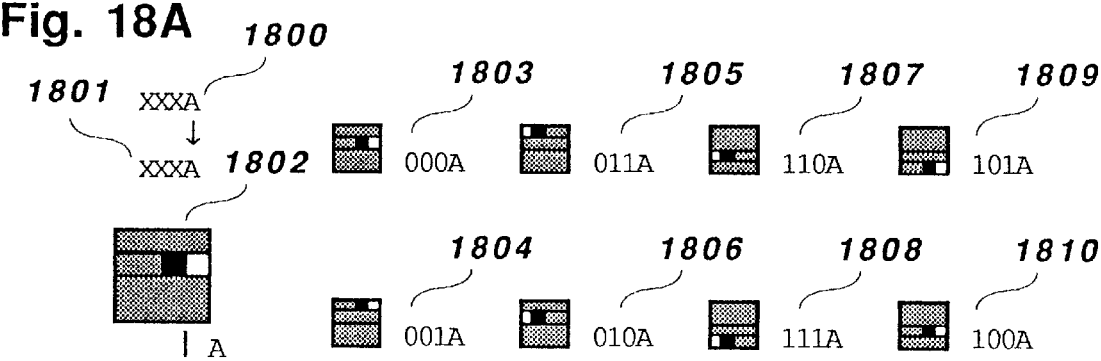
FIGS. 18A–18F illustrate multiple instance locations of the same object space configuration.

FIG. 18A shows an object frame 1800, an object descriptor 1801, and an external expression 1802 of a two-element, 1-dimensional object space generated in accordance with a method disclosed in the U.S. patent application by Estes and Walker, referenced above. A first, two-level input, labeled "A" in the object descriptor 1801 of FIG. 18A, selects one of two elements of the 1-dimensional object space 1802. A second, third, and fourth input, each labeled "X", e.g., don't care, in the object descriptor 1801 of FIG. 18A, determine which of eight possible instances 1803, 1804, 1805, 1806, 1807, 1808, 1809, 1810 of a 1-dimensional object space 1802 is activated for element selection.

Figure 18B:
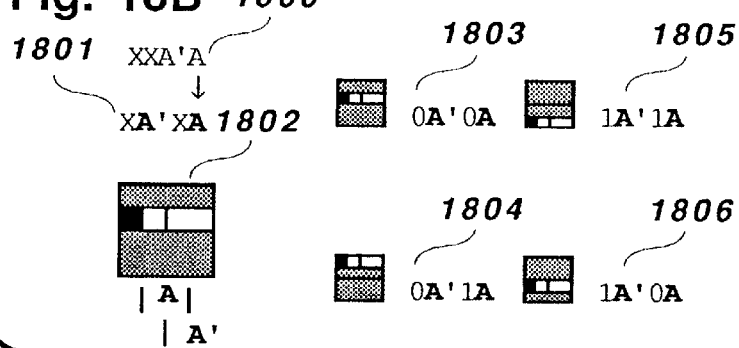

FIG. 18B shows an object frame 1800, an object descriptor 1801, and an external expression 1802 of a four-element, 1-dimensional object space. A first and second, two-level input, labeled "A" and "A'" in the object descriptor 1801 of FIG. 18B, selects one of four elements of the 1-dimensional object space 1802. A third and fourth input, each labeled "X", e.g., don't care, in the object descriptor 1801 of FIG. 18B, determine which of four possible instances 1803, 1804, 1805, 1806 of a 1-dimensional object space 1802 is activated for element selection. Element selector inputs, labeled "A" and "A'," are interleaved with instance location inputs, labeled "X," in the object descriptor 1801 and the instance location diagrams 1803, 1804, 1805, 1806 of FIG. 18B. Bold type face for element selector inputs, labeled "A" and "A'" of FIG. 18B, indicate reversed logical polarity.

Figure 18C:
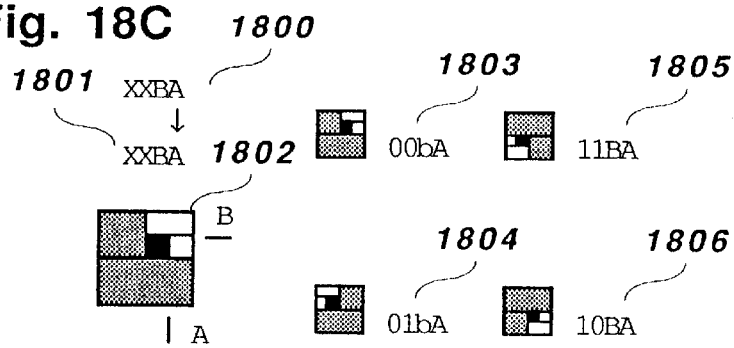

FIG. 18C shows an object frame 1800, an object descriptor 1801, and an external expression 1802 of a four-element, 2-dimensional object space. A first and second, two-level input, labeled "A" and "B" in the object descriptor 1801 of FIG. 18C, selects one of four elements of the 2-dimensional object space 1802. A third and fourth input, each labeled "X", e.g., don't care, in the object descriptor 1801 of FIG. 18C, determine which of four possible instances 1803, 1804, 1805, 1806 of a 2-dimensional object space 1802 is activated for element selection.

Figure 18D:
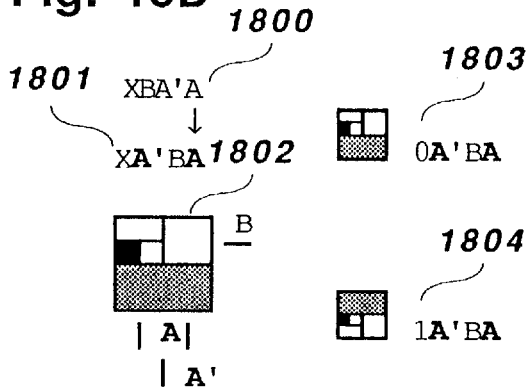

FIG. 18D shows an object frame 1800, an object descriptor 1801, and an external expression 1802 of an eight-element, mixed radix 2-dimensional object space. A first, second, and third two-level input, labeled "A," "A'," and "B" in the object descriptor 1801 of FIG. 18D, selects one of eight elements of the 2-dimensional object space 1802. A fourth input, labeled "X", e.g., don't care, in the object descriptor 1801 of FIG. 18D, determines which of two possible instances 1803,1804 of a 2-dimensional object space 1802 is activated for element selection.

Figure 18E:
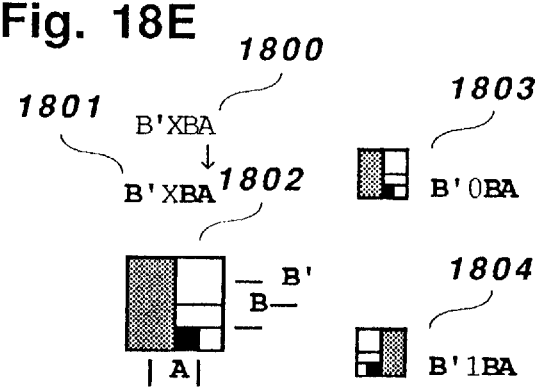

FIG. 18E shows an object frame 1800, an object descriptor 1801, and an external expression 1802 of another eight-element, mixed-radix, 2-dimensional object space. A first, second, and third two-level input, labeled "A," "B," and "B'n" in the object descriptor 1801 of FIG. 18E, selects one of eight elements of the 2-dimensional object space 1802. A fourth input, labeled "X", e.g., don't care, in the object descriptor 1801 of FIG. 18E, determines which of two possible instances 1803, 1804 of a 2-dimensional object space 1802 is activated for element selection.

Figure 18F:
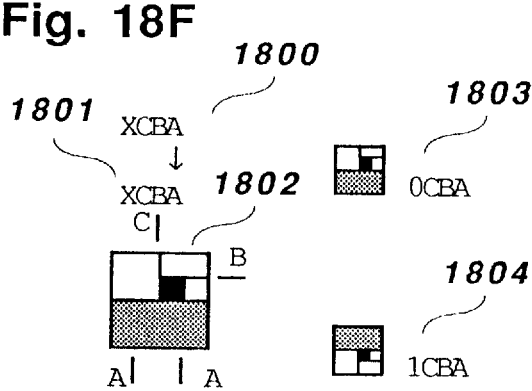

FIG. 18F shows an object frame 1800, an object descriptor 1801, and an external expression 1802 of an eight-element, 3-dimensional object space. A first, second, and third two-level input, labeled "A," "B," and "C" in the object descriptor 1801 of FIG. 18F, selects one of eight elements of the 3-dimensional object space 1802. A fourth input, labeled "X", e.g., don't care, in the object descriptor 1801 of FIG. 18F, determines which of two possible instances 1803, 1804 of a 3-dimensional object space 1802 is activated for element selection.

Figure 19A:
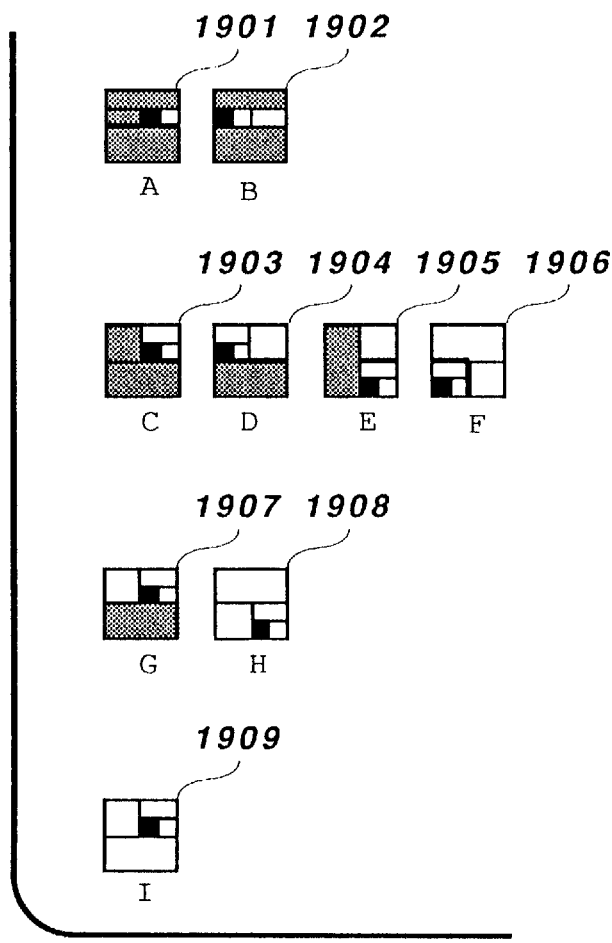
Figure 19B:
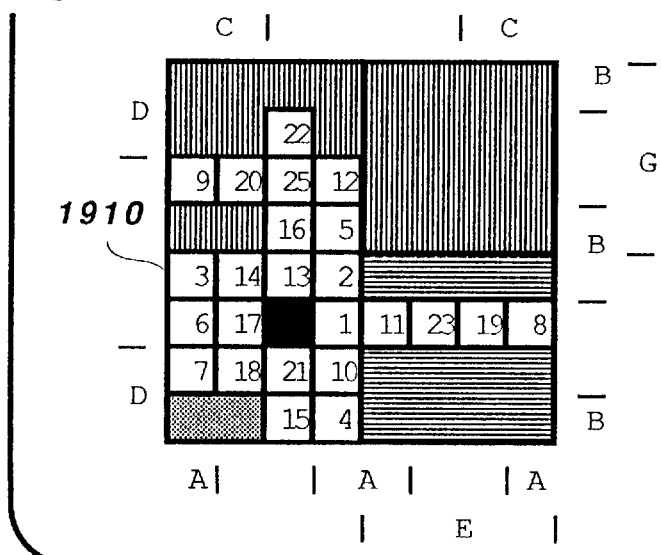

Whereas FIGS. 18A–18F illustrate multiple instance locations of the same object space configuration, FIGS. 19A–19C further illustrate combinations of dissimilar object space configurations.

Figure 20A:
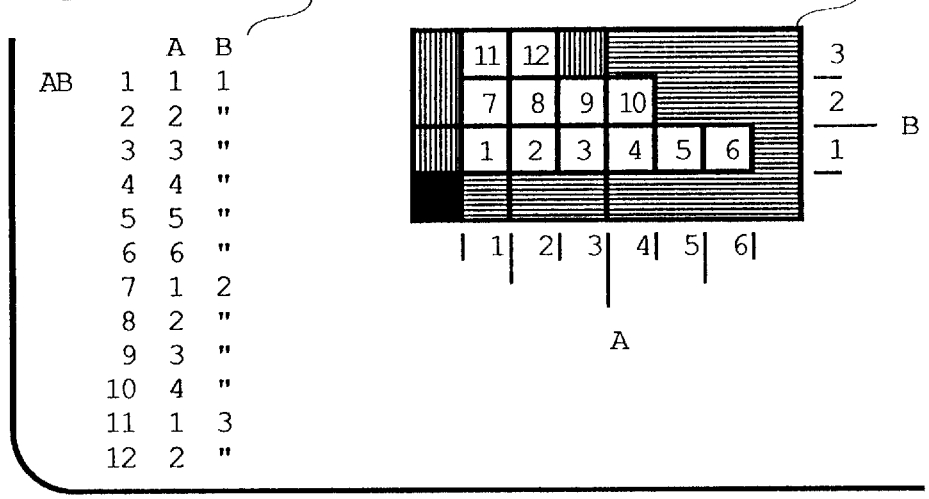
FIGS. 20A–20R correspond to entries in the table of relations of FIG. 19C which refer to multiple instances of dissimilar object space configurations.
Figure 20B:
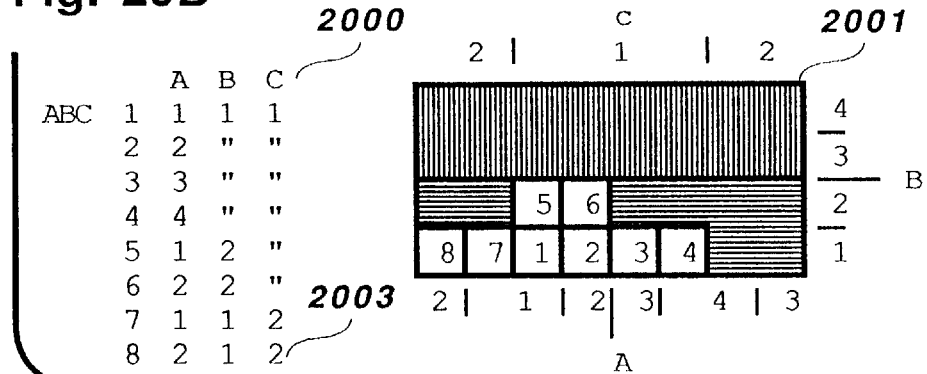
Figure 20C:
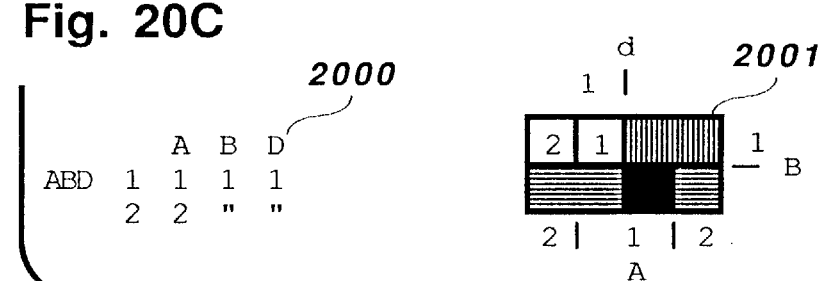
Figure 20D:
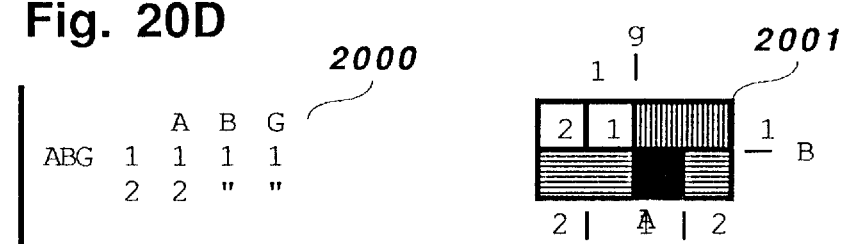
Figure 20E:
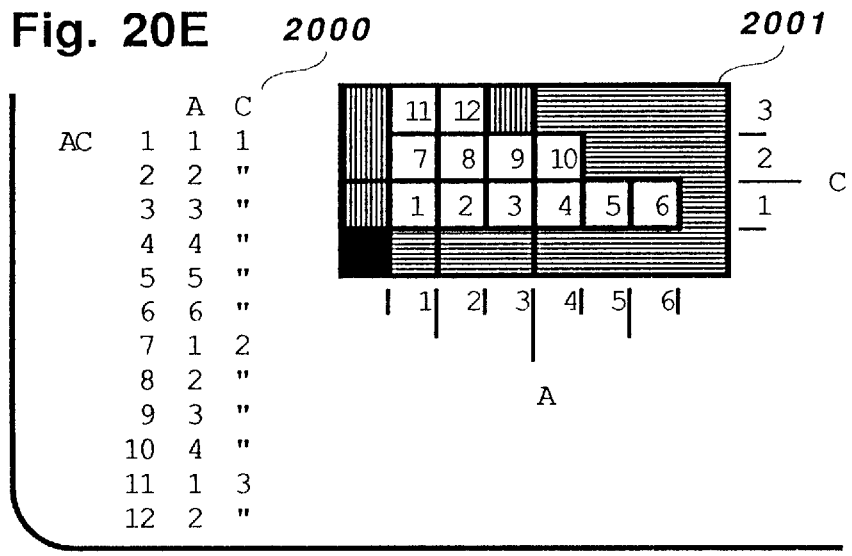
Figure 20F:
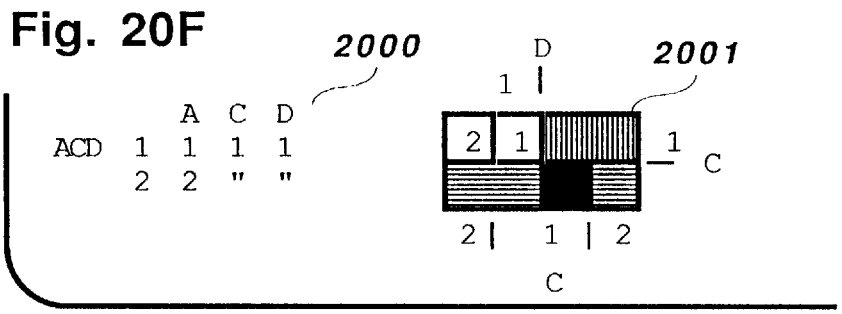
Figure 20G:
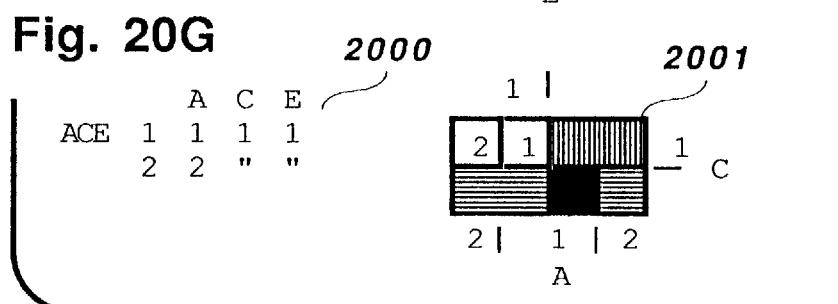
Figure 20H:
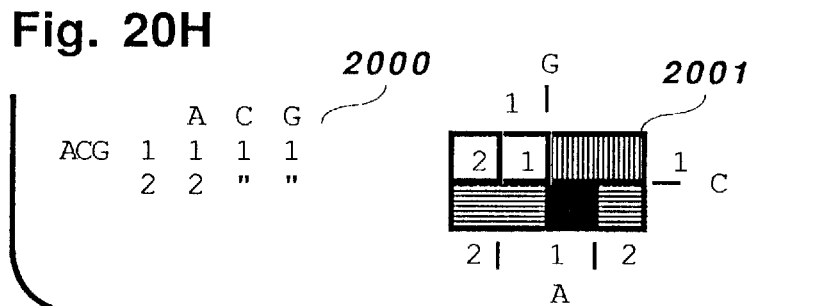
Figure 20I:
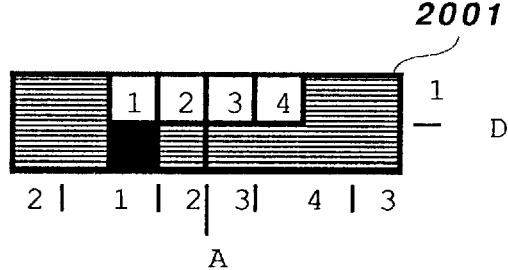
Figure 20J:
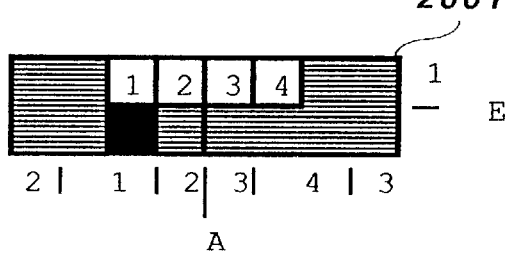
Figure 20K:
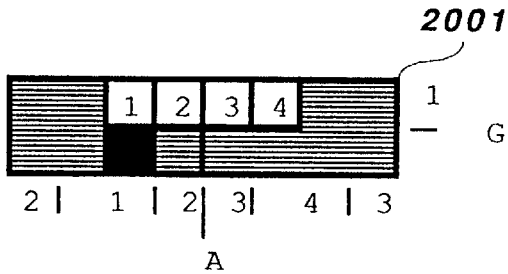
Figure 20L:
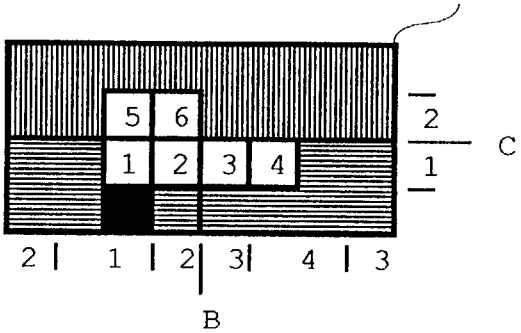
Figure 20M:
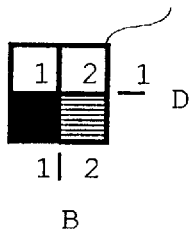
Figure 20N:
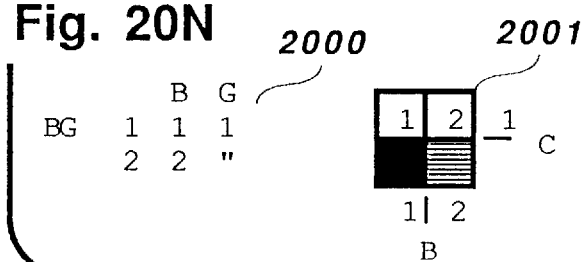
Figure 20O:
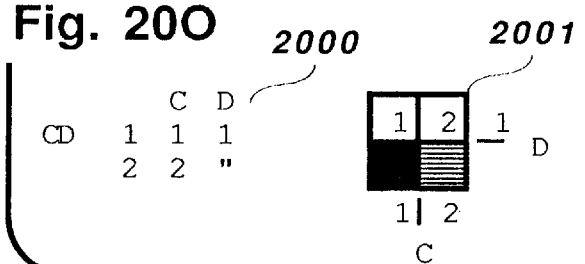
Figure 20P:
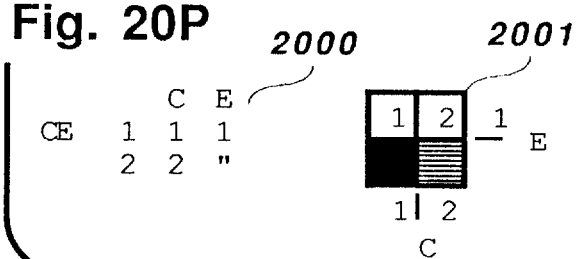
Figure 20Q:
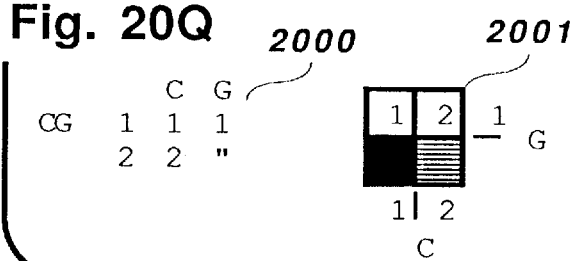
Figure 20R:
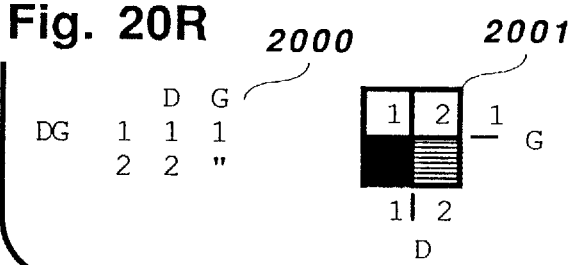

FIG. 19A illustrates nine modular configurations which comprise object name spaces, labeled "A–I," that can be allocated in a single network module of the present invention. Six of the nine object space configurations 1901, 1902, 1903, 1904, 1905, 1907 of FIG. 19A comprise less than the sixteen elements 1300 of the network module of FIG. 13A. Accordingly, FIG. 19B shows an expression for the possible combinations of six object space configurations 1901, 1902, 1903, 1904, 1905, 1907 in accordance with the method disclosed in a U.S. patent application by Estes and Walker entitled MIXED-RESOLUTION, N-DIMENSIONAL OBJECT SPACE METHOD AND APPARATUS. The binary, six-dimensional object space of FIG. 19B shows relations which comprise possible combinations of six object space configurations 1901, 1902, 1903, 1904, 1905, 1907. The relation 1910 of FIG. 19B describes the possibility for at least one instance of three object space configurations 1901, 1902, 1903. The label "3" associated with relation 1910 of FIG. 19B corresponds to an index for a particular entry 1911 in the table of relations of FIG. 19C, i.e., 3 ABC (8). The bracketed item "(8)" of entry 1911 in the table of relations of FIG. 19C further corresponds to an index for a particular entry 2003, i.e., 8 2 1 2, in the table of relations of FIG. 20B describing the maximum number of instances for the combination "ABC" 1901, 1902, 1903. Entry 2003 in the table of relations of FIG. 20B is further described as table entry number "8" having, at most "2" instances of object space "A" 1901, "1" instance of object space "B" 1902, and "2" instances of object space "C" 1901. FIGS. 20A–20R correspond to entries in the table of relations of FIG. 19C which refer to multiple instances of dissimilar object space configurations. Entries 1912, 1913, 1914 in the table of relations of FIG. 19C refer to sixteen-element object space configurations 1906, 1908, 1909.

Figure 21:
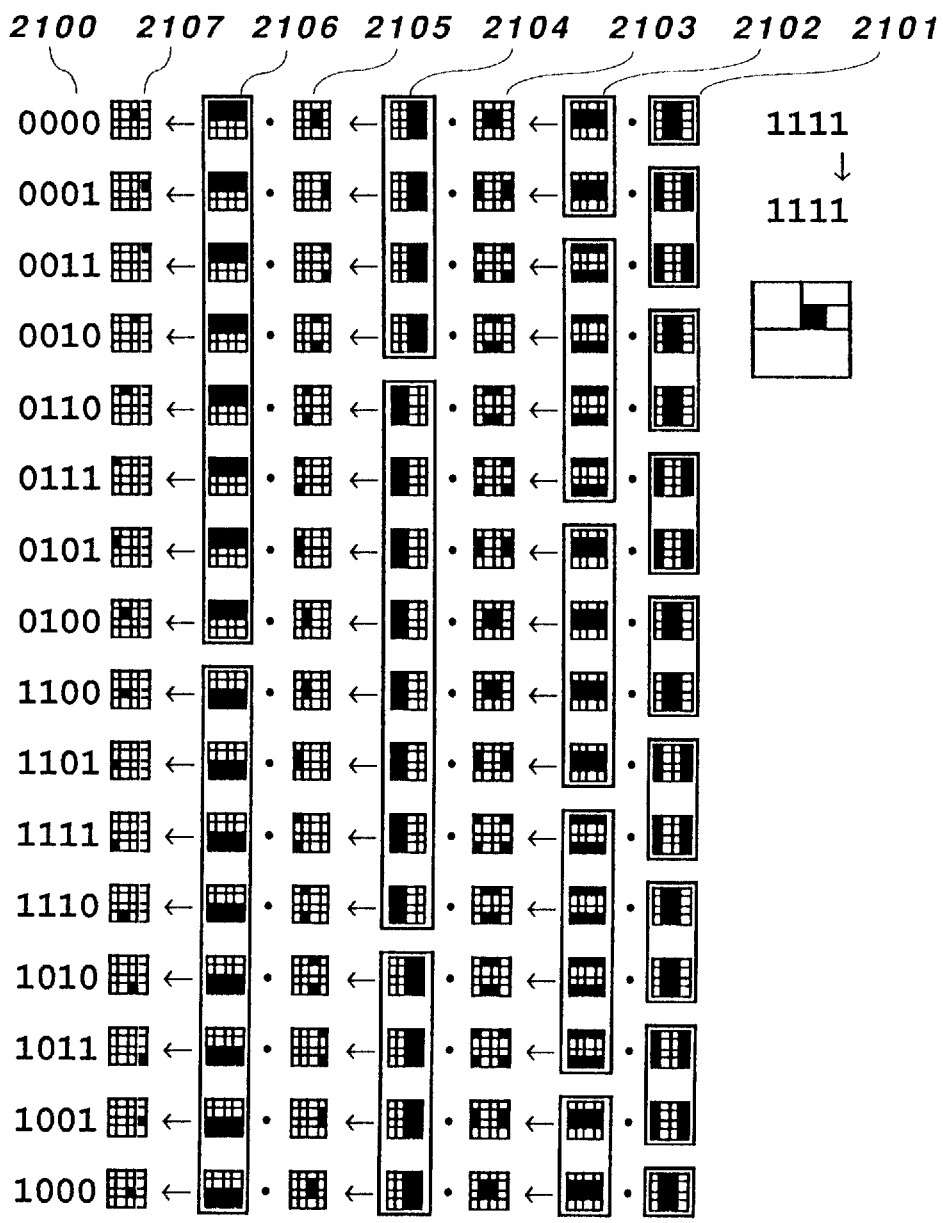
FIGS. 21–29 illustrate methods of modular element selection for nine modular configurations which comprise object name spaces that can be allocated in a single network module of the present invention.
Figure 22:
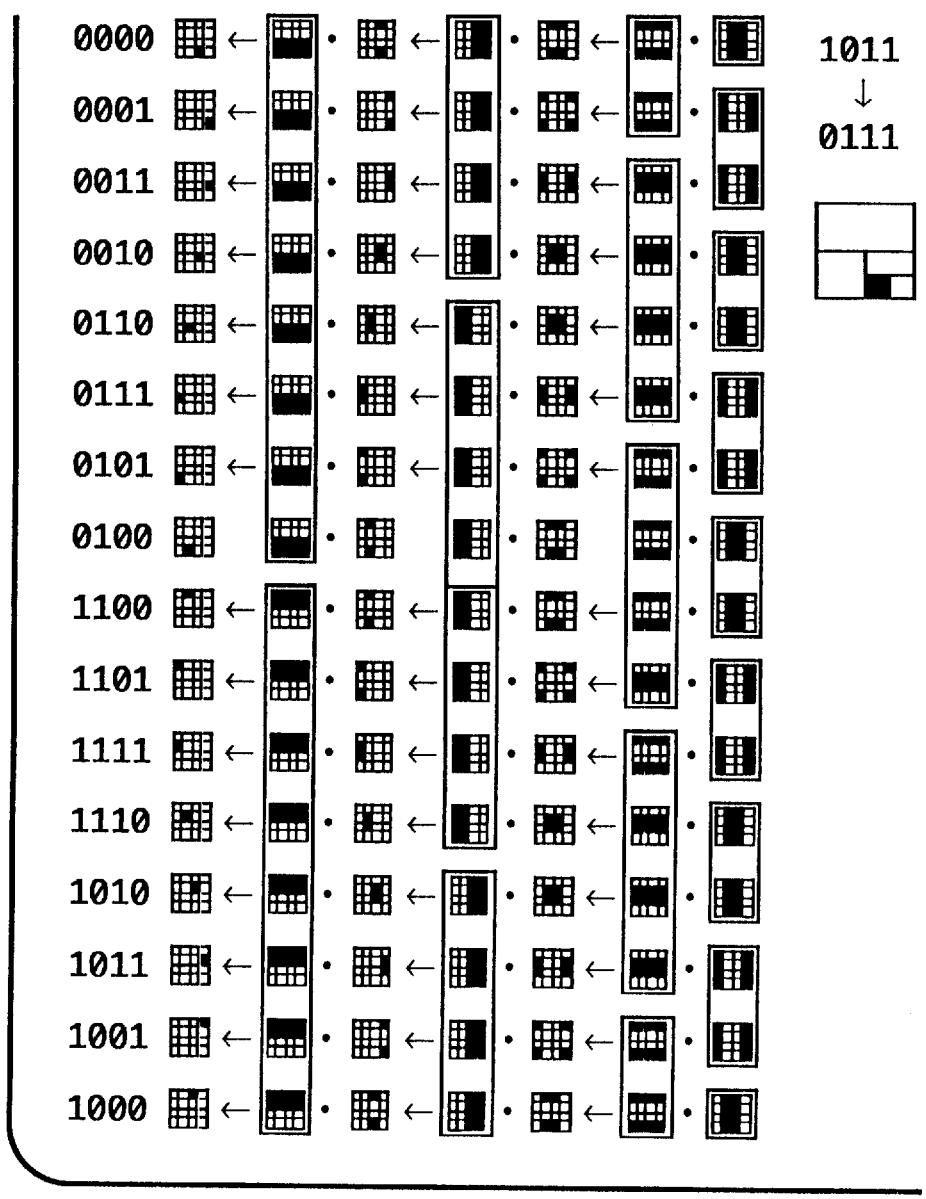
Figure 23:
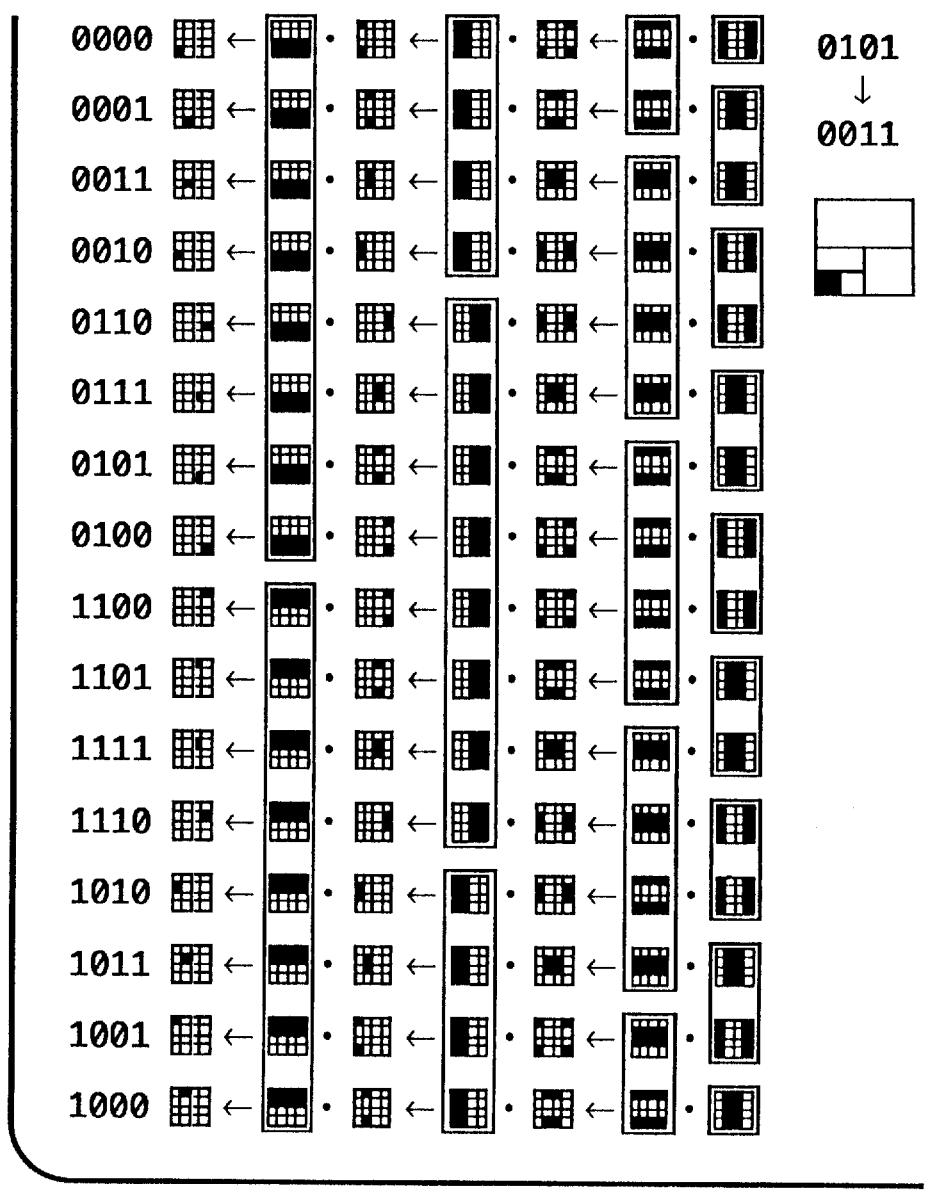
Figure 24A:
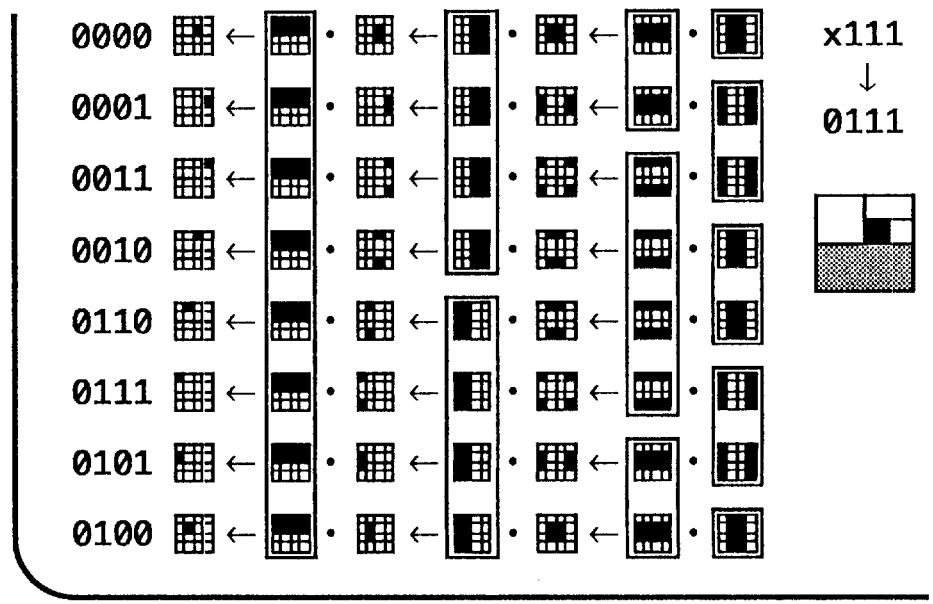
Figure 24B:
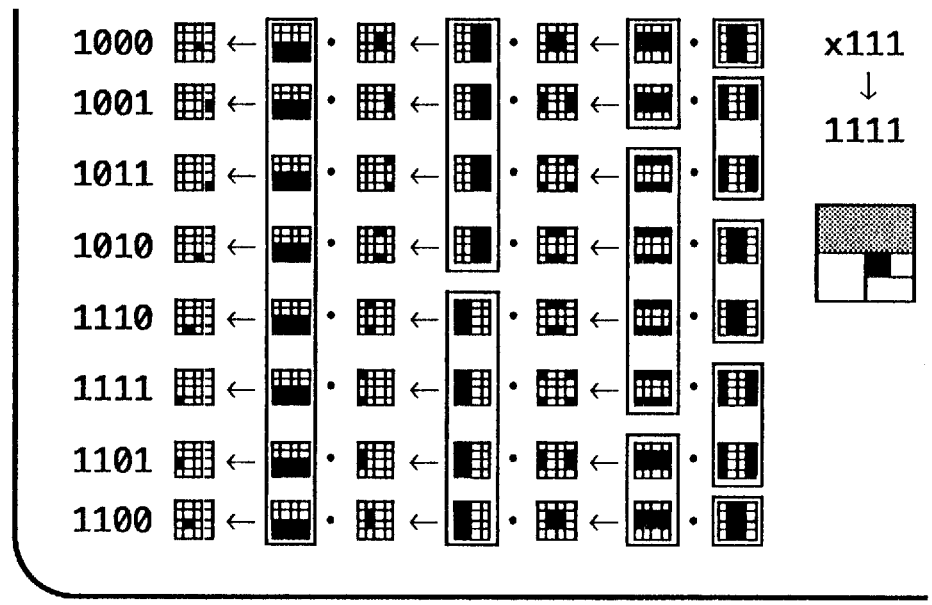
Figure 25A:
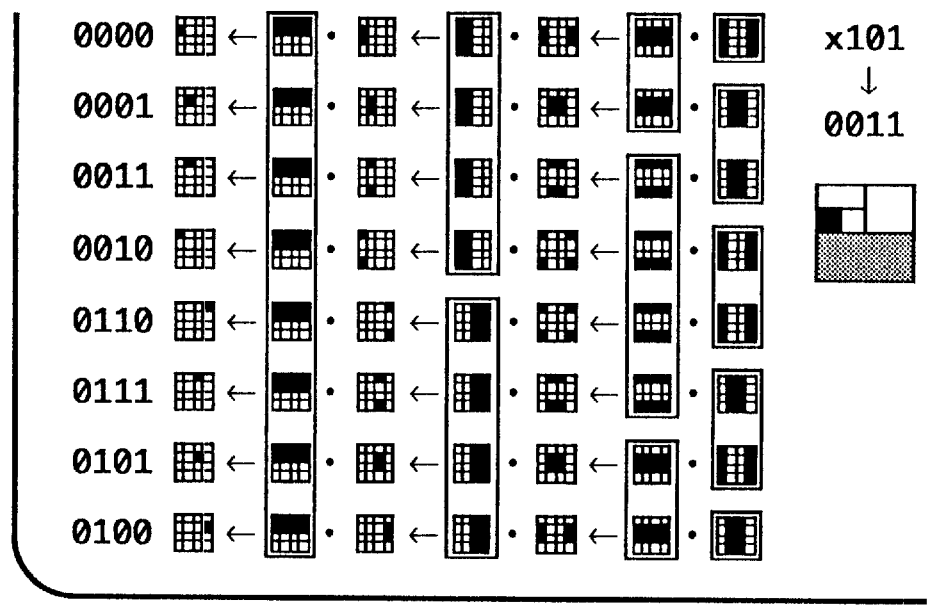
Figure 25B:
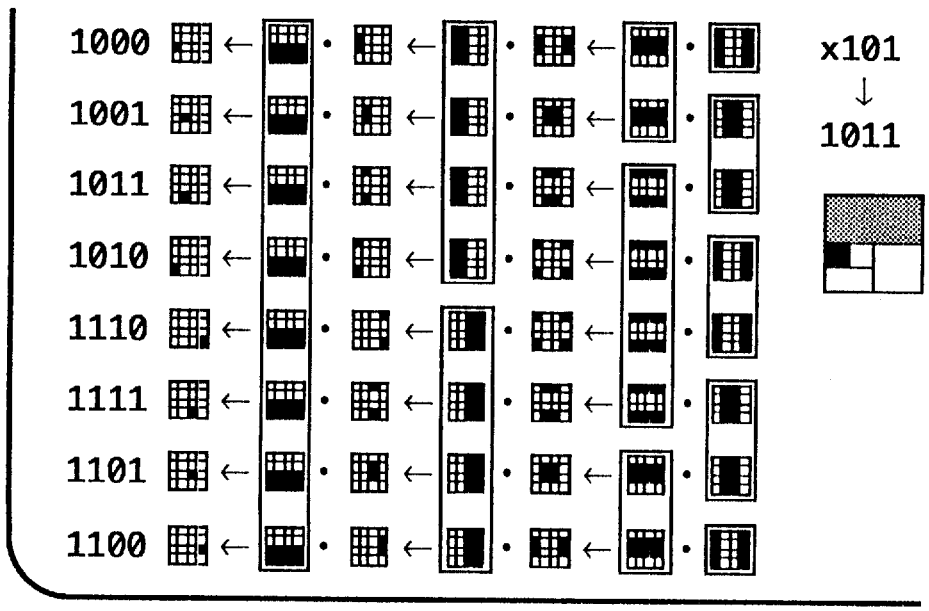
Figure 26A:
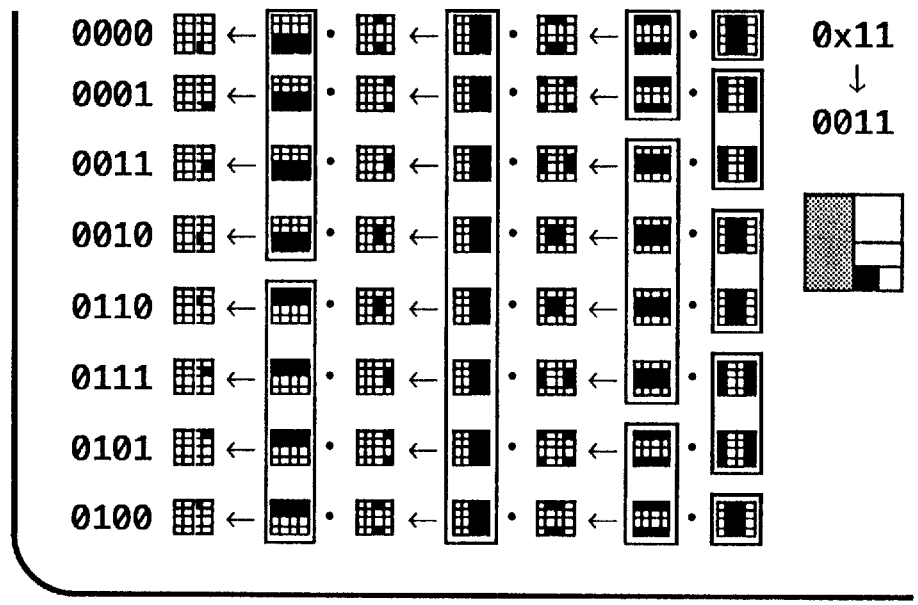
Figure 26B:
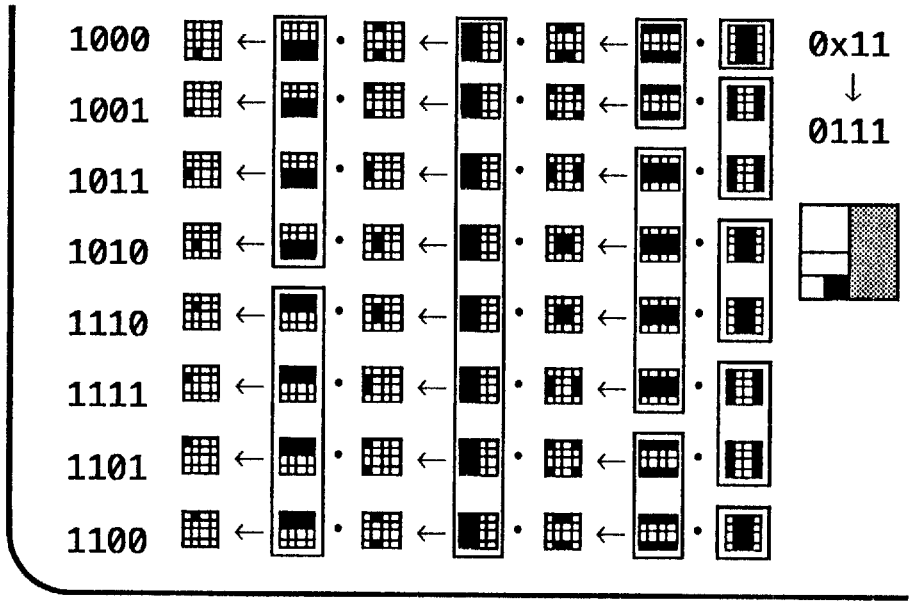
Figure 27A:
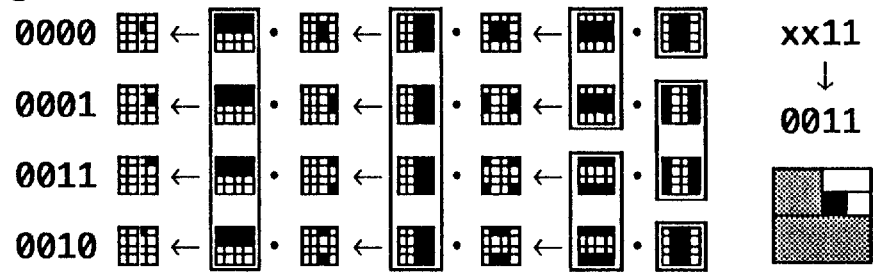
Figure 27B:
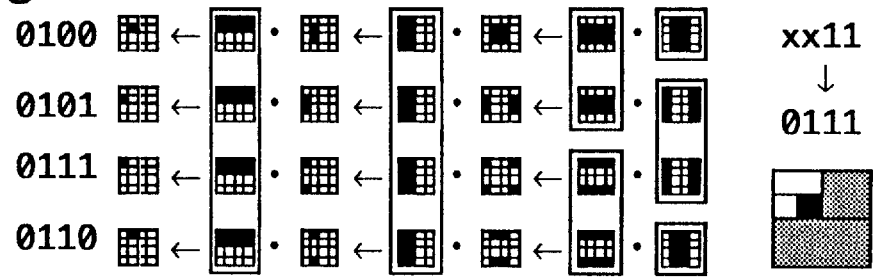
Figure 27C:
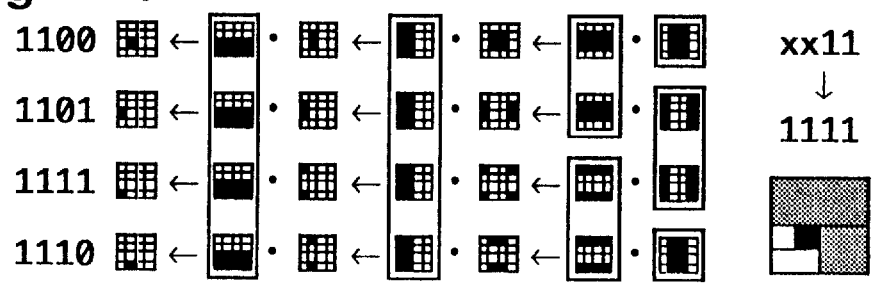
Figure 27D:
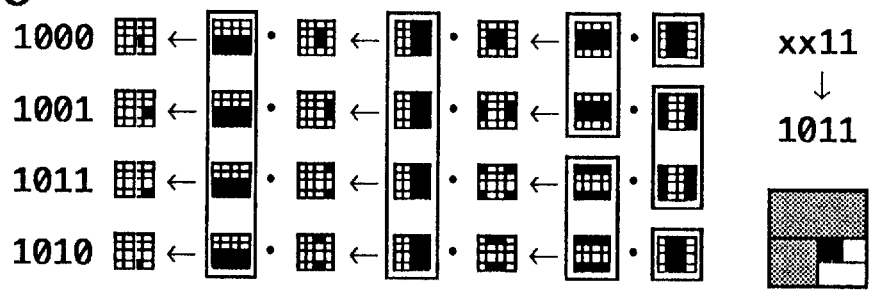
Figure 28A:
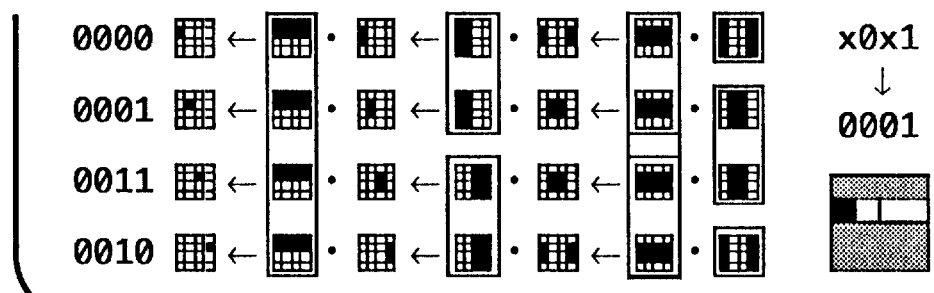
Figure 28B:
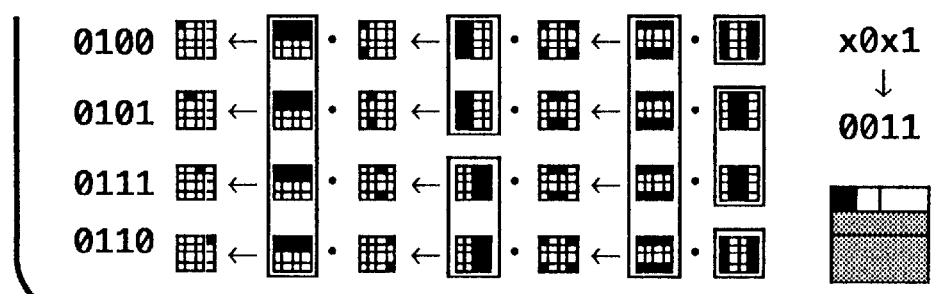
Figure 28C:
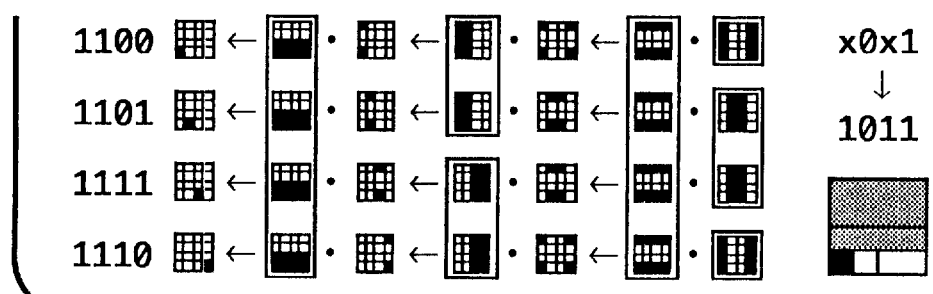
Figure 28D:
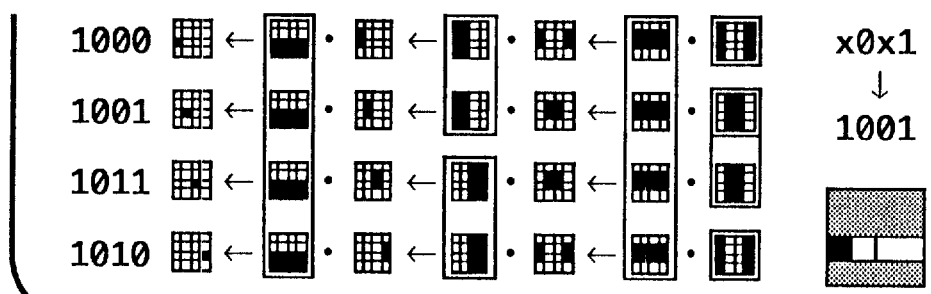
Figure 29A:
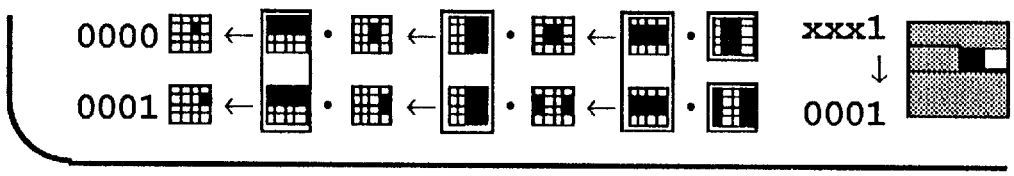
Figure 29B:
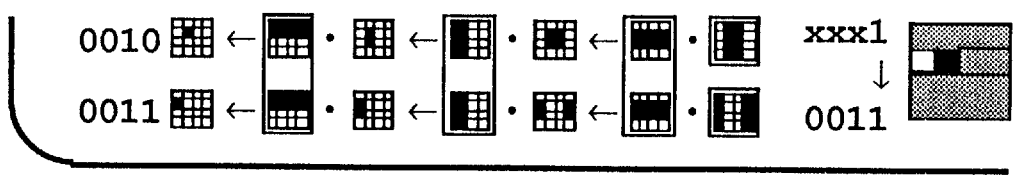
Figure 29C:
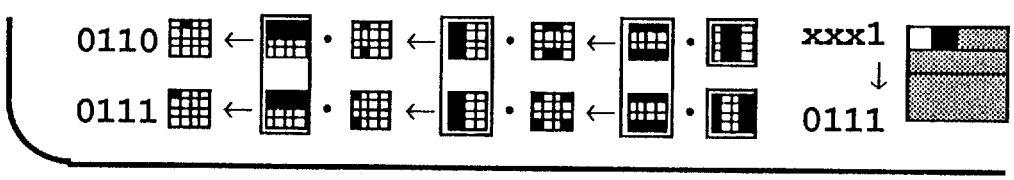
Figure 29D:
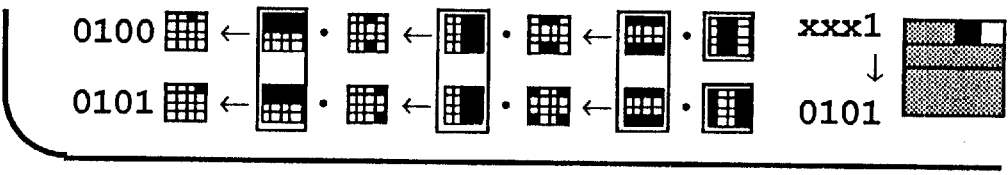
Figure 29E:
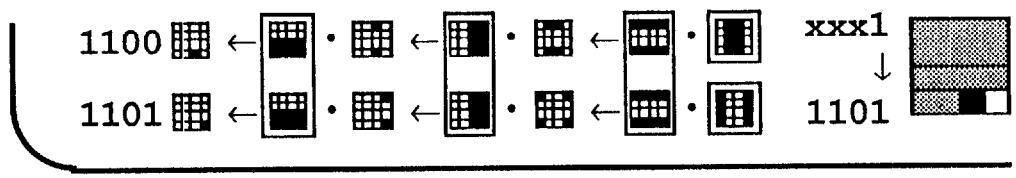
Figure 29F:
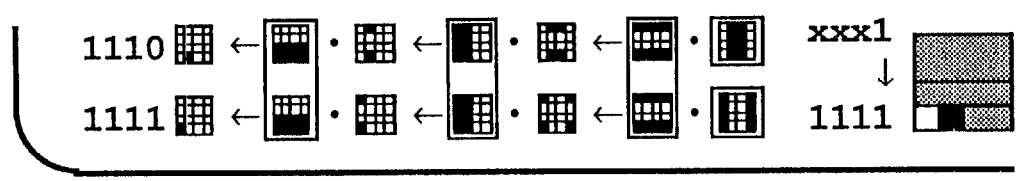
Figure 29G:
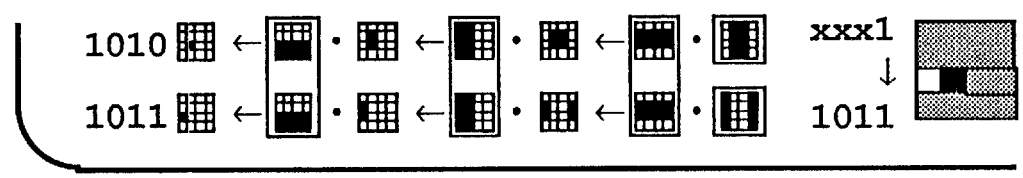
Figure 29H:
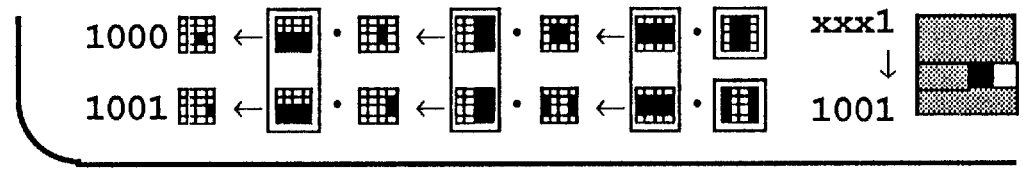

FIGS. 21–29 illustrate methods of modular element selection for nine modular configurations which comprise object name spaces 1901, 1902, 1903, 1904, 1905, 1907, 1908, 1909 that can be allocated in a single network module of the present invention which provides the "potential for a machine that dynamically is reconfigures itself based on the state of the machine rather than in a predetermined control sequence." Referring to FIG. 21, the range of logical element names 2100 for a sixteen-element, binary, 4-dimensional object space configuration and their derivation 2101, 2102, 2103, 2104, 2105, 2106, 2107 is shown. A method of selecting a particular element 2100 named "0000" from a set of elements configured as a binary, 4-dimensional object space 1909 is shown in FIG. 21 and includes the steps of inputting, using a first input, a signal value corresponding to a logical zero, to select a first set of eight elements 2101 represented as an "inside pair" of columns; inputting, using a second input, a signal value corresponding to a logical zero, to select a second set of eight elements 2102 represented as a "inside pair" of rows; logically intersecting the first and second selected sets 2101, 2102 for a selected set of four elements 2103; inputting, using a third input, a signal value corresponding to a logical zero, to select a third set of eight elements 2104 represented as a "right-most pair" of columns; logically intersecting a selected set of four elements 2103 and a third set of eight elements 2104 for a selected set of two elements 2105; inputting, using a fourth input, a signal value corresponding to a logical zero, to select a fourth set of eight elements 2106 represented as a "right-most pair" of rows; and logically intersecting a selected set of two elements 2105 and a fourth set of eight elements 2106 for a unique element selection 2107.

Although the method of selecting a particular element From a set of elements configured as shown in FIG. 21, is described above as operating sequentially, the method, when practiced in accordance with the present invention, inherently operates in parallel. Furthermore, the method of selecting a particular element from a set of elements configured as shown in FIG. 21 also applies to elements configured as shown in FIGS. 22–29. The same logical name 2100 selects various element locations 2107 in FIGS. 21–29. Reversing the logical polarity of various inputs causes different sets of eight elements 2101, 2102, 2104, 2106 to be selected in FIGS. 21–29. Referring to FIGS. 24–29, six of the nine object space configurations 1901, 1902, 1903, 1904, 1905, 1907 of FIG. 19A comprise less than the sixteen elements 1300 of the network module of FIG. 13A. Accordingly, FIGS. 24–29 further illustrate element selection from each of the possible locations of six object space configurations 1901, 1902, 1903, 1904, 1905, 1907 in accordance with the method of the present invention.

Figure 30:
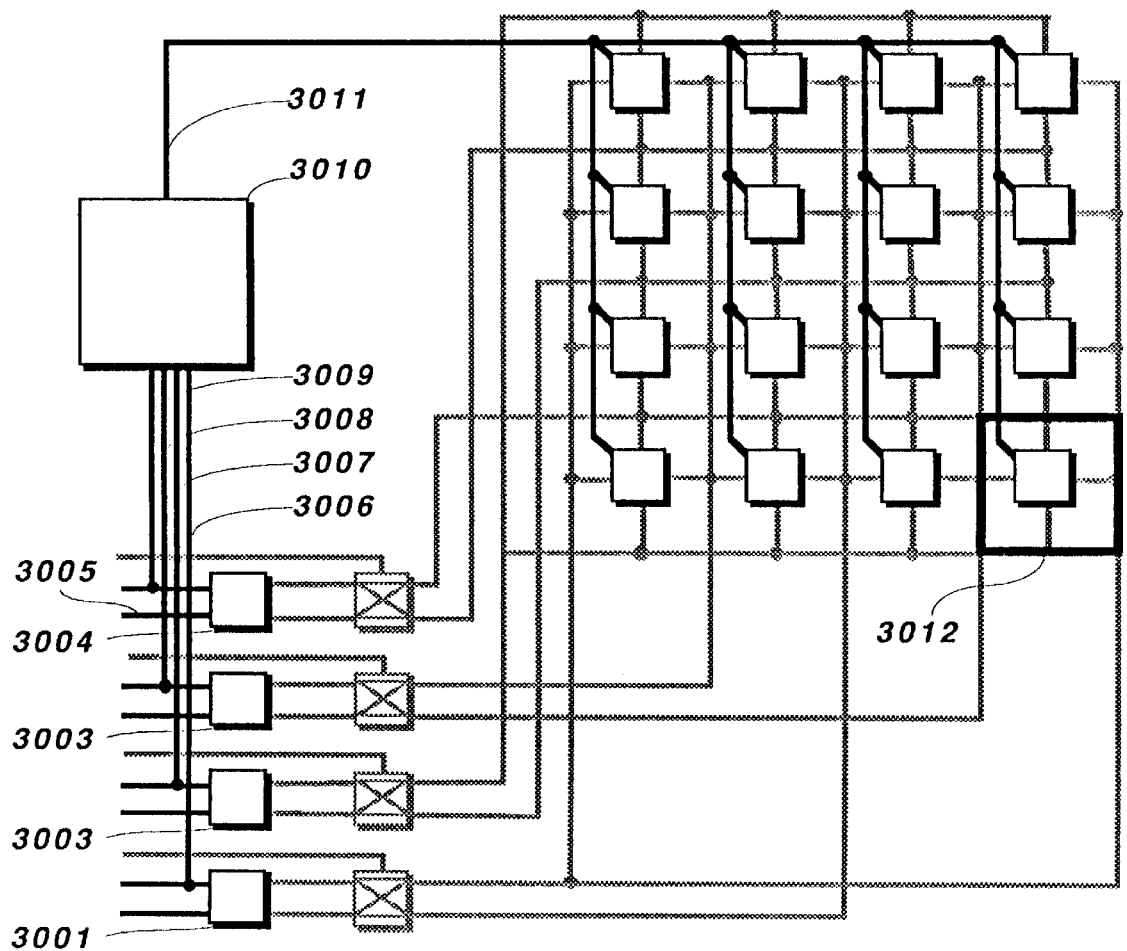
Figure 31A:
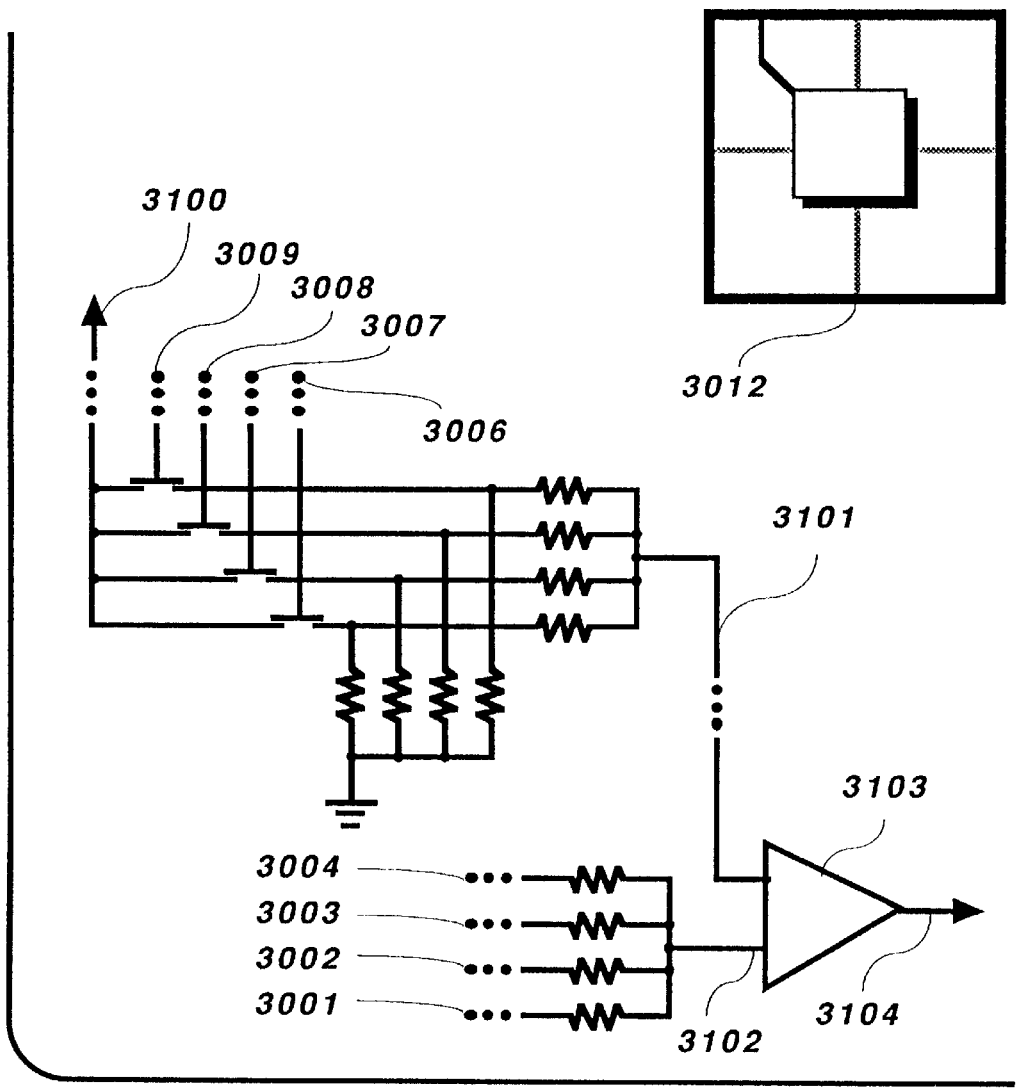
FIG. 31A shows a schematic diagram of a mixed-signal circuit which implements the selection level control mechanism 3010 of the polymorphic network module of FIG. 30.
Figure 31B:
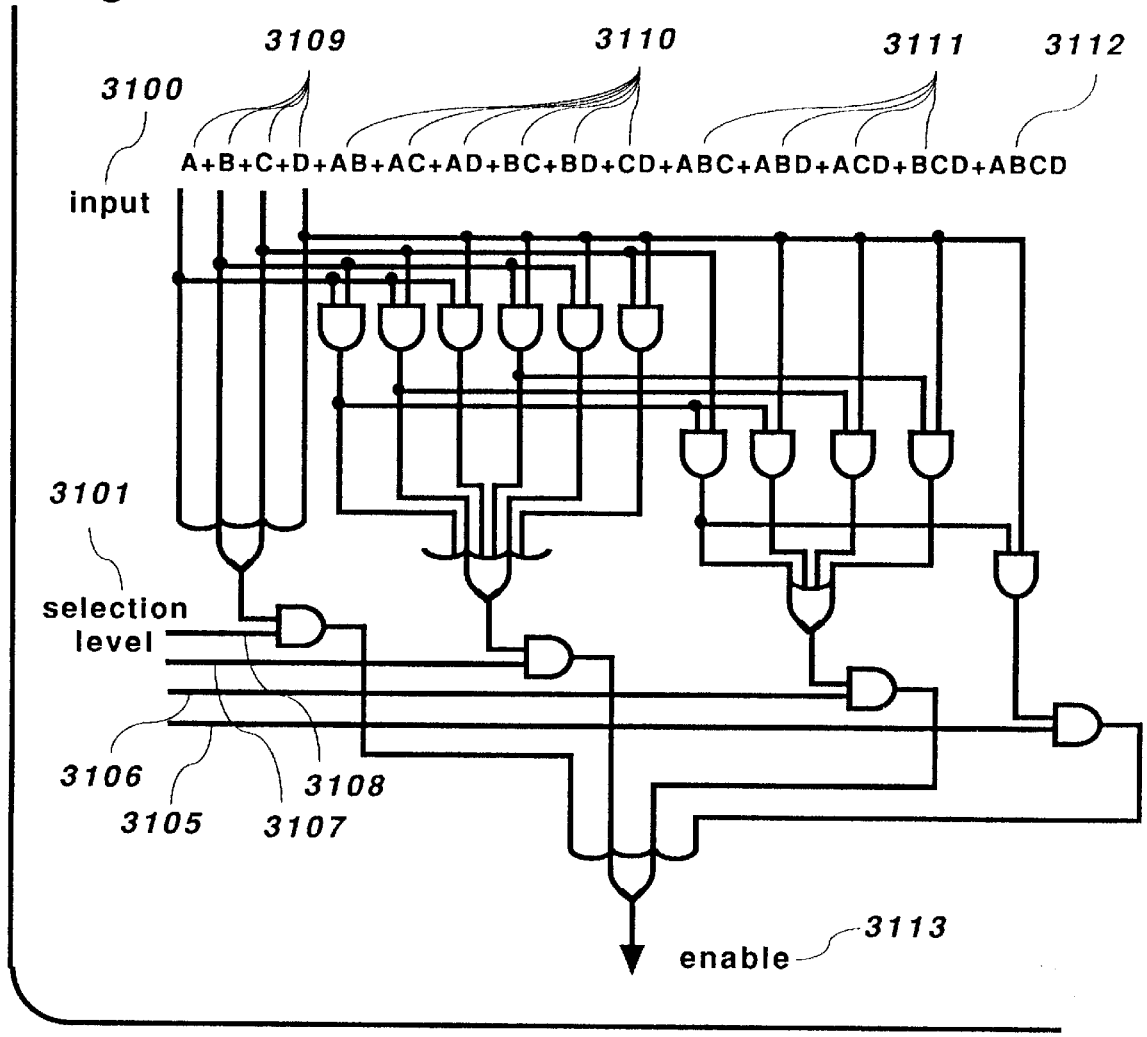
FIG. 31B shows a schematic diagram of a digital combinational circuit for an alternative implementation of a selection level control mechanism of the present invention.
Figure 32:
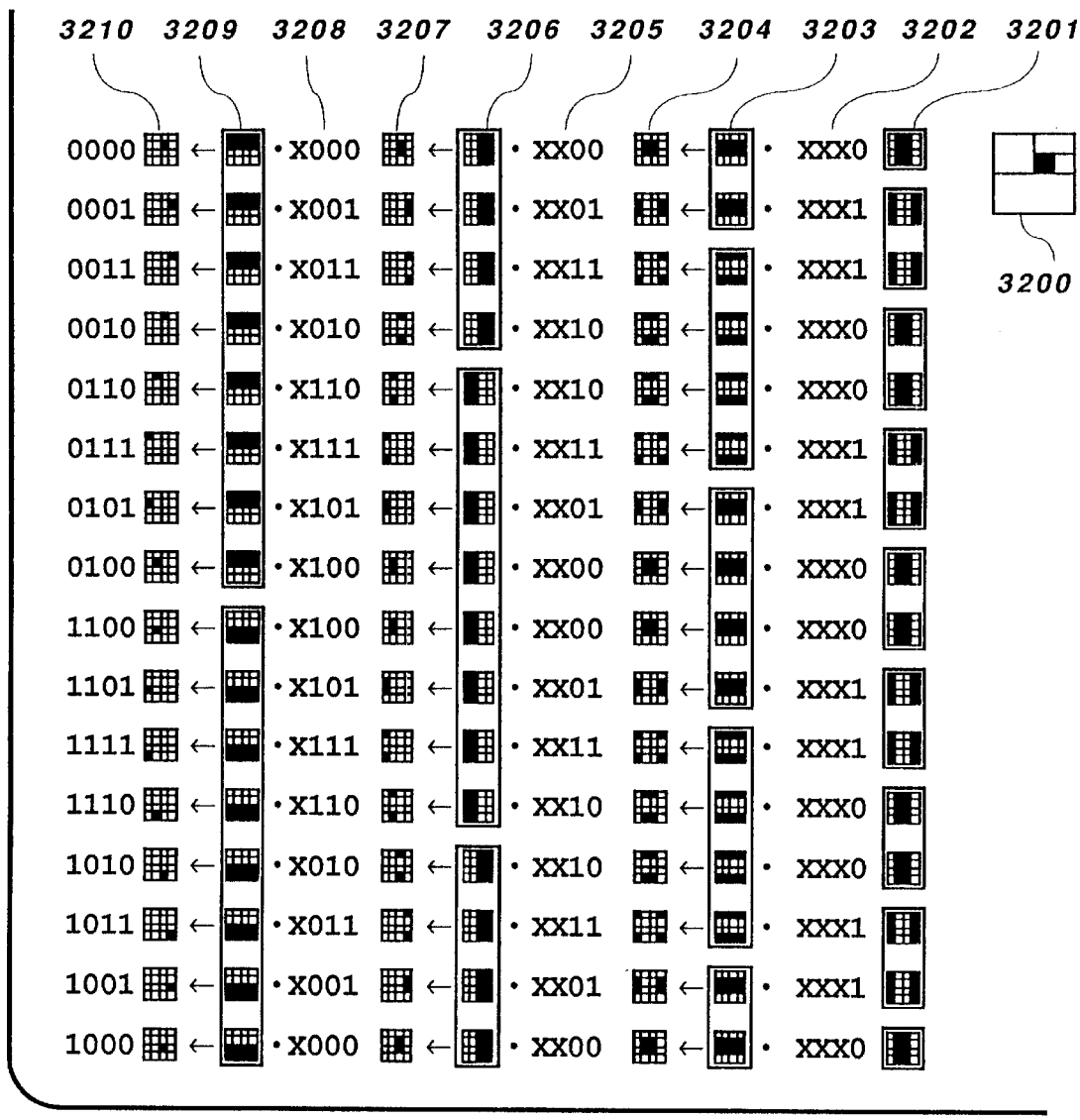

FIGS. 30–32 illustrate a method and apparatus comprising a polymorphic, interconnection network module for concurrent, multiple element selection. Referring to FIG. 30, input circuits 3001, 3002, 3003, 3004 comprise a data input 3005 for specifying which of a plurality of elements 3012 are to be selected and selection level control inputs 3006, 3007, 3008, 3009 for determining if one or a plurality of elements 3012 were to be selected. Selection level control inputs 3006, 3007, 3008, 3009 determine whether the value of the associated data input 3005 contributes to the logical name of an element selection event, thereby implementing a logical "don't care" for input circuits 3001, 3002, 3003, 3004 of FIG. 30. A control circuit 3010, responsive to selection level control inputs 3006, 3007, 3008, 3009, broadcasts a selection level control signal 3011 to all elements 3012 of FIG. 30. For example, if the signal values for selection level control input 3006, 3007, 3008, 3009 to input circuits 3001, 3002, 3003, 3004 corresponded to a logical zero, then the value of their associated data inputs 3005 contribute to the logical name of an element selection event, resulting in a four-level logical name for specifying the selection of a single element of FIG. 30. However, if the signal value for selection level control input 3009 to input circuit 3004 corresponded to a logical one and the signal values for selection level control input 3006, 3007, 3008 to input circuits 3001, 3002, 3003 corresponded to a logical zero, then the value of the associated data input 3005 for input circuit 3004 does not contribute to the logical name of an element selection event, resulting in a one-level "don't care" signal and a three-level logical name for specifying the concurrent selection of two elements of FIG. 30. Similarly, if the signal value for any two selection level control inputs 3006, 3007, 3008, 3009 to input circuits, 3001, 3002, 3003, 3004 corresponded to a logical one and the signal values for the other two selection level control inputs 3006, 3007, 3008, 3009 to input circuits 3001, 3002, 3003, 3004 corresponded to a logical zero, then a two-level "don't care" signal and a two-level logical name specifies the concurrent selection of four elements 3012 of FIG. 30. Likewise, if the signal value for any three selection level control inputs 3006, 3007, 3008, 3009 to input circuits 3001, 3002, 3003, 3004 corresponded to a logical one and the signal values for the remaining selection level control inputs 3006, 3007, 3008, 3009 to input circuits 3001, 3002, 3003, 3004 corresponded to a logical zero, then a three-level "don't care" signal and a one-level logical name specifies the concurrent selection of eight elements 3012 of FIG. 30. If the signal value for all four selection level control inputs 3006, 3007, 3008, 3009 to input circuits, 3001, 3002, 3003, 3004 corresponded to a logical one, then a four-level "don't care" signal specifies the concurrent selection of all sixteen elements 3012 of FIG. 30.

FIG. 31A shows a schematic diagram of a mixed-signal circuit which implements the selection level control mechanism 3010 of the polymorphic network module of FIG. 30. For every selection level control input 3006, 3007, 3008, 3009 corresponding to a logical zero a digital switch is open, a source signal 3100 is attenuated for a selection control signal 3011 further corresponding to a reference signal 3101 for a first input to the comparator circuit 3103 of FIG. 31A. Data input signals 3001, 3002, 3003, 3004 combine to comprise an element selection signal 3102 for a second input to the comparator circuit 3103 of FIG. 31A. If the comparator circuit 3103 of FIG. 31A determined the magnitude of an element selection signal 3102 input were greater than or equal to a reference signal 3101 input, then one or a plurality of elements 3012 are activated by their respective element selection signals 3104.

The schematic diagram of a digital combinational circuit of FIG. 31B shows an alternative implementation for a selection level control mechanism of the present invention. For a selection event which concurrently selects at least one, but less than sixteen elements of polymorphic network module of the present invention, only one of four selection level control inputs 3105, 3106, 3107, 3108 of FIG. 31B is active. A first selection level control signal 3105, for example, when electrically coupled to a four-level data signal 3112 activates the element enable signal 3113 of FIG. 31B for selecting one-of-sixteen interconnected elements. Similarly, a second selection level control signal 3106 when electrically coupled to a three-level data signal 3111 activates the element enable signal 3113 of FIG. 31B for selecting two-of-sixteen interconnected elements. Likewise, a third selection level control signal 3107 when electrically coupled to a two-level data signal 3110 activates the element enable signal 3113 of FIG. 31B for selecting four-of-sixteen interconnected elements. Additionally, a fourth selection level control signal 3108 when electrically coupled to a two-level data signal 3109 activates the element enable signal 3113 of FIG. 31B for selecting eight-of-sixteen interconnected elements. Finally, in a digital selection level control mechanism of the present invention an element enable signal 3113 of FIG. 31B is broadcast directly to all elements to select the entire module.

FIG. 32 illustrates a method for selecting one or concurrently selecting a plurality of elements of a polymorphic interconnection network module of the present invention. The configuration 3200 of FIG. 32 corresponds to a binary, 4-dimensional object space, wherein a set of eight elements 3201 is selected for a three-level selection level control signal and a one-level data signal 3202. In another example, a set of four elements 3204 is selected for a two-level selection level control signal and a two-level data signal 3105. In yet another example, a set of two elements 3207 is selected for a one-level selection level control signal and a three-level data signal 3108. In another example, a single element 3210 is selected for a four-level data signal. Although all possible arbitrary combinations of elements cannot be concurrently selected by the method of the invention, combinations of elements not concurrently selectable can be compiled as a sequence of concurrent selections in fewer steps than a process of individual element selection.

Figure 33:
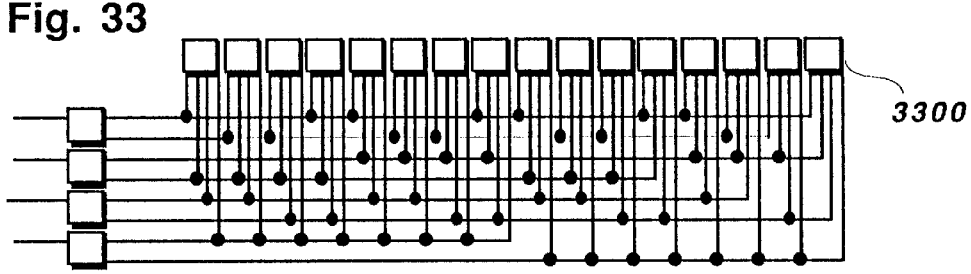
FIGS. 33–34 illustrate modular configuration for the interconnection network of the present invention. The four-by-four array of elements comprising the interconnection network of FIG. 13 is shown alternatively arranged as a linear array of elements in FIG. 33.
Figure 34:
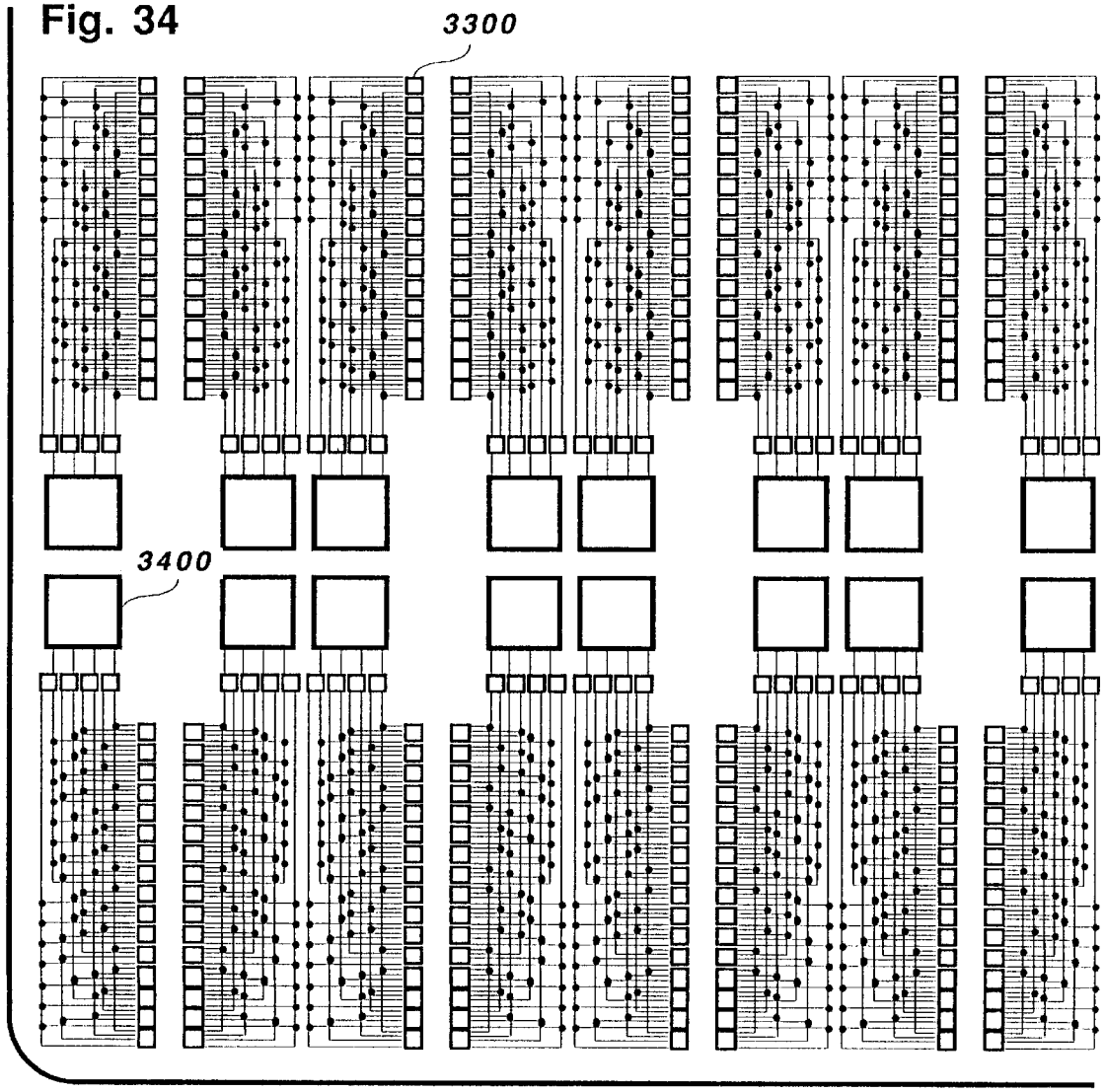

FIGS. 33–34 illustrate modular configuration for the interconnection network of the present invention. The four-by-four array of elements 1300 comprising the interconnection network of FIG. 13 is shown alternatively arranged as a linear array of elements 3300 in FIG. 33. FIG. 34 shows a modular arrangement comprising sixteen instances 3400 of the network module of FIG. 33, such that each modular instance can be interconnected as an element of a higher-level network, further satisfying a "principle of homogeneity, according to which a module and a higher unit cannot be distinguished by any of the conventions for dealing with them."

Figure 35:
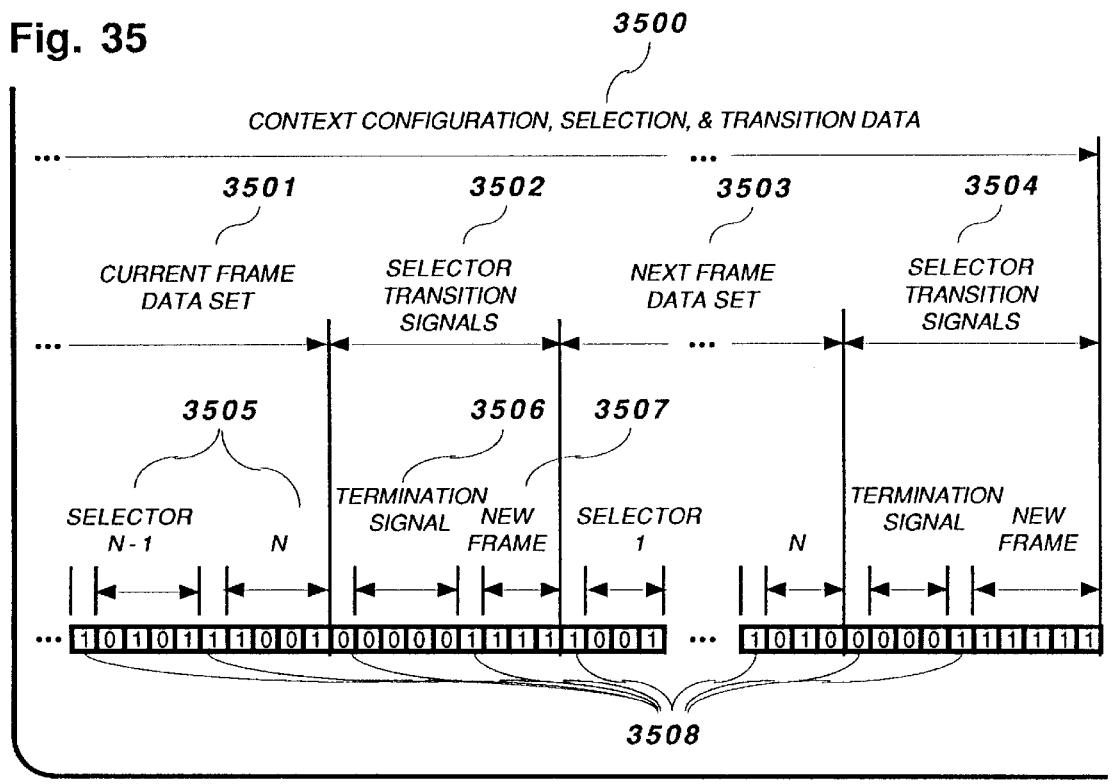

FIGS. 35–36 refer to object space configuration protocol. Gilbert and Moore, in "Variable-Length Binary Encodings," *The Bell System Technical Journal*, July, 1959, pp. 933–967, describe properties of certain variable-length binary encodings typically used for the storage or transmission of information. The self-synchronizing property, for example, deals with the ability of the deciphering circuits to get in phase automatically with the enciphering circuits without requiring special synchronizing circuits or synchronizing pulses. Thus, in some cases, variable length encodings may lend themselves to simpler instrumentation than fixed length encodings. Ideally, a principle of homogeneity suggests a correspondence between an internal representation and the corresponding form of the machine. FIG. 35 illustrates a dynamically varying, internal representation protocol for the configuration control mechanism of the present invention. The protocol of FIG. 35 is referred to as a context-configuration, element-selection, context-transition control stream 3500. The context control stream 3500 of FIG. 35 comprises a current frame data set 3501 having at least one selector 3505, selector transition signals 3502 having a termination signal 3506 followed by a new frame signal 3507, a next frame data set 3503, followed by its respective selector transition signals 3504. The terms frame, frame data, and selector referred to in FIG. 35 are defined in accordance with the method disclosed in a U.S. patent application by Estes and Walker, referenced above. Each selector 3505 and new frame signal 3507 of the context control stream 3500 of FIG. 35 is preceded by a prepended bit or data symbol 3508 corresponding to a logical one, whereas each termination signal 3506 is preceded by a prepended bit or data symbol 3508 corresponding to a logical one. The prepended bit or data symbol 3508 of FIG. 35 is inserted by an encoder in order to distinguish a selector 3505 which may comprise a sequence of data symbols corresponding to a sequence of logical zeros from a termination signal 3506 which always comprises a sequence of data symbols corresponding to a sequence of logical zeros.

Referring to FIG. 35, a method of the invention for generating a context-configuration, element-selection, context-transition control stream 3500 includes the steps of initializing the current frame data set 3501 having at least one data selector 3505, appending a next frame data set 3503 preceded by selector transition signals 3502, comprising an all-inputs-clear transition signal 3506 having j symbols corresponding to the number of symbols in a new frame 3507 and the plurality of data selectors 3505 of the next frame data set 3503 and a new frame 3507 for describing the logical configuration of system inputs. The method for generating a context control stream 3500 continues with the additional step of interpreting the state of system inputs as either an all-inputs-clear transition signal 3506 or a next data selector 3505. If an all-inputs-clear transition signal 3506 were detected, then the method for generating a context control stream 3500 continues with the additional steps of terminating the current frame data set 3501 and appending a second transition signal 3507. If the second transition signal 3507 were an all-inputs-clear transition signal 3506, then the context control stream 3500 terminates; otherwise, the second transition signal 3507 is expected to be a new frame 3507. If the state of system inputs were determined to be a next data selector 3505, then the method for generating a context control stream 3500 continues by repeating the step of interpreting the state of system inputs as either an all-inputs-clear transition signal 3506 or a next data selector 3505. If, however, the state of system inputs were determined to be a new frame 3507 having k symbols corresponding to the number of symbols in the plurality of data selectors 3505 of the next frame data set 3503, then the method for generating a context control stream 3500 continues by repeating the steps of appending a next data selector 3505 until an all-inputs-clear transition signal 3506 is detected, and interpreting a second transition signal 3507 as either an all-inputs-clear transition signal 3506 for the terminating context control stream 3500 or a new frame 3507 for appending a next frame data set 3503.

Figure 36A:
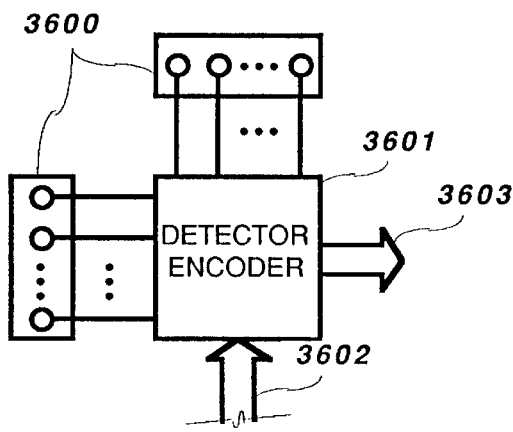
Figure 36B:
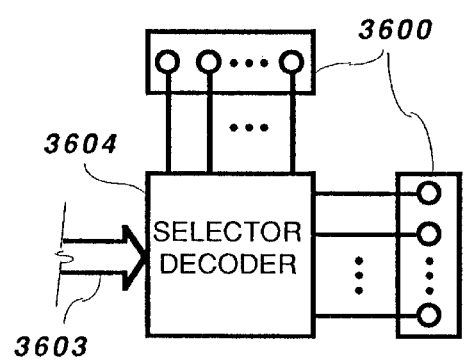
Figure 37A:
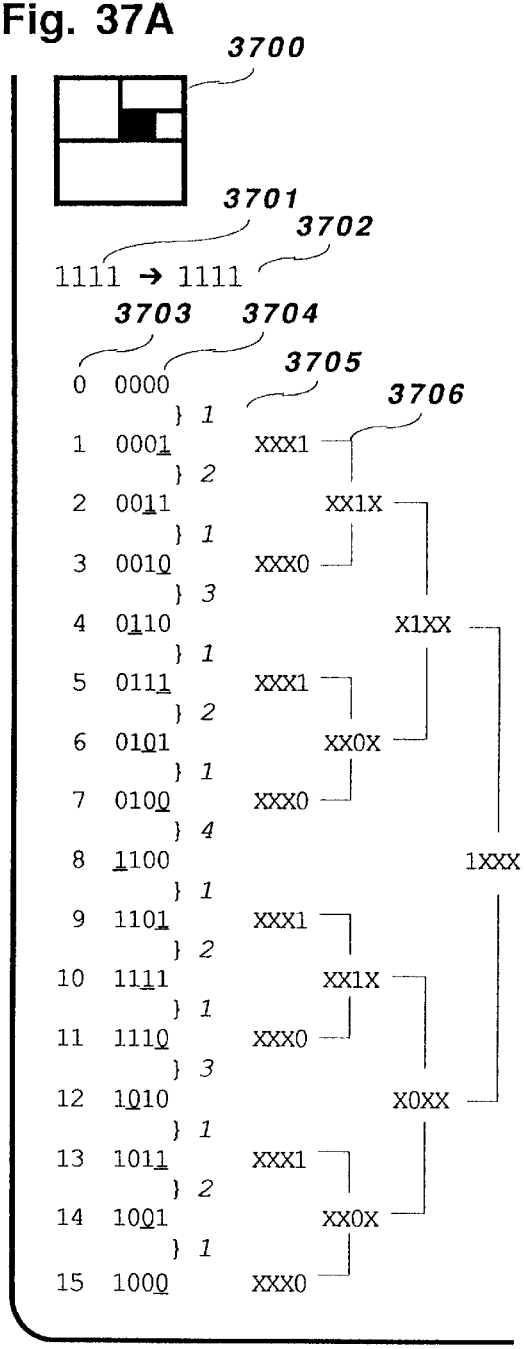
FIGS. 37A–37H show examples of sixteen-element object space configurations along with their respective Gray code transition sequences.
Figure 37B:
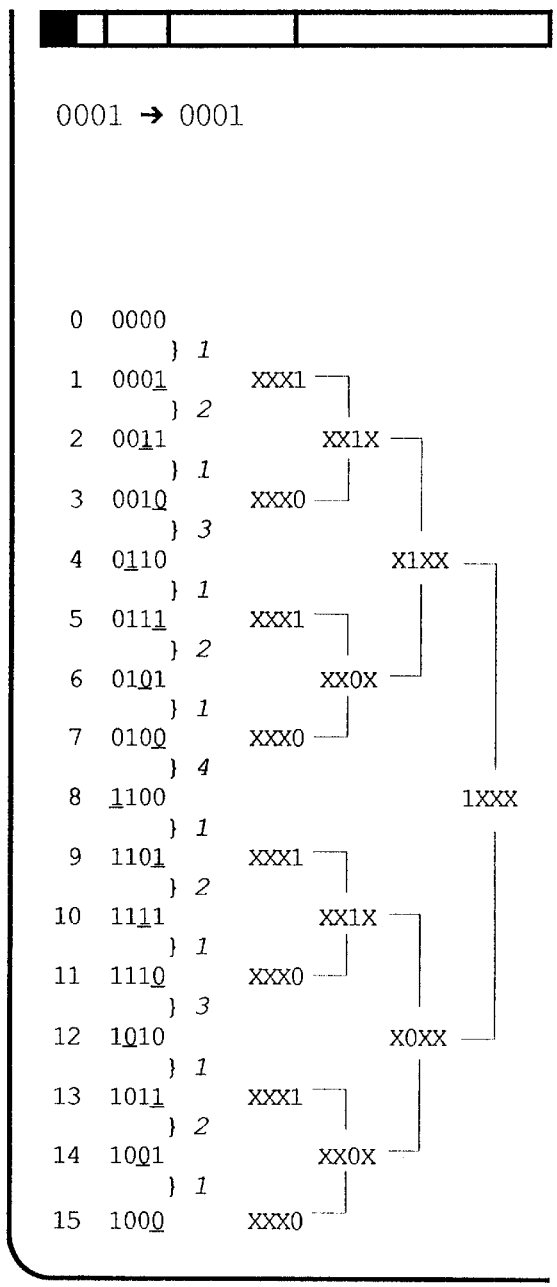
Figure 37C:
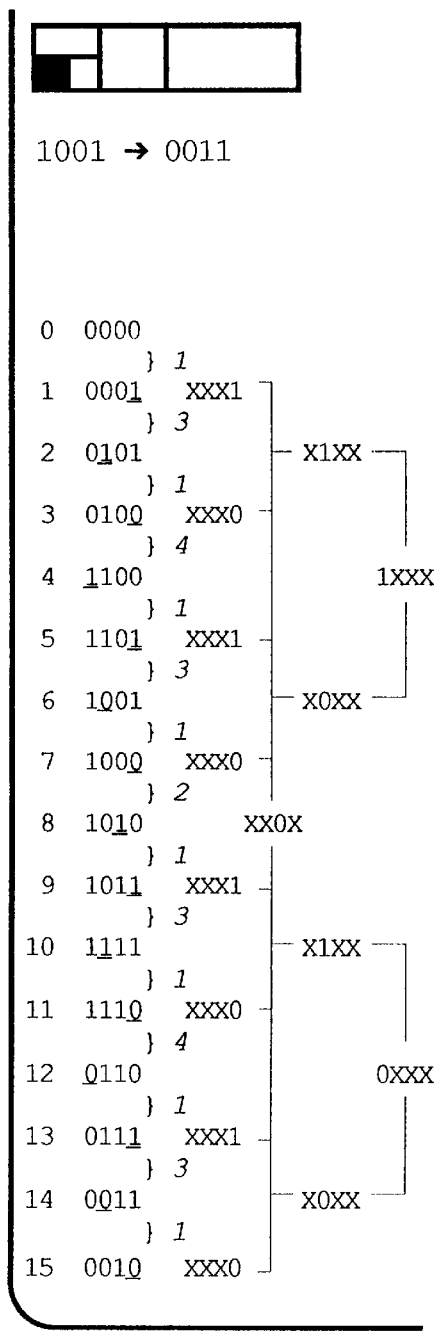
Figure 37D:
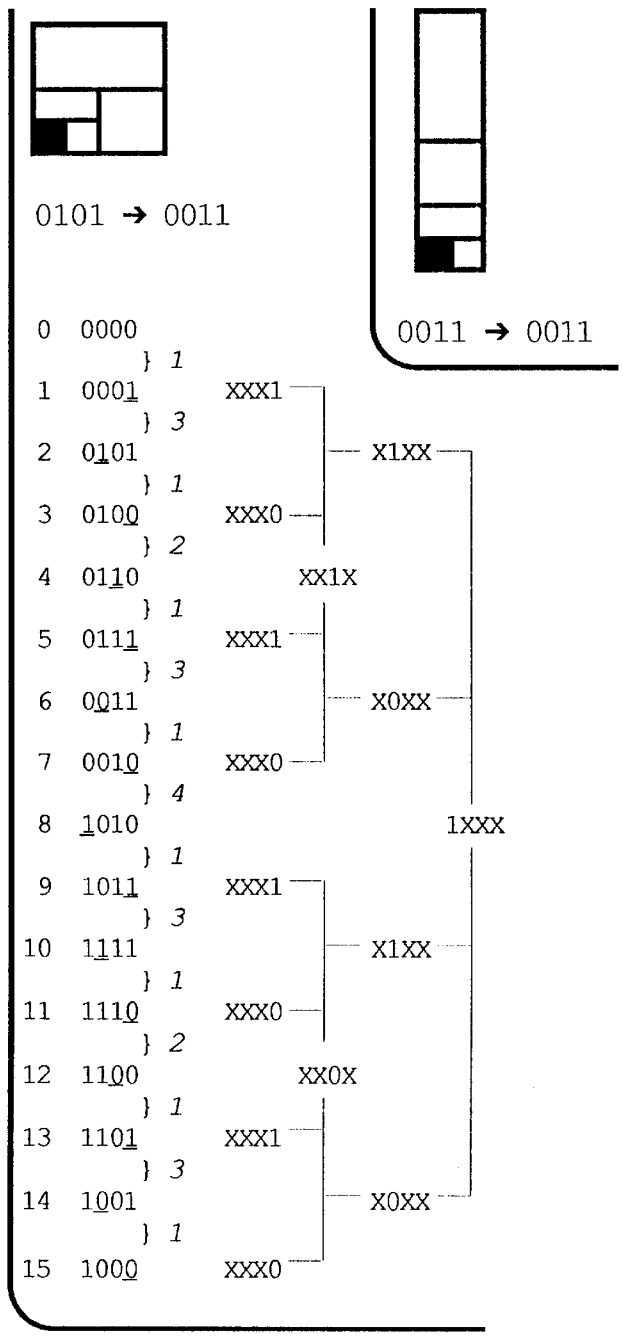
Figure 37E:
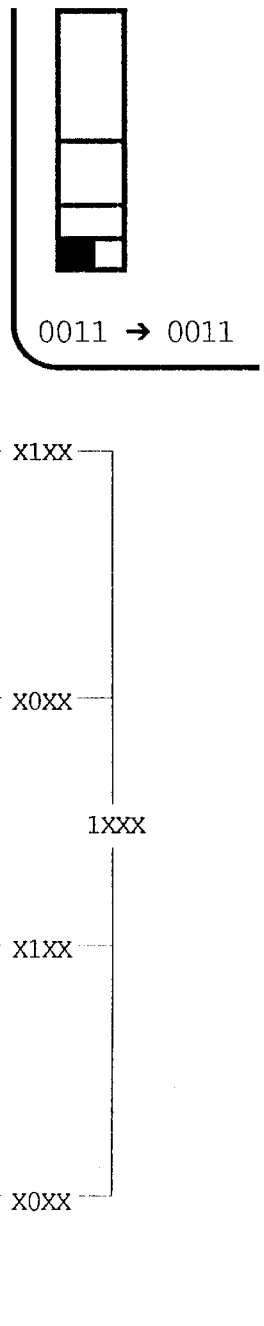
Figure 37F:
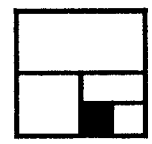
Figure 37G:
Figure 37H:
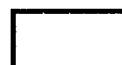

FIGS. 36A–36D illustrate block diagrams of various encoder/decoder configurations which rely upon the protocol of the present invention for context-configuration, element-selection, and context-transition. FIG. 36A is a block diagram which shows a signal detector/encoder 3601 for detecting a plurality of signal detectors 3600 logically configured in accordance with the configuration control method of the present invention, such that the plurality of signal detectors 3600 can be logically configured as mixed-radix, N-dimensional object spaces. The encoder 3601 of FIG. 36A, in response to input signals 3602, generates a context-configuration, element-selection, context-transition control stream 3603. FIG. 36B is a block diagram which shows a signal decoder/selector 3604 for activating a plurality of selected signal detectors 3600 logically configured in accordance with the configuration control method of the present invention, such that, in response to a context-configuration, element-selection, context-transition control stream 3603, the plurality of selected signal detectors 3600, are logically configured as mixed-radix, N-dimensional object spaces. FIG. 36C is a block diagram which shows a signal detector/encoder 3601 for detecting a plurality of signal detectors 3600 and a signal decoder/selector 3604 for activating a plurality of selected signal detectors 3600 coupled by a transmitter 3605 and a receiver 3606. A context-configuration, element-selection, context-transition control stream 3603 generated by the encoder 3601 of FIG. 36C is processed for a message 3607 communicated between a transmitter 3505 and a receiver 3506, for subsequent decoding by a signal decoder/selector 3604 for activating a plurality of selected signal detectors 3600. FIG. 36D is a block diagram which shows a pair of signal encoder/decoder devices 3608, 3609 for detecting, encoding, decoding, and selecting a plurality of signal detectors 3600 logically configured in accordance with the configuration control method of the present invention, coupled by a pair of transmitter/receiver devices 3610, 3611.

FIGS. 37–38 illustrate various Gray code transitions, some of which exhibit the potential for multiple concurrent transition sequence control. The present invention departs from conventional systems which rely on properties and methods of the concept of numbers and which generally operate iteratively within countable Euclidian spaces. Methods of the present invention rely upon an internal representation based on the primary form of a reflected binary code in accordance with a U.S. patent application by Estes and Walker, referenced above. Although Gray codes are inherently iterative and, in some instances, cyclic, a transition control mechanism of the present invention exploits the potential for multiple concurrent transition sequences within a particular Gray code. FIGS. 37A–37H show examples of sixteen-element object space configurations along with their respective Gray code transition sequences. In FIG. 37A, for example, a binary, 4-dimensional object space configuration 3700 is show along with its object frame 3701 and object descriptor 3702 in accordance with a U.S. patent application by Estes and Walker, referenced above. The Gray code transition sequence of FIG. 37A is illustrated by a numerical index 3703 associated with a four-level codeword 3704. Recall that a principal feature of all Gray codes is that the transition from a first codeword 3704 to a next, logically adjacent codeword 3704 is marked by a change in only one bit position. Bit positions of successive codewords 3704 which change are shown underlined, i.e., 0000; 000$\underline{1}$; 00$\underline{1}$1 . . . in FIG. 37A. A label 3705, numbered from the right, names the changed bit position between successive codewords 3704 of the gray code transition sequence of FIG. 37A. The tree-structured diagram 3706 further illustrates the transition structure between successive codewords 3704 of the Gray code transition sequence of FIG. 37A. The Gray code transition sequence for the 1-dimensional object space of FIG. 37B is identical to the Gray code transition sequence of FIG. 37A. FIGS. 38A–38D illustrate the object space configurations 3700 of FIGS. 37A–37H grouped according to characteristics of their respective Gray code transition sequences. A first group having the same Gray code transition sequence and comprising the object spaces 3700 of FIG. 37A and FIG. 37B, is shown in FIG. 38A. Similarly, a second group having the same Gray code transition sequence and comprising the object spaces 3700 of FIG. 37D and FIG. 37E, is shown in FIG. 38B. Likewise, a third group having the same Gray code transition sequence and comprising the object spaces 3700 of FIG. 37F and FIG. 37G, is shown in FIG. 38C. The object spaces 3700 of FIG. 37C and FIG. 37H, having unique Gray code transition sequences, is shown in FIG. 38D. The distinction between the various Gray code transition sequences of FIGS. 37A–37H can be readily apprehended by comparing the tree-structured diagrams 3706 illustrating the transition structure between successive codewords 3704 of each particular Gray code transition sequence. The distinctions can be further characterized in terms of the bit positions of a codeword 3704 associated with particular transition steps corresponding to a numerical index 3703 of FIGS. 37A–37H. For example, the bit in the fourth bit position of the codeword 3704 "$\underline{1}$100" is associated with transition step 8 of FIG. 37A, whereas the underlined bit in the second bit position of the codeword 3704 "10$\underline{1}$0" is associated with transition step 8 of FIG. 37C. These characteristic distinctions are described by the mixed-radix, seven-dimensional object space of FIGS. 39–40 which illustrate a method of the invention for controlling Gray code transition sequences of various object space configurations. Although, a method for visualization of mixed-radix, N-dimensional object spaces is fully disclosed in the U.S. patent application by Estes and Walker, referenced above, its practical utility for descriptive aggregation is conceptually similar to the problem of canonical term reduction for minimizing binary logic Functions of combinational circuits. Therefore, the method illustrated in FIG. 39 for controlling transitions in the modular, polymorphic network of the present invention utilizes the same fundamental conventions of the invention it seeks to enforce, e.g., control structure adaptation to dynamic, logical reconfiguration of element address spaces. The transition control method of FIG. 39, while implementing an important operative feature of the invention, provides, at the same time, an illustrative application of the invention, demonstrating that a continuity between the machine level and all structures built up from it can be achieved in "problem-oriented machines" by satisfying a principle of homogeneity, according to which, "a module and a higher unit cannot be distinguished by any of the conventions for dealing with them." The transition control method of FIG. 39 further illustrates a correspondence between what is to be represented in a machine (external view) and the corresponding form in the machine (internal view). The transition control method of FIG. 39 illustrates a further correspondence between the internal representation and the corresponding form of the machine. The present invention demonstrates continuity between the machine level and all structures built up from this level in a manner not taught by the prior art.

Before describing the transition control method of FIG. 39 in detail, a feature of the mixed-radix, N-dimensional paradigm of the invention includes the potential for multiple, concurrent Gray code transition sequences, wherein levels of resolution corresponding to a range of properties for each dimensional attribute comprise independent Gray code transition sequences, as well as combining to form a composite Gray code transition sequence. Broadly, each dimension of a mixed-radix, N-dimensional object space corresponds to an attribute described, in turn, by an ordered set of properties which characterize some aspect of an application problem. In the case of the transition control method of FIG. 39, seven dimensions comprise an object space for describing control functions for various transition sequences. The first five dimensions 3901, 3902, 3903, 3904, 3905 of FIG. 39 describe object space configurations 3700 of FIGS. 37A–37H grouped according to characteristics of their respective Gray code transition sequences. A first dimension 3901 of FIG. 39 corresponds, for example, to the group of FIG. 38A having the same Gray code transition sequence and comprising the object spaces 3700 of FIG. 37A and FIG. 37B. A sixth dimension 3906 of FIG. 39 corresponds to an attribute of Gray code transition sequences described by grouping steps 3703 in which the same bit position of codewords 3704 changes. A first attribute property 3908 of the sixth dimension 3906 of FIG. 39 logically names the characteristic of a four-level Gray code transition sequence that numerical indexes, 2, 6, 10, and 14, are associated with codewords 3704 which change in the same bit position. A second attribute property 3909 of the sixth dimension 3906 of FIG. 39 logically names the characteristic of a four-level Gray code transition sequence that numerical indexes, 4 and 12, are associated with codewords 3704 which change in the same bit position. A third attribute property 3910 of the sixth dimension 3906 of FIG. 39 logically names the characteristic of a four-level Gray code transition sequence that the numerical index, 8, is associated with codewords 3704 in various Gray code transition sequences which change in the same bit position. A seventh dimension 3907 of FIG. 39 corresponds to an attribute of Gray code transition sequences describing a particular bit position of codewords 3704. A first attribute property 3911 of the seventh dimension 3907 of FIG. 39 logically names the second bit position, numbered from the right, of codewords 3704. A second attribute property 3912 of the seventh dimension 3907 of FIG. 39 logically names the third is bit position, numbered from the right, of codewords 3704. A third attribute property 3913 of the seventh dimension 3907 of FIG. 39 logically names the fourth bit position, numbered from the right, of codewords 3704. As noted above, the distinction between the various Gray code transition sequences of FIGS. 37A–37H can be readily apprehended by comparing the tree-structured diagrams 3706 illustrating the transition structure between successive codewords 3704 of each particular Gray code transition sequence. Relations 3914 between properties of attributes which describe characteristics of Gray code transition sequences identify, in a single view, object space configurations in changes in a particular bit position occur for the same steps in a range of gray transition sequences.

The method of controlling Gray code transition sequences illustrated in FIG. 39 begins with the step of allocating a context configuration control network comprising a plurality of dimensions 3901, 3902, 3903, 3904, 3905 corresponding to attributes which name groups of related object space configurations; a next dimension 3906 corresponding to an attribute of Gray code transition sequences described by grouping named transitions in which the same bit position of codewords changes; and a final dimension 3907 corresponding to an attribute of Gray code transition sequences describing a particular bit position of codewords. The method continues with the steps of inputting data to the context configuration control network which represents a particular object space configuration; inputting data to the context configuration control network corresponding to a particular step in a Gray code transition sequence for determining the bit position which changes to produce the next codeword in a particular Gray code transition sequence; or, optionally, inputting data to the context configuration control network corresponding to a particular bit position of a codeword for a particular Gray code for determining if the bit position is a next, logically adjacent for a particular Gray code transition sequence.

Figure 40:
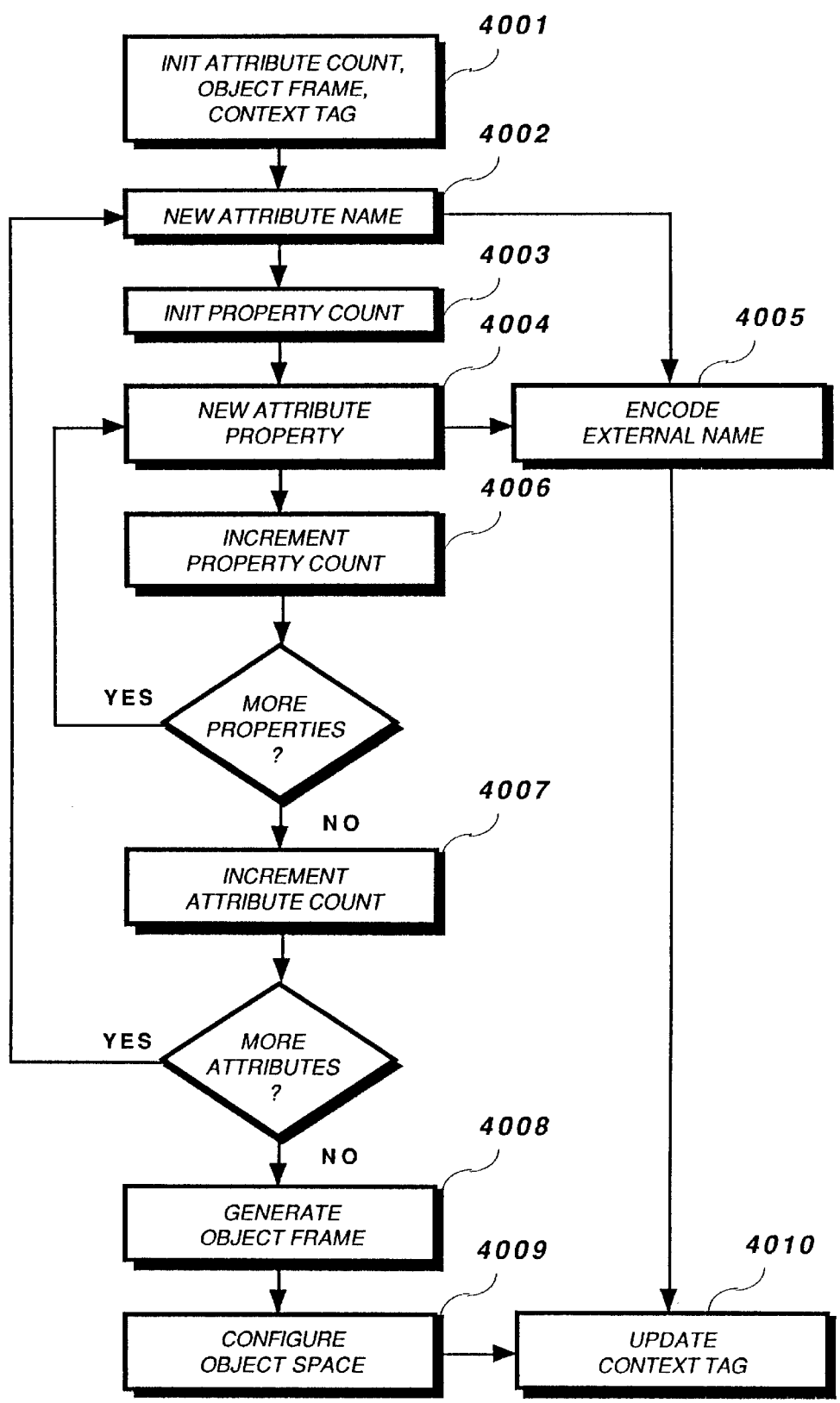

FIG. 40 shows a flow chart diagram illustrating a method of context configuration control. The notion of context control in accordance with the present invention has two meanings. A first meaning of context control pertains to a particular object space comprising a set of attributes and their respective properties. A second meaning of context control pertains to a composite object space wherein at least one of its attributes is described by properties comprising relations of yet another object space, i.e., a space of spaces. Both expressions of context control require, at times, a compact selector encoding relations between various attribute properties to be decoded for the purpose of adding or deleting attributes of an object space, modifying properties of an attribute, modifying relations between attribute properties, or modifying values associated with relations between attribute properties. The method of context configuration control illustrated in FIG. 40 comprises the steps of initializing an attribute count 4001 for generating an object frame 4008; initializing an object frame 4001 for configuring an object space 4009; initializing a context tag 4001 for uniquely identifying an object space 4010 inputting a new attribute name 4002 for describing a particular object space 4009; encoding the external representation of a new attribute name 4005 for an internal association with a particular object space configuration 4009; and updating the context tag 4010 for uniquely identifying an object space 4010.

The method of context configuration control of FIG. 40 continues with the additional steps of initializing a property count 4003 for a current attribute 4002 description; inputting a new attribute property name 4003 for describing a current attribute 4002; encoding the external representation of a new attribute property name 4005 for an internal attribute description in association with a particular object space configuration 4009; and updating the context tag 4010 for uniquely identifying an object space 4010.

The method of context configuration control of FIG. 40 continues with the steps of incrementing an attribute property count 4006 for a current attribute 4002; and repeating the step of inputting a new attribute property name 4003 for describing a current attribute 4002 until the final attribute property 4004 for a current attribute description 4002 has been received. If the final attribute property 4004 for a current attribute description 4002 were received, then the method of context configuration control of FIG. 40 continues with the additional steps of incrementing an attribute count 4007 for a current attribute 4002; and repeating the step of inputting a new attribute name 4002 until the final attribute 4002 for describing a particular object space 4009 has been received. If the final attribute 4002 were received, then the method of context configuration control of FIG. 40 terminates with the steps of generating an object frame 4008; configuring an object space 4009; and updating a context tag 4010.

Both the method of transition control of FIG. 39 and the method of context configuration control of FIG. 40, while implementing important operative features of the invention, provide, at the same time, illustrative applications of the invention. These methods can be characterized as "low" or "machine" level applications in that they implement functions for controlling fundamental operations of the modular, polymorphic network of the present invention. FIGS. 41–42, described below in the Illustrative Applications of the Invention, relate to applications respectively characterized as "mid-level" and "high-level" applications, further demonstrating that a continuity between the machine level and all structures built up from it can be achieved in "problem-oriented machines."

ILLUSTRATION APPLICATION OF THE INVENTION

The illustrative applications of FIGS. 41–46 rely on a method for generating mixed-radix, N-dimensional object spaces which can be visualized that is fully disclosed in the U.S. patent application by Estes and Walker, referenced above. Accordingly, higher-level applications of the modular, polymorphic network of the present invention utilize the same fundamental conventions of the invention employed by lower-level methods, e.g., control structure adaptation to dynamic, logical reconfiguration of element name spaces, satisfying a principle of homogeneity, according to which, "a module and a higher unit cannot be distinguished by any of the conventions for dealing with them." The illustrative applications of FIGS. 41–46 further demonstrate a correspondence between what is to be represented in a machine (external view) and the corresponding form in the machine (internal view). The present invention demonstrates continuity between the machine level and all structures built up from this level in a manner not taught by the prior art.

Before describing the illustrative applications of FIGS. 41–46 in detail, a feature of the mixed-radix, N-dimensional paradigm of the invention includes mixed, multiple levels of resolution corresponding to a range of properties for each dimensional attribute. Broadly, each dimension of a mixed-radix, N-dimensional object space corresponds to an attribute described, in turn, by an ordered set of properties which characterize some aspect of an application problem.

FIGS. 41A and 41B illustrate a mid-level application relating to conversion between internal representations. A mid-level application is referred to herein as corresponding to internal, system-level utility procedures which operate above lower-level machine functions to support higher-level procedures. FIG. 41A shows a table which describes a relation 4102 between sixteen instances 4100 of binary, four-bit codewords 4101 and sixteen instances 4100 of reflected binary, four-bit codewords 4103. Conversion between binary codewords 4101 and reflected binary codewords 4103 is illustrated in FIG. 41A as a collection of input transitions 4102. Input transitions 4102 are described in terms of bit positions, numbered from the right, which change when converting between the binary codewords 4101 and reflected binary codewords 4103 of FIG. 41A. For example, instances 14 and 15 4100 of FIG. 41A are shown having input transitions 4102 wherein the three right-most bit positions change when converting between the binary codewords 4101 and reflected binary codewords 4103. The fourth bit position from the right remains unchanged when converting between the binary codewords 4101 and reflected binary codewords 4103 of FIG. 41A. Applications like the codeword conversion table of FIG. 41A are typically implemented as a pair of one-way "jump" tables in prior art systems, wherein, for each look-up table, an index for an input codeword maps to a corresponding output codeword. The codeword conversion table of FIG. 41A, is shown in FIG. 41B as a single, two-way, binary-resolution, eight-dimensional object space, for dynamically configuring a modular polymorphic network of the present invention which functionally corresponds to a parallel, combinational circuit. Seven dimensions comprise an object space for describing control functions for various transition sequences. The first dimension 4104 of FIG. 41B corresponds to an attribute property which describes the input codeword as either a binary codeword 4101, "B," or a reflected binary codeword 4103, "R." The next four dimensions 4105, 4106, 4107, 4108 of FIG. 41B correspond to attribute properties which describe the state of each bit position, i.e., clear or set, of an input codeword. Relations 4112, 4113 between properties of the first five dimensional attributes of FIG. 41B uniquely associate a particular codeword instance 4100 with a set of input transitions 4102 described by the final three dimensions corresponding to attribute properties which determine a control function output, i.e., NOP or toggle, in parallel, for each bit of an input codeword, when converting between the binary codewords 4101 and reflected binary codewords 4103 of FIG. 41A. For example, relations 4112 describe input transitions 4102 for instances 14 and 15 4100 of FIG. 41A for converting reflected binary codewords 4103, e.g., 1001, 1000, to binary codewords 4101, e.g., 1110, 1111, control functions for changing the state, i.e., toggling, of the three right-most bit positions are addressed.

FIGS. 42A and 42B illustrate an expression of a higher-level application which is implemented a manner which cannot be operatively distinguished from the mid-level illustrative application of FIGS. 41A–41B. Accordingly, higher-level applications of the modular, polymorphic network of the present invention utilize the same fundamental conventions of the invention employed by lower-level methods, e.g., control structure adaptation to dynamic, logical reconfiguration of element name spaces, satisfying a principle of homogeneity, according to which, "a module and a higher unit cannot be distinguished by any of the conventions for dealing with them." The illustrative application of FIGS. 42A and 42B further demonstrates a form of descriptive aggregation accomplished by formulating problems in higher-dimensional spaces, in a manner conceptually similar to the problem of canonical term reduction for minimizing binary logic functions of combinational circuits of FIGS. 41A–41B.

A transaction scenario for the illustrative application of FIGS. 42A and 42B involves the problem of approving a speculative, residential construction loan application based on an estimated unit-cost of construction being lower than a current unit-market-price for a similar product in a given location. The formulation of the problem of FIGS. 42A and 42B involves characterizing a stream of property transactions in dynamically changing markets for comparison to similarly characterized loan applications. The number of dimensional attributes and the range of their respective properties describing the illustrative application of FIGS. 42A and 42B have been intentionally kept to a minimum in order to pedagogically emphasize features of the invention. FIG. 42A is a transaction description 4200 table, with a first attribute 4201 describing a property location by the properties 4205 "east" or "west;" a second attribute 4202 describing a property configuration by the properties 4206 "2 bedroom" or "3 bedroom;" a third attribute 4203 describing a relative size by the properties 4207 ">1500 sf" or "<1500 sf;" and a fourth attribute 4204 describing a property condition by the properties 4208 "like new" or "needs work." A composite relation between particular properties of attributes 4201, 4202, 4203, 4204 logically names an instance value 4209 for an average, current unit-market-price. Conventionally, relations comprising more than two or three variables are visually presented as a plurality of charts, tables, or graphs.

FIG. 42B, however, illustrates the transaction description 4200 of FIG. 42A as a single, higher-dimensional object space which can be visualized. A feature of the mixed-radix, N-dimensional paradigm of the invention includes visualization of higher-dimensional problem spaces, providing an essential external interface, further demonstrating a continuity between the machine level and all structures built up from this level in a manner not taught by the prior art. The binary, four-dimensional object space of FIG. 42B configures the transaction description 4200 table of FIG. 42A wherein a first dimensional attribute 4201 describing transactions having the location 4201 "east" are associated with a center pair of columns and transactions having the location 4201 "west" are associated with an outside pair of columns. A second dimensional attribute 4202 describing transactions having the configuration 4202 "2 bedroom" are associated with a center pair of rows and transactions having the configuration 4202 "3 bedroom" are associated with an outside pair of rows of FIG. 42B. A third dimensional attribute 4203 describing transactions having the size 4203 ">1500 sf" are associated with a right-most pair of columns and transactions having the size 4203 "<1500 sf" are associated with a left-most pair of columns of FIG. 42B. A fourth dimensional attribute 4204 describing transactions having the condition 4204 "like new" are associated with a top-most pair of rows and transactions having the condition 4204 "needs work" are associated with a bottom-most pair of rows of FIG. 42B. A relation 4210 between particular properties of attributes 4201, 4202, 4203, 4204 logically names an instance value 4209 for an average, current unit-market-price, e.g., west, 3 bedroom, >1500 sf, like new.

The external representations of higher-dimensional problem spaces of FIGS. 39, 41B, and 42B comprise a novel form of multidimensional spreadsheet interface not taught in the prior art. The spreadsheet is well known as one of the most pervasive examples of conventional methods to formulate a problem visually. Structurally, conventional worksheets are analogous to files, columns within a worksheet are analogous to records, and rows of a worksheet are analogous to records. Functionally, a conventional spreadsheet interface permits a user to select a subset of records (rows) within a particular file (worksheet) and update values of specified fields (columns). A particular field (cell) is specified by its position (column) in a record (row). Changing the value of one field (cell) may trigger updating of other dependent (cell) values. The file/record/field view of a worksheet structure is not inherent in conventional spreadsheets, but a logical association applied to a manual, two-dimensional paradigm. One reason for the universal popularity of electronic spreadsheets is their free-form flexibility, enabling the user to enter and manipulate virtually any information that lends itself to a row-and-column format. Important forms of information, however, do not fit into the two-dimensional, row-and-column format. Furthermore, record-oriented models are not structurally sufficient to describe many important data relationships without significant redundancy (e.g., one-to-many, many-to-one, and many-to-many). When using conventional spreadsheets, problems are described so that both the data structure and computational methodology conform to spreadsheet characteristics. Arbitrary limits can be further imposed by perceiving problem-solving strictly in terms of operations. For example, consider the problem of locating manufacturing facilities relative to geographic markets in terms of transportation costs. The problem can be thought of as a linear operation performed on simple lists of data or, alternatively, the problem can be thought of as simpler operations performed in an integrated problem space. In moving from the first perception to the second, the "weight" of the problem is "factored" by distinguishing between the essentials of a problem and the formulation of a solution. Imposing an arbitrary scheme for organizing a solution makes it difficult to distinguish between the essentials of a problem and the formulation of alternative problem-solving strategies. Conventional electronic spreadsheets with their tabular scheme for organizing solutions are but one example of how perceptions of systems can become conditioned. It is much too easy to see a problem solely in terms of a tool or implementation technology, thereby limiting consideration of alternative approaches. Separating problem space formulation and the formulation of problem-solving strategies which navigate problem-space relationships is important, not only for more efficient implementations when simpler operations means a faster response, but also for timely consideration of alternative solutions.

Figure 43:
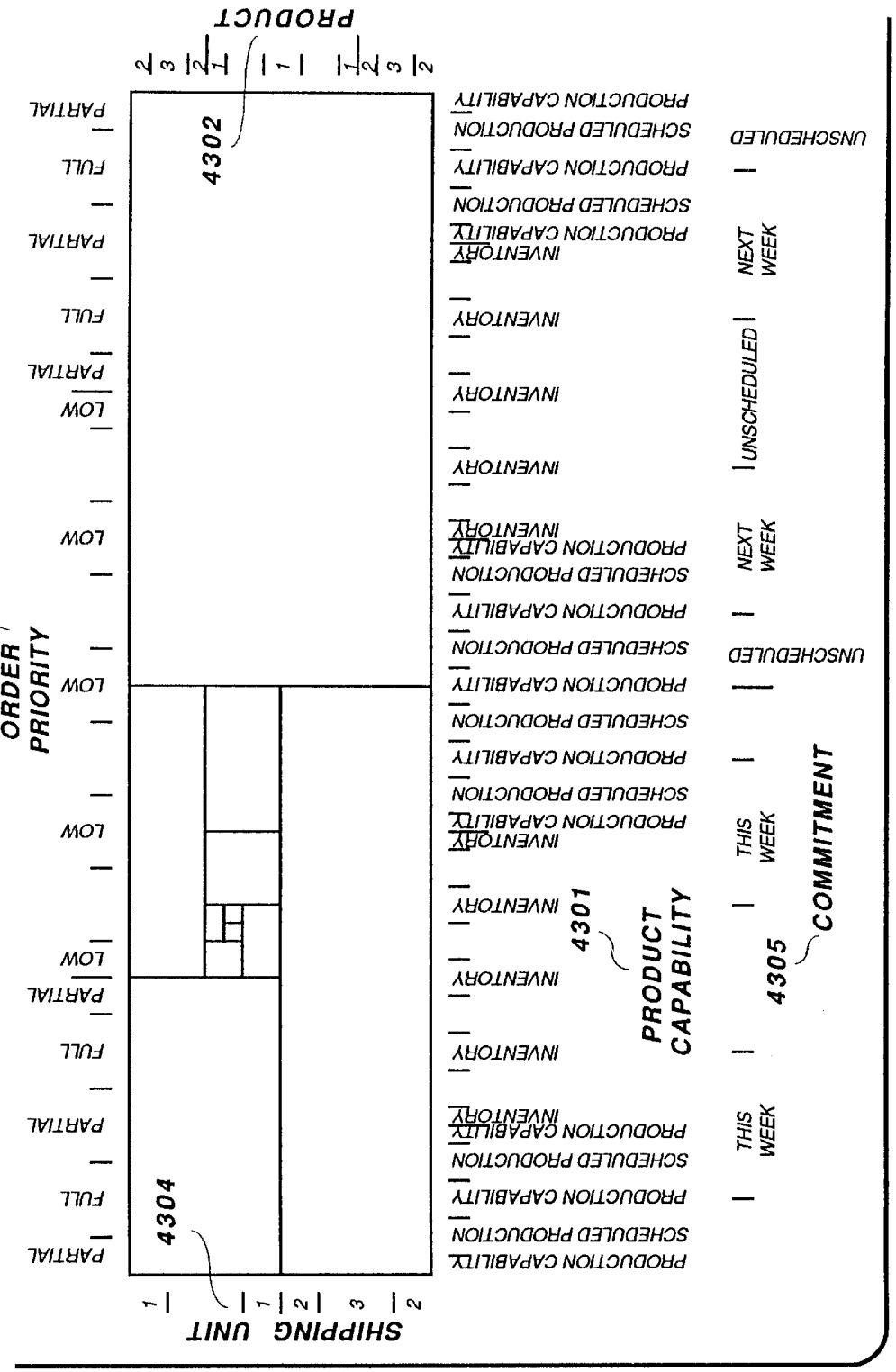

FIGS. 43–44 illustrate aspects of both problem space formulation and the formulation of problem-solving strategies which navigate problem-space relationships for another higher-level illustrative application related to resource management in general and production scheduling in particular. A brief discussion of background information relating aspects of the production management problem below to the context control problem of FIGS. 39–40 is now presented, before describing FIGS. 43–44 in detail.

A paper products manufacturing plant typically runs its products to order, inventorying only a small percentage of its production, owing largely to the number of customers requiring custom printing for sacks and bags, for example. At order entry a shipping date commitment must be given and future orders often depend on the reliability of a shipping date commitment. The ability to reliably make and meet shipping commitments depends on many factors, such as the inventory of raw materials and operator availability in response to forecasting seasonal market demands. Other factors influencing shipping date commitments include machine down-time, effective down-time due to inefficient set-up transitions in production streams, or preemptive scheduling, e.g., bumping a lower-priority customer s production schedule for a higher-priority customer. In plants that operate 24 hours per day, seven days a week, preemptive scheduling can be a serious problem when executive management make commitments that production management is expected to execute, without knowledge of who is being "bumped." Providing a real-time, executive-level view of production constraints has long been a problem without an acceptable solution in many manufacturing enterprises. Analytical solutions, in addition to being delayed, off-line views, are typically poor, linear approximations of non-linear problems. Goals of a production resource management system in such a plant may include:

1. reliable ship-date commitment mechanism at order entry;
2. minimum raw material and finished goods inventory;
3. maximum plant capacity utilization, e.g., long product runs; and
4. reliable sales/production forecasts. Such goals are easily generalized to a large class of applications concerned with implementing effective, system-wide resource management policies.

The mixed-radix, five-dimensional object space of FIG. 43 comprises a partial view of a larger problem space, wherein the object space may be considered to scroll vertically, extending the range of products 4302 and shipping units 4304. The partial view of a larger problem space of FIG. 43 may also be perceived as an active, physically-configured window into a larger virtual object space. FIGS. 44A–44L illustrate the formulation of problem-solving strategies which navigate problem-space relationships of FIG. 43. Referring to FIG. 43, a first dimensional attribute 4301, named product capability, is described by the properties relating to available inventory, production capability, and scheduled production. A second dimensional attribute 4302 of FIG. 43, named product, references product identifiers. A third dimensional attribute 4303 of FIG. 43, named order priority, is described by the properties relating to low, partial or full priorities. A fifth dimensional attribute 4305 of FIG. 43, named commitment, is described by properties relating to this week's production schedule, next week's, or not scheduled for production. An important nonlinear aspect of the production management problem is the discontinuity between an efficient product production stream comprising similar products and shipping units, which often comprise dissimilar products. Efficient production schedules depend on long production runs for the same product, whereas shipping unit commitments depend on production runs for different products. The object space of FIG. 43 provides a concurrent expression of both production streams and shipping units in a single view.

Figure 44G:
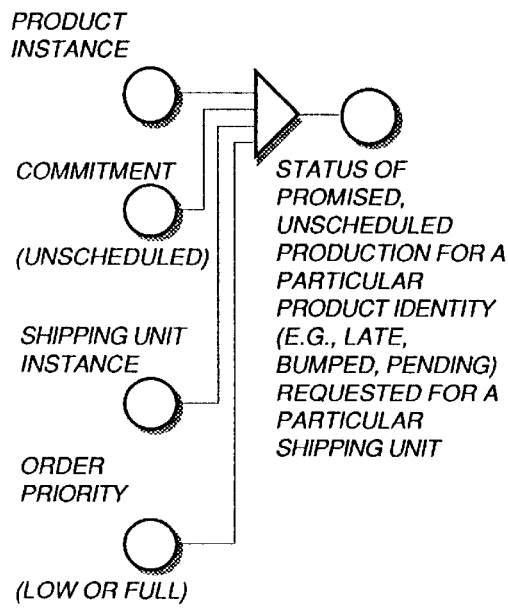

FIGS. 44A–44L illustrate problem-space relationships between properties of FIG. 43 for formulating problem-solving strategies for scheduling efficient production runs and monitoring the status of shipping unit commitments. FIG. 44A diagrams a relation between a product instance 4302 and a shipping unit instance 4304 for referencing the amount of a particular product for a particular shipping unit at order entry.

FIG. 44B illustrates a relation between a product instance 4302 and an inventory product capability 4301 for referencing the number of bales on hand for a particular product identity, e.g., an amount dynamically updated by production and shipping events.

FIG. 44C diagrams a relation between a product instance 4302 and its scheduled production capability 4301 for referencing the number of bales scheduled for production for a particular product identity, e.g., an amount dynamically updated by production and shipping events.

FIG. 44D illustrates a relation between a product instance 4302 and its potential production capability 4301 for referencing the number of bales per hour production capacity for a particular product identity, e.g., an amount determined from operational specifications for various machines.

FIG. 44E diagrams a relation between a product instance 4302 and an unscheduled commitment 4305 for referencing a backlog of the number of bales promised for production for a particular product identity, e.g., an amount determined by the difference between the amount requested at order entry of FIG. 44A and amount scheduled for production of FIG. 44C.

FIG. 44F illustrates a relation between a product instance 4302, its scheduled production capability 4301, and a commitment 4305 either this week's or next week's production schedule for a particular product identity, e.g., determined by referencing the number of bales scheduled for production of FIG. 44C.

Figure 44H:
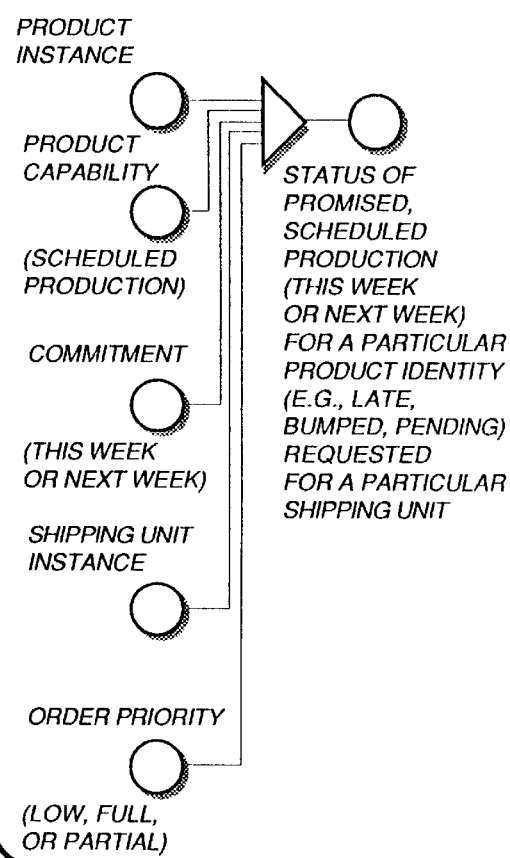
Figure 44I:
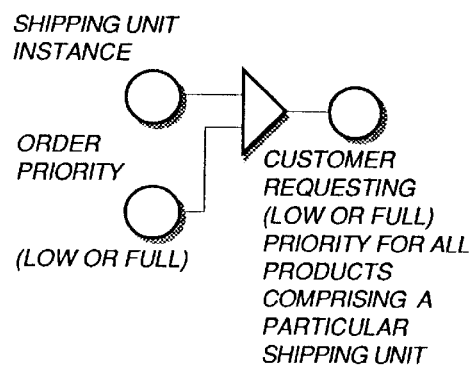
Figure 44J:
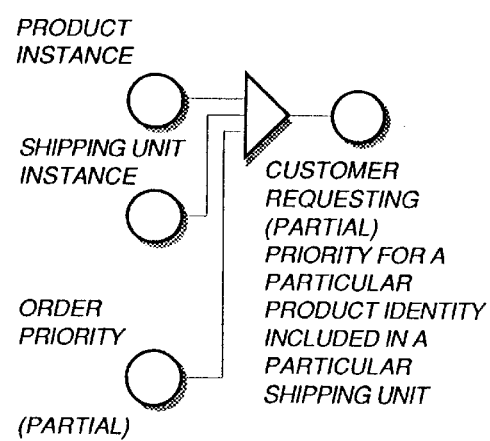
Figure 44K:
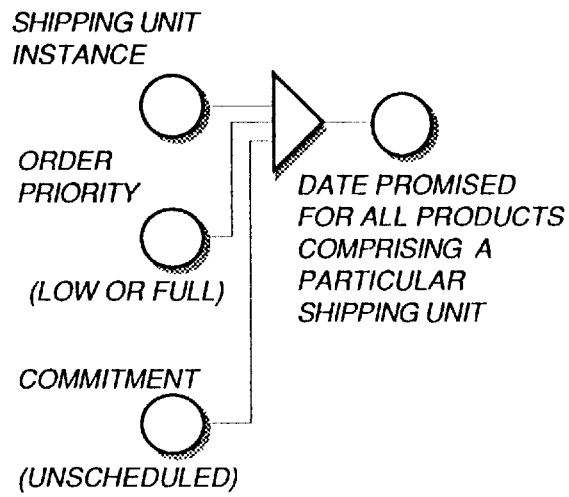

FIG. 44G diagrams a relation between a product instance 4302, an unscheduled commitment 4305, a shipping unit instance 4304, and a low, partial or full priority 4303 for referencing the status of promised, unscheduled production for a particular product identity, requested for a particular shipping unit, e.g., late, bumped, pending—determined by referencing the backlog of FIG. 44E in relation with date promised of FIG. 44K.

FIG. 44H illustrates a relation between a product instance 4302, its scheduled production capability 4301, a commitment 4305 either this week's or next week's production schedule, a shipping unit instance 4304, and a low, partial or full priority 4303 for a particular product identity, e.g., late, bumped, pending—determined by referencing the backlog of FIG. 44E in relation with date promised of FIG. 44K, and by referencing the number of bales scheduled for production of FIG. 44C.

FIG. 44I diagrams a relation between a shipping unit instance 4304, and a low or full priority 4304 for referencing a customer requesting a low or full priority for all products comprising a particular shipping unit, e.g., determined at order entry.

FIG. 44J illustrates a relation between a product instance 4302, a shipping unit instance 4304, and a partial priority 4303 for referencing a customer requesting a partial priority for a particular product identity included in a particular shipping unit, e.g., determined at order entry.

FIG. 44K diagrams a relation between a shipping unit instance 4304, a low or full priority 4303, and an unscheduled production commitment 4305 for referencing a date promised for all products comprising a particular shipping unit, e.g., determined at order entry.

Figure 44L:
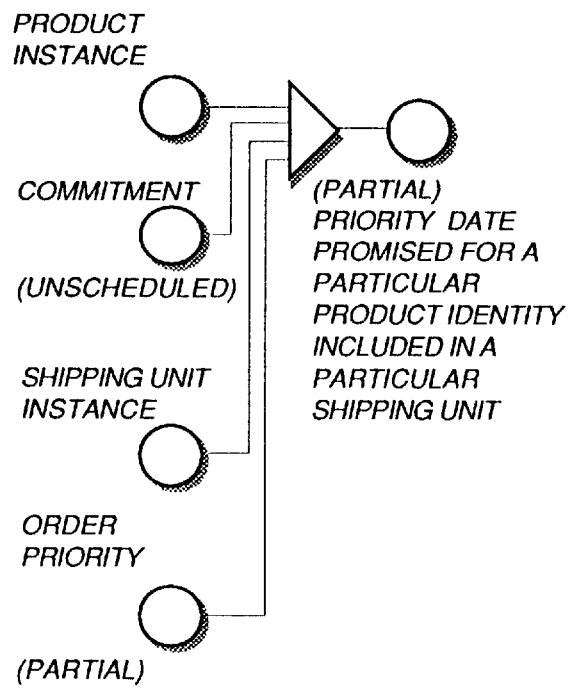

FIG. 44L illustrates a relation between a product instance 4302, a shipping unit instance 4304, a partial priority 4303, and an unscheduled production commitment 4305 for referencing a (partial) priority date promised for all products comprising a particular shipping unit, e.g., determined at order entry.

In the present invention an abstract machine (the description mechanism) provides an external interface to a logical machine (the causal mechanism), which is realized as a physical machine (the execution mechanism). The abstract machine is distinguished from both the logical and physical machines in that its operations are expressed in the domain of external representation whereas the others operate in a corresponding domain of internal representation. The logical machine is a virtual expression which extends the domain of internal representation realized by the physical machine. Technologies developed in the context of a problem-oriented domain can lead to fundamental changes in what we do, not just how we do it. The distinction is often a question of design—the interaction between creation and perception. If creation is considered to be a function of formulating multiple, concurrent contexts that can be shared and if perception is considered to be a function of dynamic context navigation, the design problem becomes the realization of a "dialogue-oriented machine" which assists in dynamically formulating and navigating contexts defined as object description spaces.

Leler, in his book entitled, *Constraint Programming Languages: Their Specification and Generation*, Addison-Wesley, Reading Mass., 1988, assumes user-computer interaction for the purpose of problem-formulation and problem-solving requires some form of programming language. Two forms of programming are contrasted: imperative versus declarative.

> In current imperative computer languages, such as C or Pascal, a program is a step-by-step procedure. To solve a problem using these languages, the user must manually construct and debug a specific executable algorithm. This style of problem solving has become so pervasive that it is common to confuse algorithm design with problem solving. The effort required to program using imperative languages tends to discourage programming and thus effectively restricts most users to canned application programs.

Figure 4:
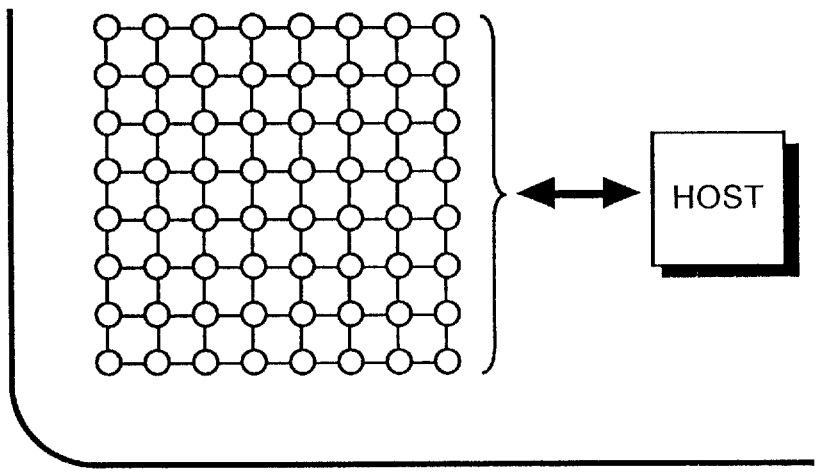
Figure 5:
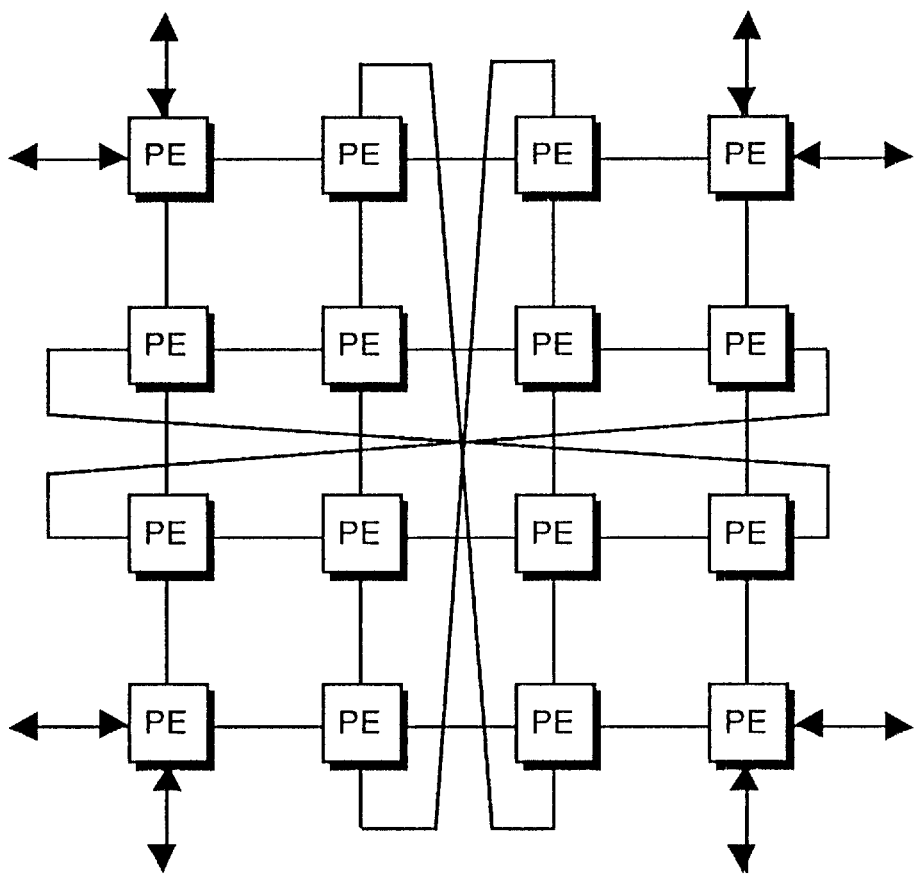
Figure 6:
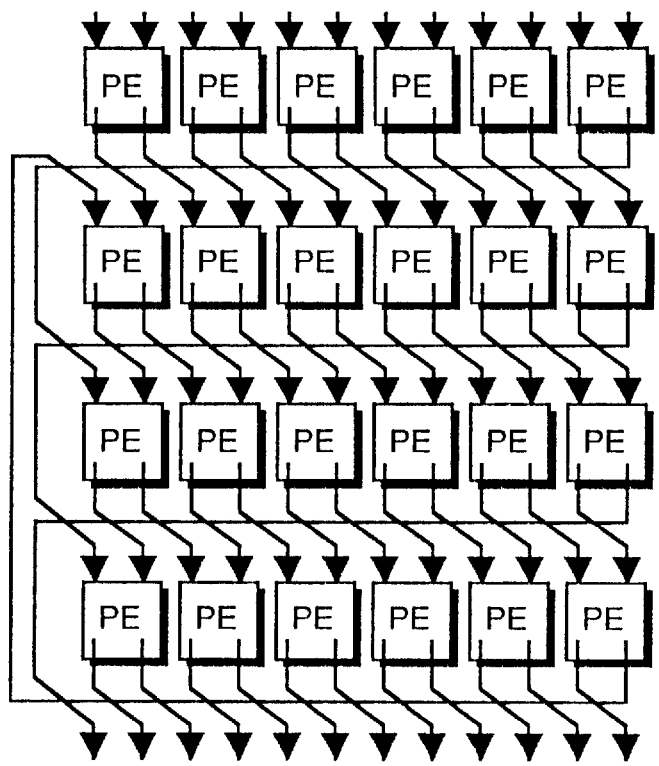
Figure 7:
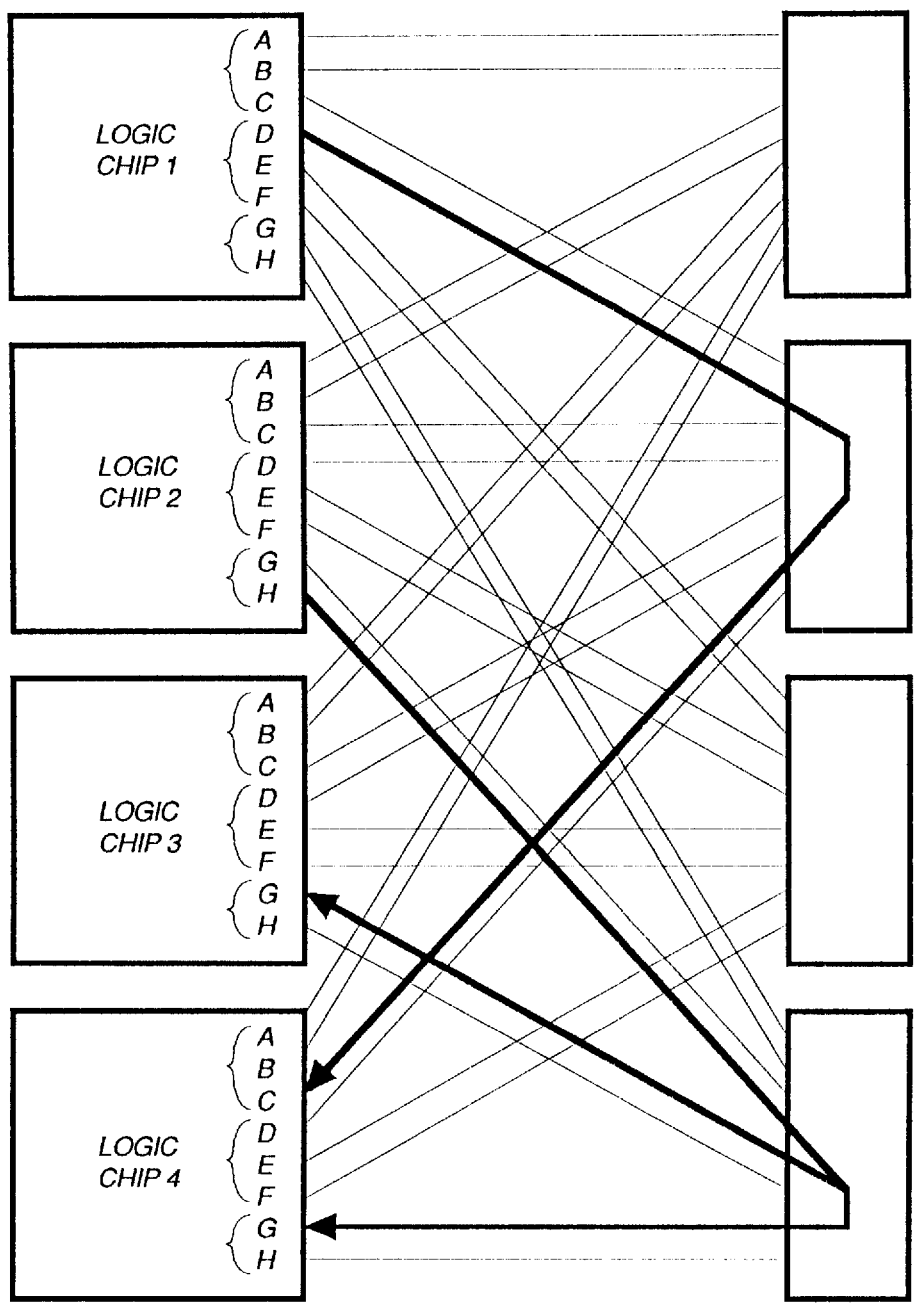
Figure 8:
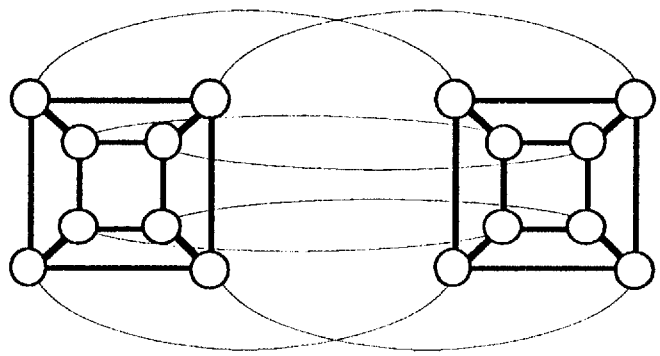
Figure 9A:
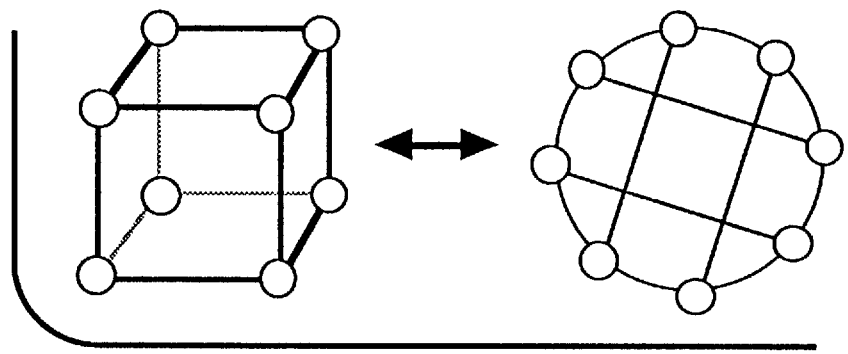
FIGS. 9A–9C illustrate a prior art representation of a mixed-radix, node addressing scheme, described in a paper by Bhuyan and Agrawal in their paper, "Generalized Hypercube and Hyperbus Structures for a Computer Network," *IEEE Transactions on Computers*, Vol. C-33, No. 4, April 1984, pp. 323–333, for use in designing a generalized hypercube (GHC) network.
Figure 9B:
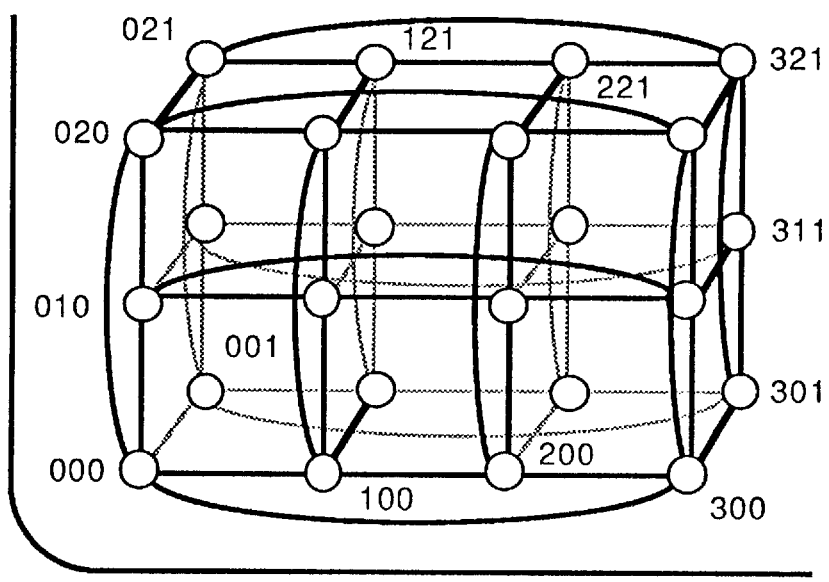
Figure 9C:
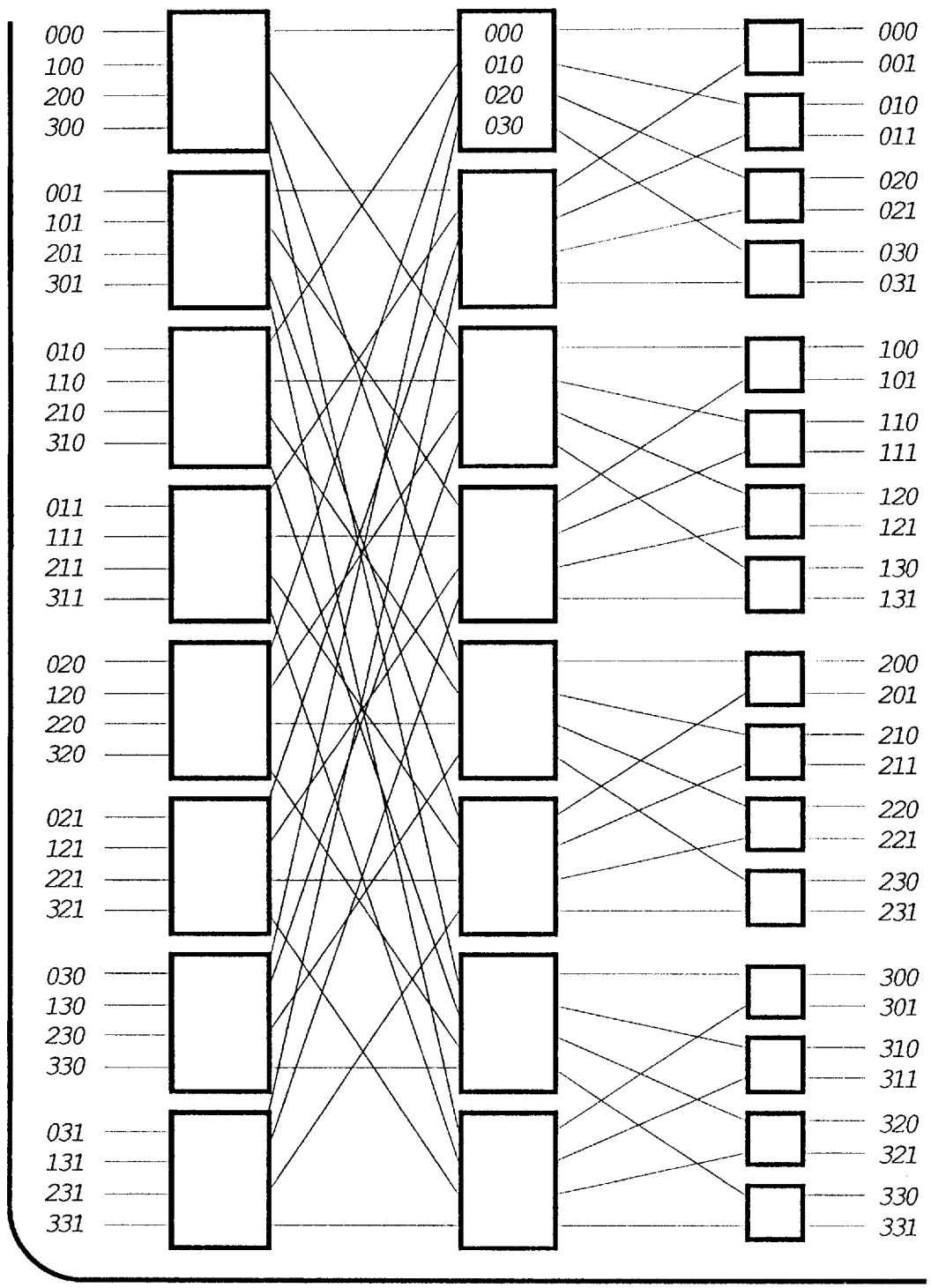
Figure 10A:
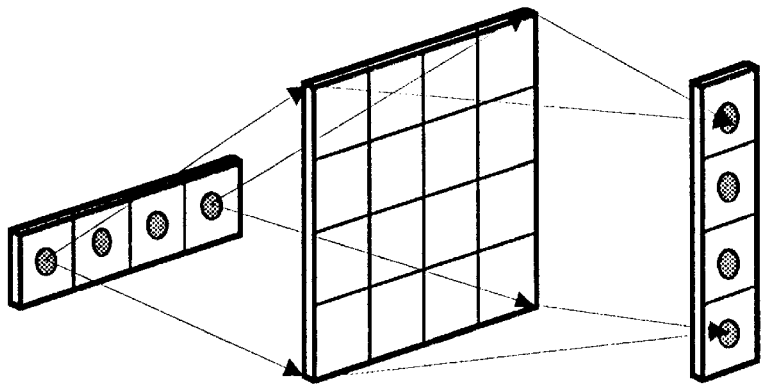
FIG. 10A illustrates a prior art spatial light modulator (SLM), described in a paper by Chiou, "Photorefractive optical Interconnects," in *Optical Computing Hardware*, Jahns and Lee eds., Academic Press, Boston, 1994, pp. 249–285, for implementing a programmable matrix mask which controls a reconfigurable interconnection pattern.
Figure 10B:
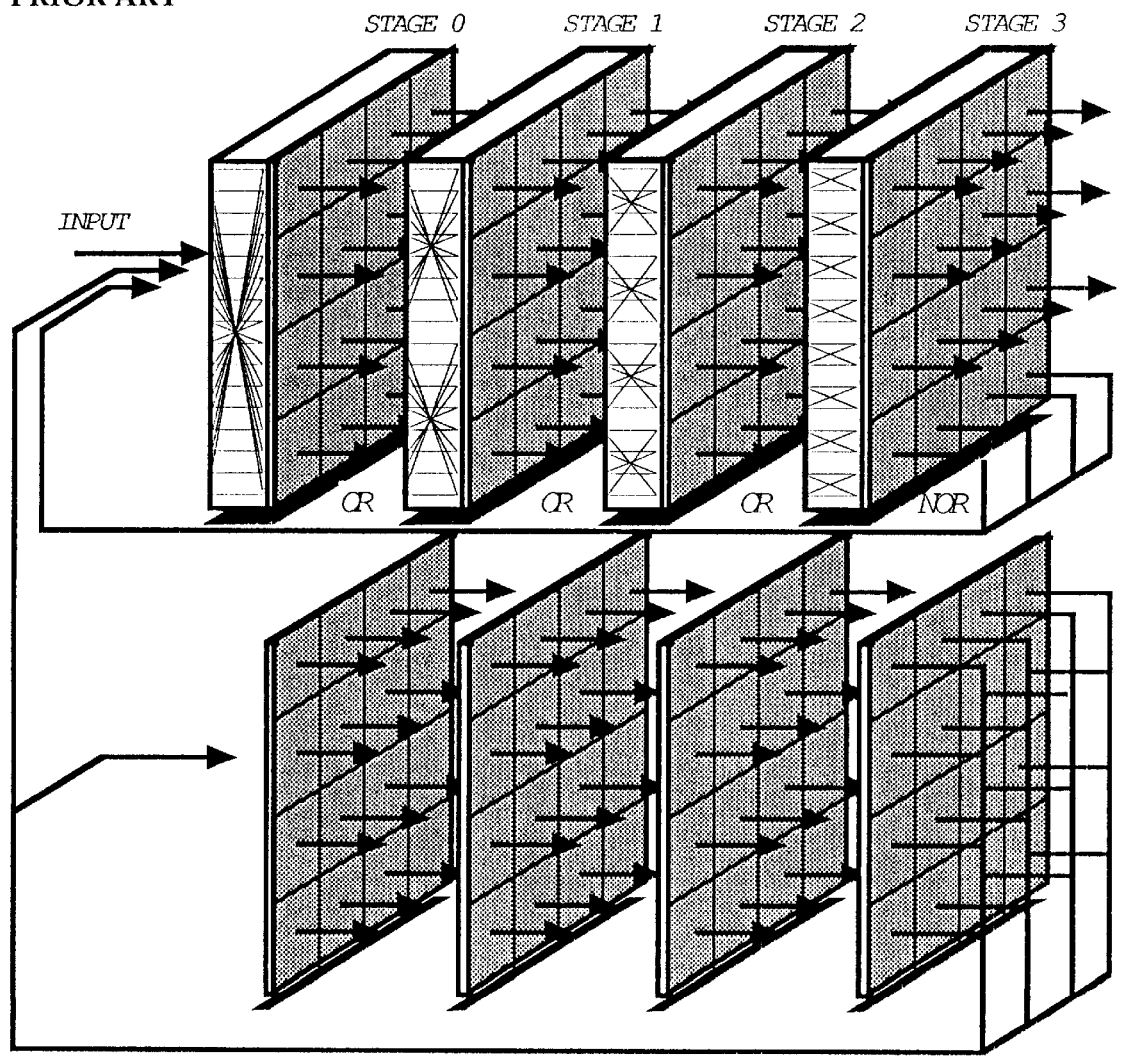
FIG. 10B shows a prior art architectural model of a digital optical computer based on arrays of logic gates interconnected in free space, described in a book by Murdocca, *A Digital Design Methodology for Optical Computing*, MIT Press, Cambridge, Mass., 1990, pp. 93–94, wherein the processor configuration can be changed during a computation when an externally precomputed control sequence is "played back" by a configuration control mechanism.
Figure 11A:
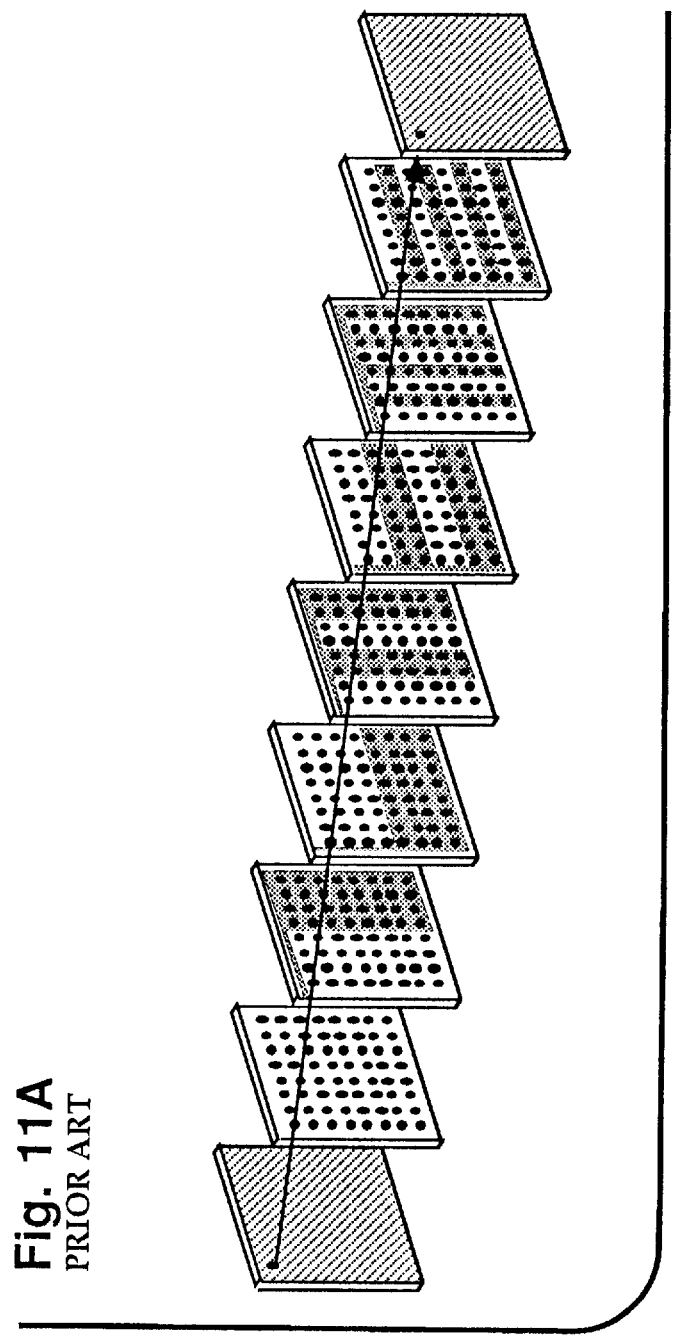
FIG. 11A illustrates a prior art, digitally-addressed, flat-panel CRT, disclosed in U.S. Pat. No. 3,408,532, entitled ELECTRON BEAM SCANNING DEVICE, issued Dec. 6, 1965 to Hultberg et al., and assigned to Northrop Corporation, and further described in a paper by Goede, "A Digitally Addressed Flat-Panel CRT," in *IEEE Trans. Electron Devices*, vol. ED-20, November 1973, pp. 1052–1061.
Figure 11B:
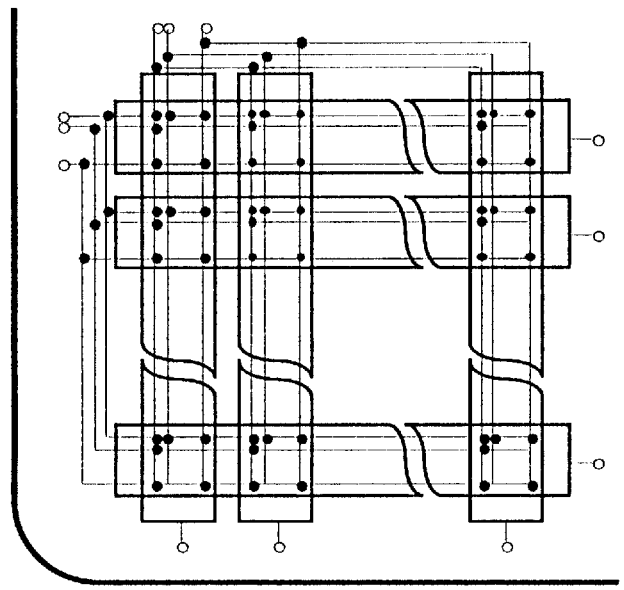
FIG. 11B shows a prior art, multidimensional, matrix addressing scheme for flat-panel displays, described in a paper by Kitai, "Three- and Four-Dimensional Addressing of Flat-Panel Displays," in *Proceedings of the SID*, Vol. 27 No. 4, 1986, pp. 309–312.
Figure 12:
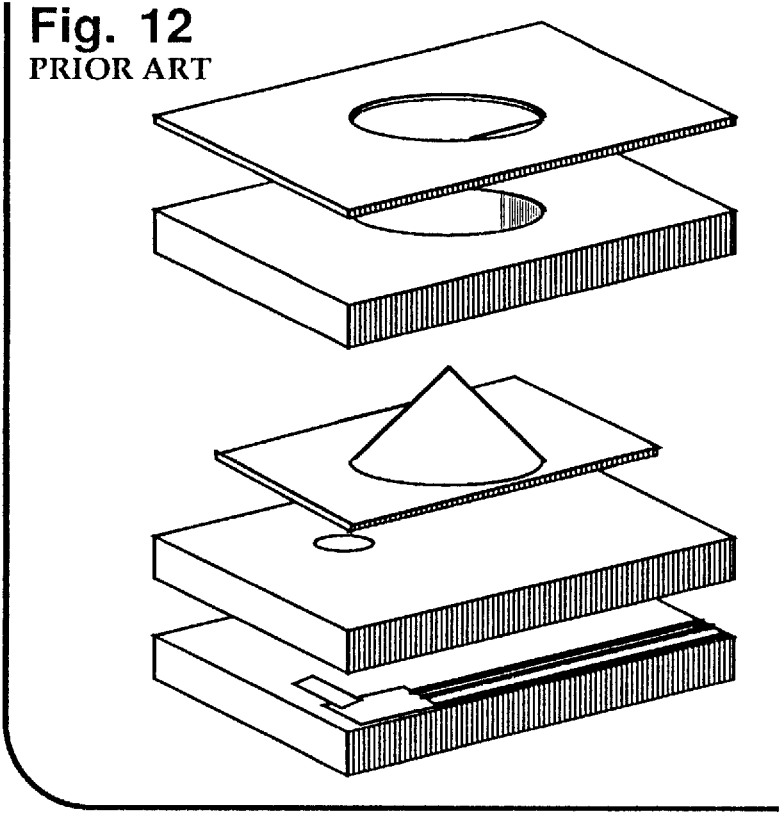
Figure 45A:
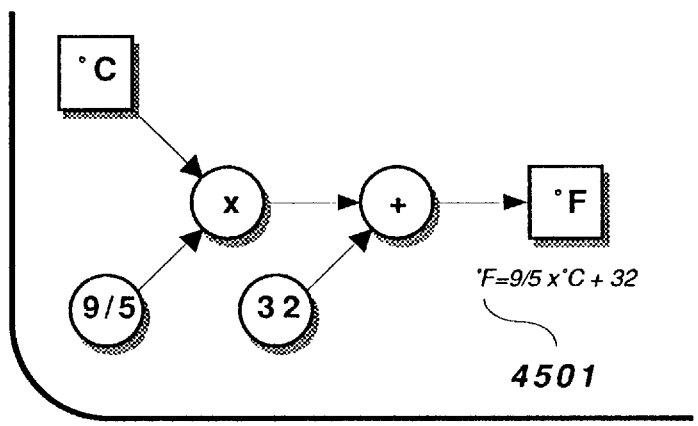
FIGS. 45A–45F illustrate a method of the invention which transforms diagrammed relations into executable definitions.
Figure 45B:
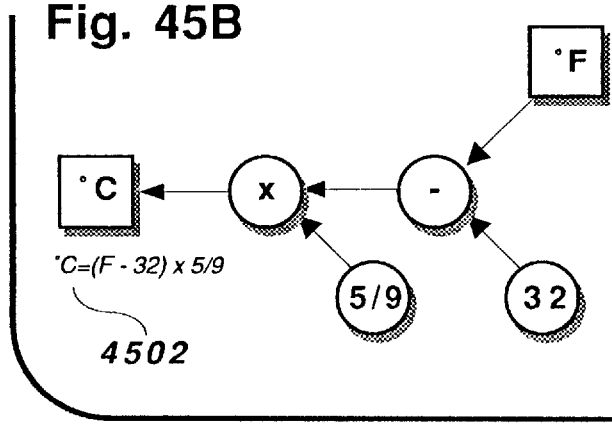
Figure 45C:
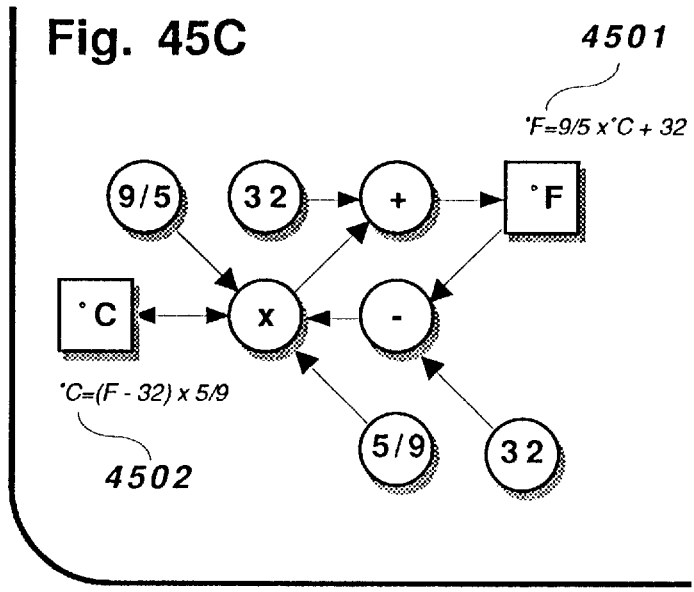
Figure 45D:
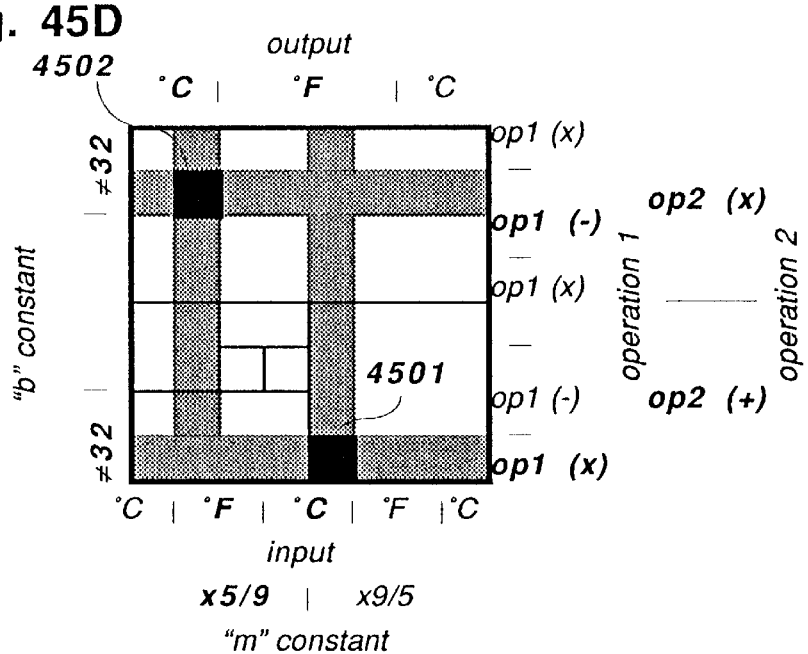

Leler employs the problem of converting a particular temperature reading from one expression to another to illustrate imperative programming. A programming language syntax similar to C or FORTRAN, for example, permits a linear relationship to be directly expressed as an equation of the form "y=mx+b." The statement:

$$°F.=9/5\times°C.+32$$

may be used to compute Celsius (°C.) equivalent of a Fahrenheit (°F.) temperature. FIG. 45A illustrates the relationship 4501 above as a directed graph, wherein nodes are linked by arcs which define a sequence of input and output transitions. To convert Fahrenheit temperatures to Celsius, a separate expression is required, $$°C.=(°F.-32)\times 5/9$$

along with a test to determine which statement to execute. A directed graph for this relationship 4502 is shown in FIG. 45B. A two-way directed graph illustrating both relationships 4501, 4502 is shown in FIG. 45C. The graph of FIG. 4SC illustrates a relationship between degrees Fahrenheit (°F.) and degrees Celsius (°C.), such that, when given either °F. or °C., the other can be computed. Although nodes of the directed graphs of FIGS. 45A–45C are labeled, the arcs which define nodal relationships are not. An efficient method of consistently naming nodal transitions is required to transform the diagramed relations into an executable definition. FIG. 45D illustrates a six-dimensional object space which corresponds to the directed graph illustrated in FIG. 45C:

- a first dimension specifies an input temperature as either °F. or °C., e.g., the variable "x" in the linear expression "y=mx+b";
- a second dimension corresponds to an output temperature as either °F. or °C. (e.g., the result "y" in the linear expression "y=mx+b");
- a third dimension corresponds to a constant added or subtracted in computing an equivalent expression (e.g., the constant "b" in the linear expression "y=mx+b");
- a fourth dimension corresponds to a constant used to scale the input temperature when computing an equivalent expression (e.g., the constant "m" in the linear expression "y=mx+b");
- a fifth dimension corresponds to a first operation when computing an equivalent expression, e.g., the multiplication of the constant "m" or its reciprocal and the variable "x" in the linear expression "y=mx+b", or the addition or subtraction of the constant "b";
- a sixth dimension corresponds to a second operation when computing an equivalent expression, e.g., the multiplication of the constant "m" or its reciprocal and the variable "x" in the linear expression "y=mx+b", or the addition or subtraction of the constant "b".

A first relation 4501 of FIG. 45D, which corresponds to the expression:

$$°F.=9/5\times°C.+32$$

illustrated in FIG. 45A, can be read as follows; the Fahrenheit (°F.) equivalent of a Celsius (°C.) temperature is computed by a first operation (op1:x) which multiplies the input temperature (°C.) by a constant (9/5), and continues with a second operation which adds a constant (32) to the result of the first operation.

The method, referenced above, used to generate the external expression of FIG. 45D also encodes internal expressions which uniquely name all terms, relations and transitions as 6-bit object selectors. A second relation 4502 of FIG. 45D corresponds to the expression:

$$°C.=(°F.-32)\times 5/9$$

illustrated in FIG. 45B.

If another expression, for example Kelvin (°K), is included in an imperative temperature conversion program, four additional statements and associated tests are required:

$$°K=°C.-273$$

$$°C.=°K+273$$

$$°K=5/9\times°F.+290.78$$

$$°F.=9/5\times°K+523.4$$

Figure 45E:
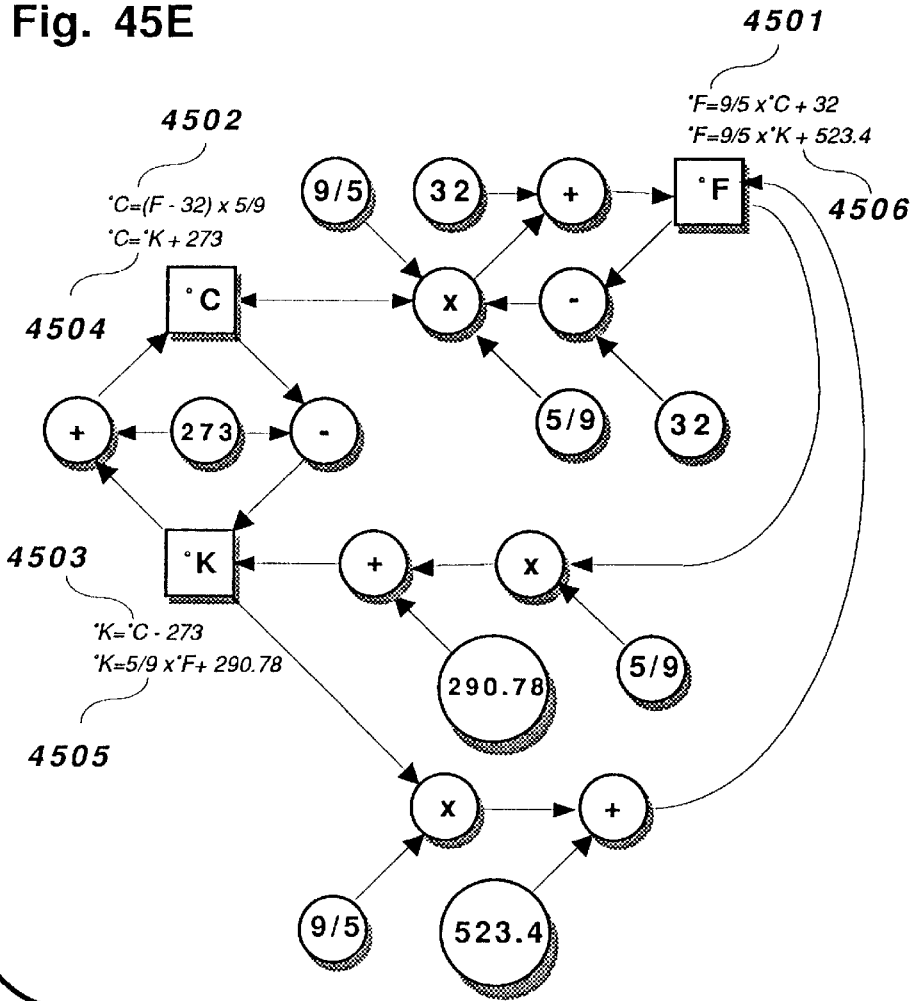
Figure 45F:
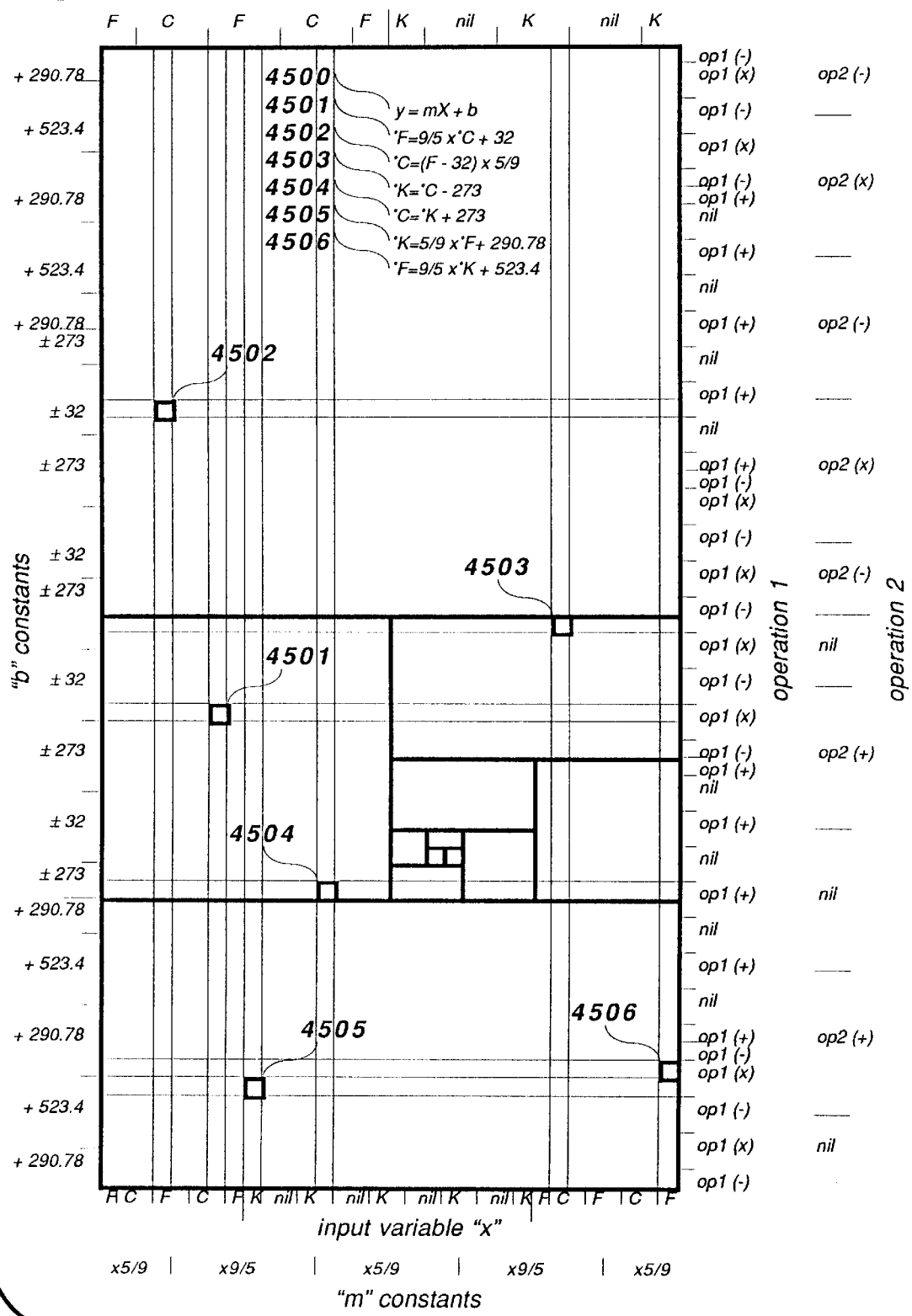

FIG. 45E is a three-way directed graph which illustrates the relations between degrees Fahrenheit (°F.) 4501, 4506, Celsius (°C.) 4502, 4504, and Kelvin (°K) 4503, 4505. FIG. 45F shows a six-dimensional object space which corresponds to the directed graph illustrated in FIG. 45E. The dimensional attributes correspond to the object space of FIG. 45D described above. A larger number of properties describes various attributes in the object space of FIG. 45F in order to account for the Kelvin (°K) equivalent of Celsius (°C.) and Fahrenheit (°F.) temperatures. Given a temperature expressed in either °K, °C., or °F., the other two expressions are produced. An 11-bit object selector 4501, 4502, 4503, 4504, 4505, 4506 of FIG. 45F encodes internal expressions which uniquely name all terms, relations and transitions as operands of an instruction which executes when a proper relation of its required components is known, thereby performing fine-grained, low-level synchronization for coordinating processor resource activation signals.

Figure 46:
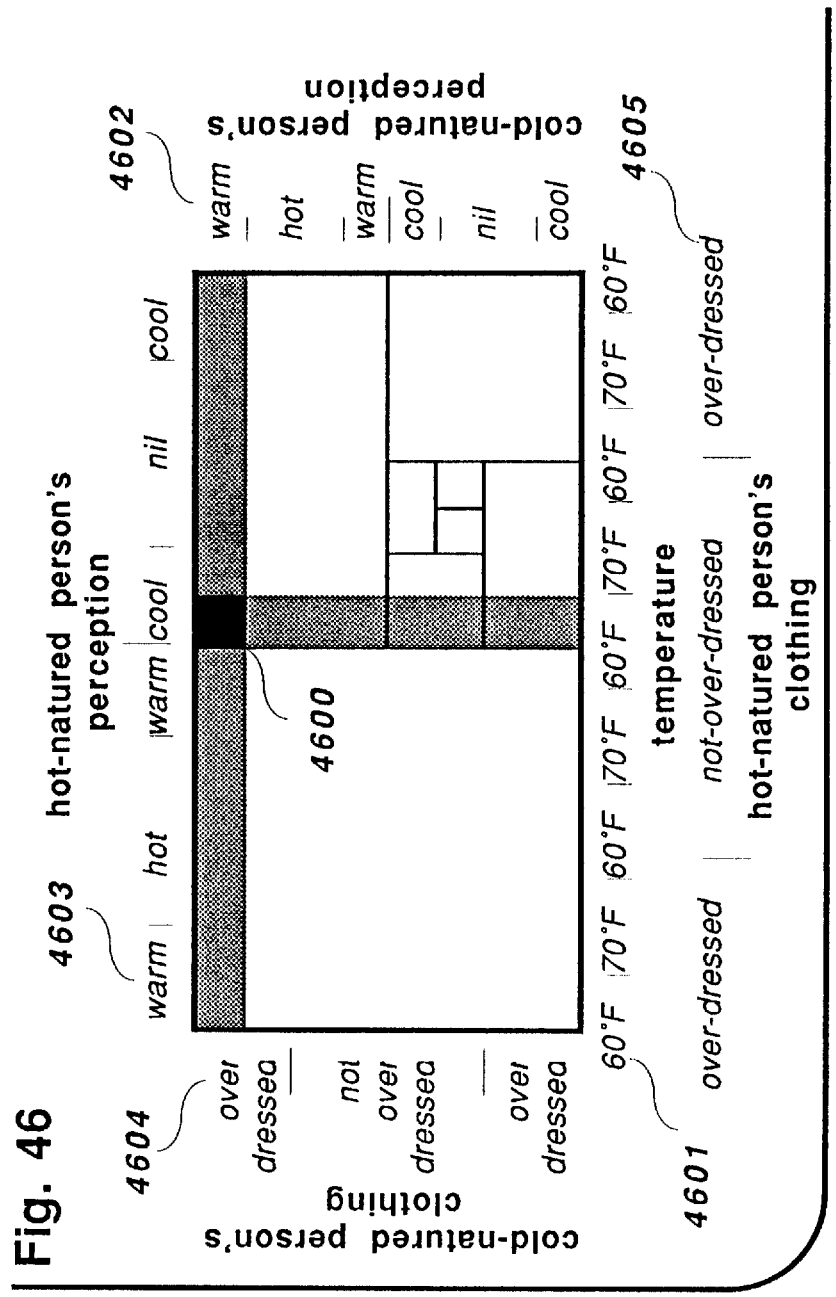

Whereas, the conversion of a temperature from one expression to another is a straightforward calculation, concurrent representation of multiple expressions involves a parallel relation between multiple calculations. Neither process, however, has bearing on the semantic meaning or a particular temperature. Without debating its merits or deficits, "fuzzy logic" attempts to characterize imprecise expressions of a temperature in terms of "linguistic variables", i.e., hot, warm, or cold, which belong to a "fuzzy set". If a particular temperature were described as being completely hot, for example, then its "degree of membership" in a fuzzy set is expressed as 1.0. Whereas, the degree of membership for another temperature described as being completely cold is 0.0. The range of temperatures in between completely hot and completely cold do not correspond to a precise threshold, however, and are characterized by linguistic variables such as "somewhat hot," "warm," "somewhat warm," and "somewhat cold." Linguistic expressions correspond to ranges of values representing degrees of membership which may overlap. Although the present invention encodes external or "linguistic" expressions of attribute properties as reflected binary codewords, the reasons for doing so have nothing to do with a "degree of membership" function. Rather, resolving the question of "multiple concurrent meanings" is an object of the present invention not addressed by fuzzy logic systems. FIG. 46, for example, illustrates two different "perceptions" of a single "event" as a five-dimensional object space:

a first dimension 4601 is described by two temperature "events", i.e., 60° F. and 70° F.;

a second dimension 4602 is described by a range of possible perceptions for a cold-natured person, i.e., cool, warm, or hot;

a third dimension 4603 is similarly described by a range of possible perceptions for a hot-natured person, i.e., cool, warm, or hot;

a fourth dimension 4604 is described by two possible states-of dress for a cold-natured person, i.e., over-dressed or not over-dressed;

a fifth dimension 4605 is similarly described by two possible states-of dress for a hot-natured person, i.e., over-dressed or not over-dressed.

A particular location 4600 in the object space of FIG. 46 names, e.g., encodes, and explains two potentially ambiguous perceptions of a single temperature event. For a given a temperature (60° F.) 4601, a cold-natured person's uncharacteristic response (warm) 4602, which differs from a hot-natured person's response (cool) 4603, is explained by states-of dress: the cold-natured person is "over-dressed" 4604, whereas the hot-natured person is not 4605. Other explanations for uncharacteristic perceptions might include the level of activity of each person, the location of a person with regard to wind in cold weather, or the relative humidity. The example of FIG. 46 illustrates a novel, mechanized method for representing and resolving semantic ambiguities not supported by linear methods.

It will be apparent to those skilled in the art that various modifications can be made to the polymorphic network and apparatus of the instant invention without departing from the scope or spirit of the invention, and it is intended that the present invention cover modifications and variations of the polymorphic network method and apparatus provided they come within the scope of the appended claims and their equivalents.

I claim:

1. A method of controlling a Gray code transition sequence using a plurality of dimensions corresponding to attributes which name a plurality of groups of related object space configurations, and a first dimension corresponding to an attribute of the Gray code transition sequence described by grouping named transitions in which the same bit position of codewords changes, comprising the steps of:

allocating a context configuration control network;

inputting, using the plurality of dimensions, data representing a particular object space configuration;

inputting the first dimension, corresponding to a particular step in the Gray code transition sequence; and determining a bit position which changes to produce a next codeword in the Gray code transition sequence.

2. A method of controlling a Gray code transition sequence using a plurality of dimensions corresponding to attributes which name a plurality of groups of related object space configurations, and a first dimension corresponding to an attribute of the Gray code transition sequence described by a particular bit position of codewords, comprising the steps of allocating a context configuration control network;

inputting, using the plurality of dimensions, data representing a particular object space configuration;

inputting the first dimension, corresponding to a particular bit position of a codeword for the Gray code transition sequence; and determining if the particular bit position is a next logically adjacent for the Gray code transition sequence.

* * * * *